(12) United States Patent
Roberts

(10) Patent No.: US 10,155,549 B2
(45) Date of Patent: Dec. 18, 2018

(54) SYSTEM FOR ATTACHMENT TO A TRUCK BEDSIDE

(71) Applicant: L&M IP, Huntsville, AL (US)

(72) Inventor: Mark D. Roberts, Huntsville, AL (US)

(73) Assignee: L&M IP, Huntsville, AL (US)

( * ) Notice: Subject to any disclaimer, the term of this patent is extended or adjusted under 35 U.S.C. 154(b) by 6 days.

(21) Appl. No.: 15/678,758

(22) Filed: Aug. 16, 2017

(65) Prior Publication Data

US 2018/0050737 A1 Feb. 22, 2018

Related U.S. Application Data

(60) Provisional application No. 62/375,708, filed on Aug. 16, 2016, provisional application No. 62/478,918, filed on Mar. 30, 2017.

(51) Int. Cl.
*B62D 33/02* (2006.01)
*F16B 7/18* (2006.01)
*B62D 33/027* (2006.01)

(52) U.S. Cl.
CPC ....... *B62D 33/0207* (2013.01); *B62D 33/027* (2013.01); *F16B 7/18* (2013.01)

(58) Field of Classification Search
CPC .. B60R 9/045; B62D 33/0207; B62D 33/023; B62D 33/027; B62D 33/033
USPC ................................. 296/3, 7, 37.6
See application file for complete search history.

(56) References Cited

U.S. PATENT DOCUMENTS

| | | | | |
|---|---|---|---|---|
| 3,460,864 A * | 8/1969 | Piercy | ...................... | B60R 9/00 |
| | | | | 105/387 |
| 4,444,427 A * | 4/1984 | Martin | ...................... | B60P 3/42 |
| | | | | 224/403 |
| 4,659,131 A * | 4/1987 | Flournoy, Jr. | ............. | B60R 9/00 |
| | | | | 296/3 |
| 5,037,152 A * | 8/1991 | Hendricks | ................ | B60R 9/00 |
| | | | | 296/26.06 |
| 6,332,637 B1 * | 12/2001 | Chambers | .............. | B62D 33/08 |
| | | | | 296/26.04 |
| 6,634,689 B1 * | 10/2003 | Soto | ......................... | B60P 7/08 |
| | | | | 211/195 |
| 8,684,439 B1 * | 4/2014 | Calvert | ..................... | B60P 3/40 |
| | | | | 296/3 |
| 2002/0125728 A1 * | 9/2002 | Chambers | .............. | B62D 33/08 |
| | | | | 296/3 |
| 2015/0203050 A1 * | 7/2015 | Finestone | ................ | B60P 3/40 |
| | | | | 296/3 |
| 2018/0111542 A1 * | 4/2018 | Mueller | ................ | B60P 7/0815 |

* cited by examiner

*Primary Examiner* — Jason S Daniels

(57) ABSTRACT

An interface system for attaching one or more objects to a truck bedside includes a top plate integrated with a top portion of the truck bedside, a plurality of female connector tubes attached to the top plate and extending into a volume between the top portion of the truck bedside and a wheel well of the truck bed, and a locking bar assembly. A plurality of male connector tubes attached to the one or more objects can be inserted into the female connector tubes and secured to the female connector tubes using the locking bar assembly that can be locked in a locked position by a locking mechanism.

20 Claims, 31 Drawing Sheets

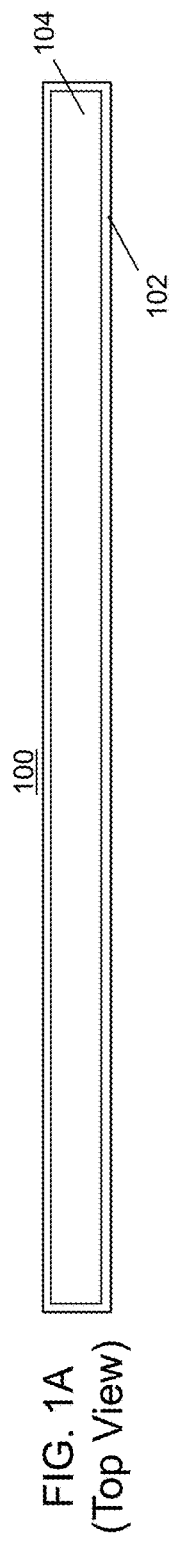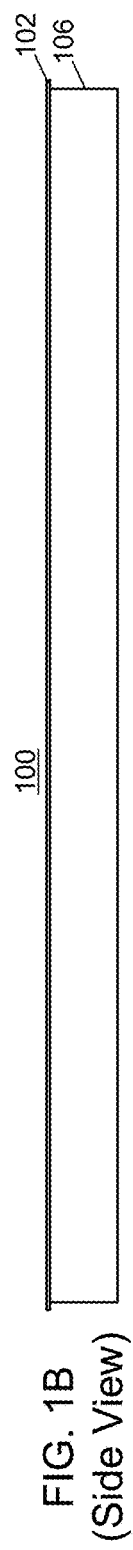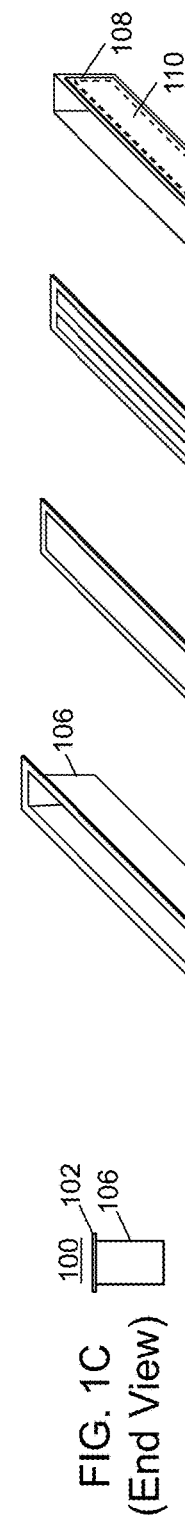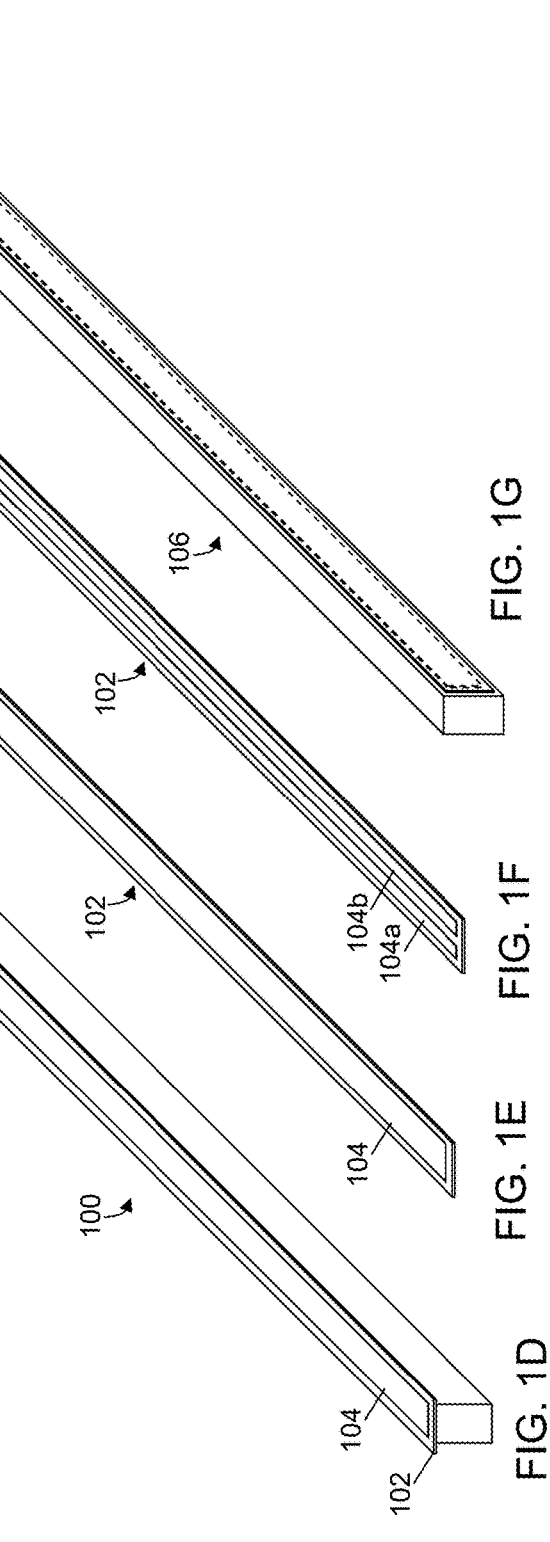

(Top View)

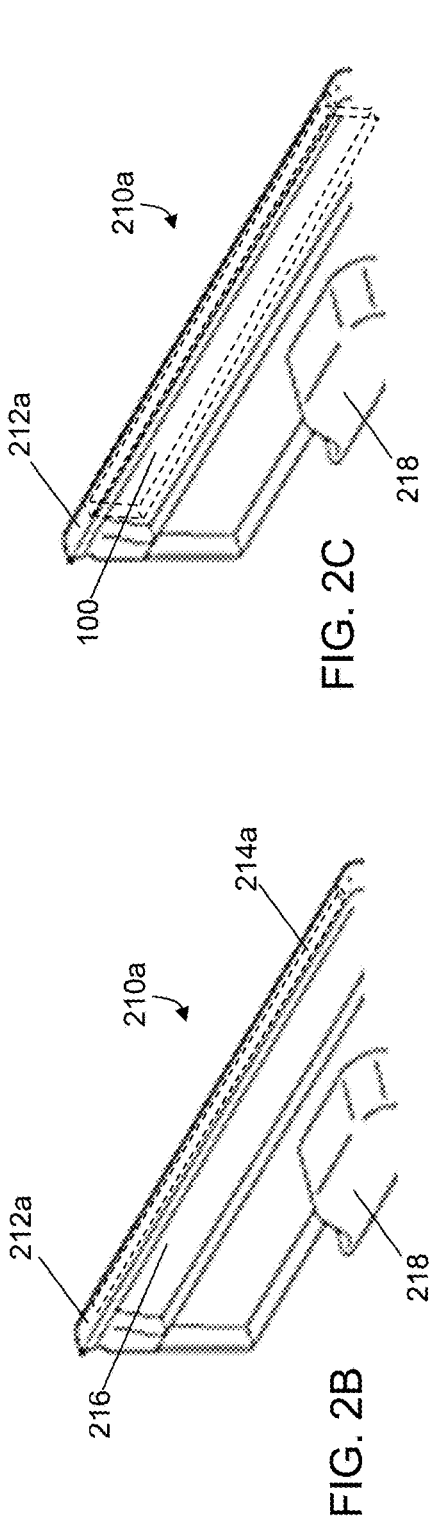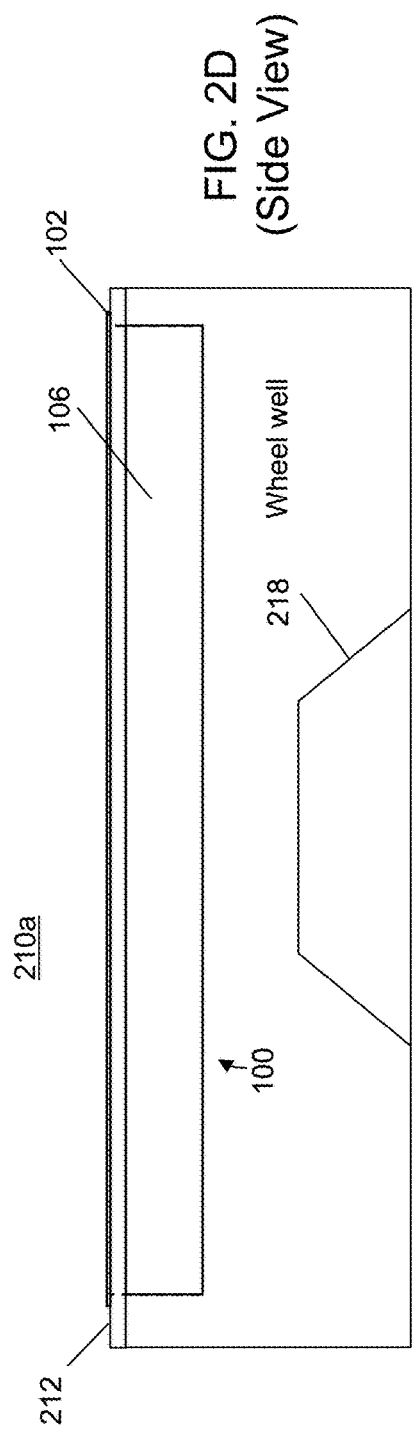

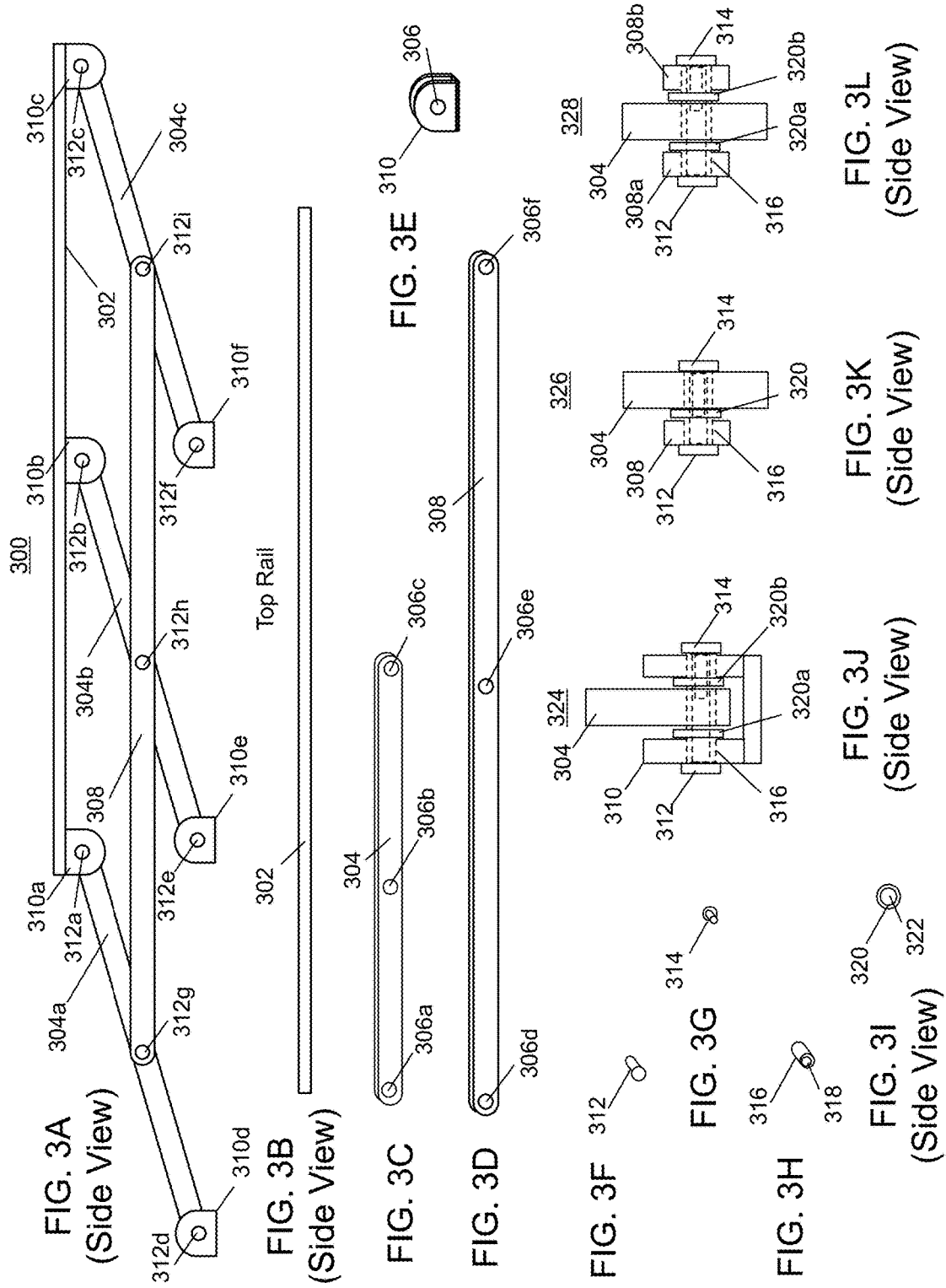

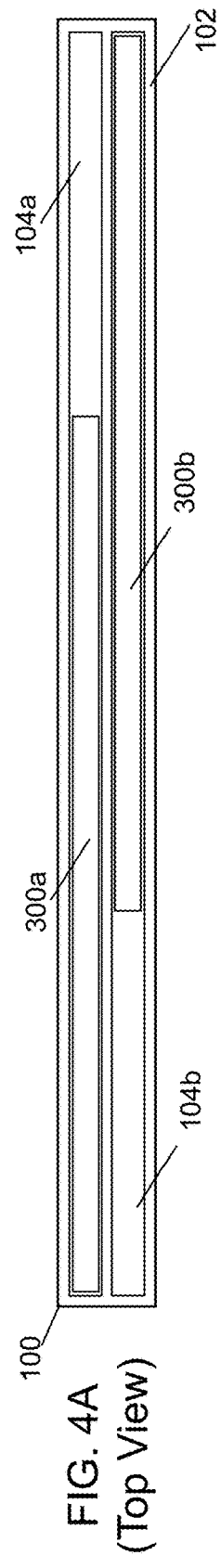
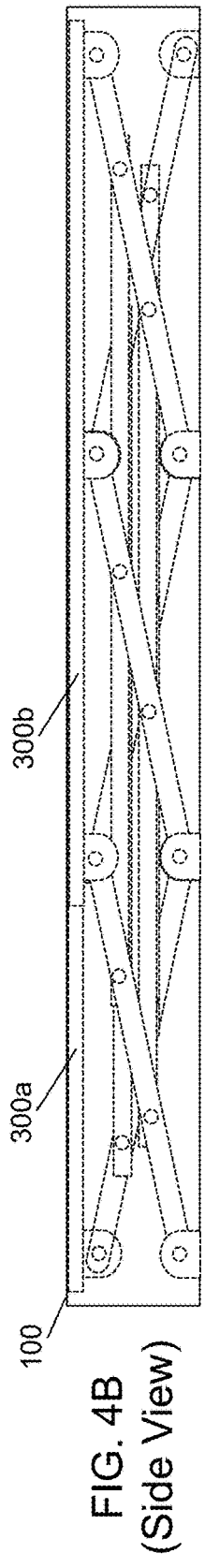
FIG. 4A (Top View)
FIG. 4B (Side View)

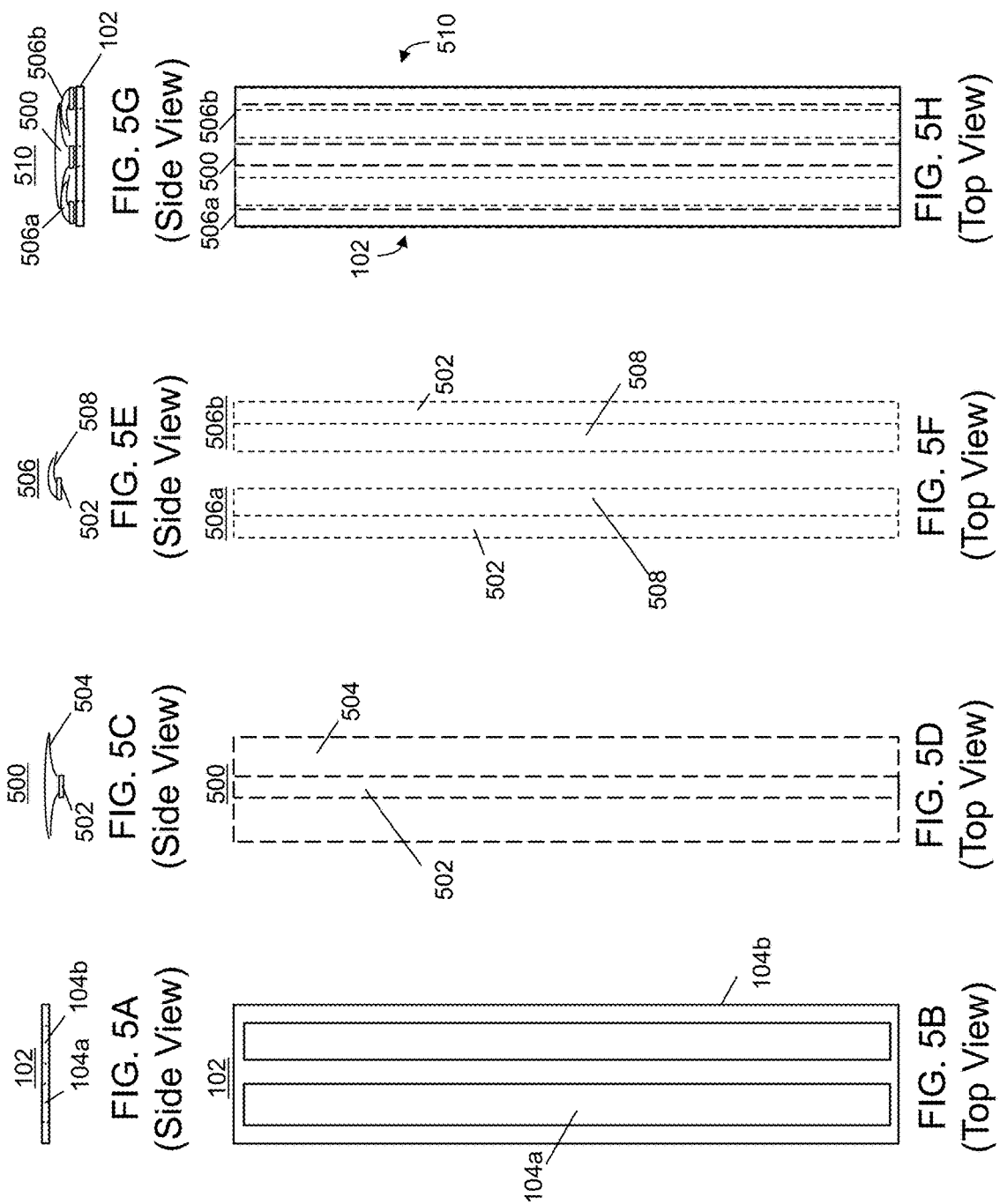

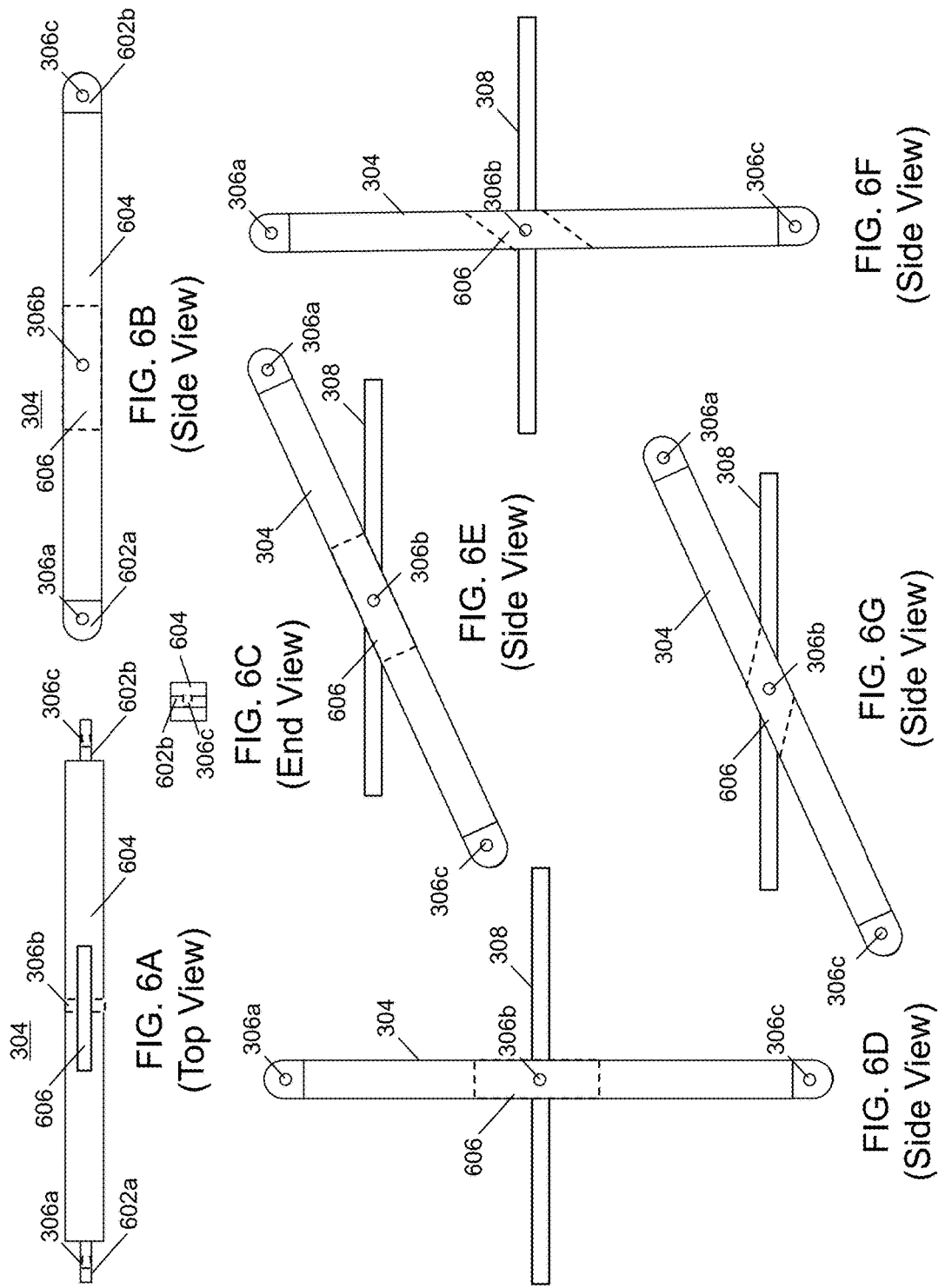

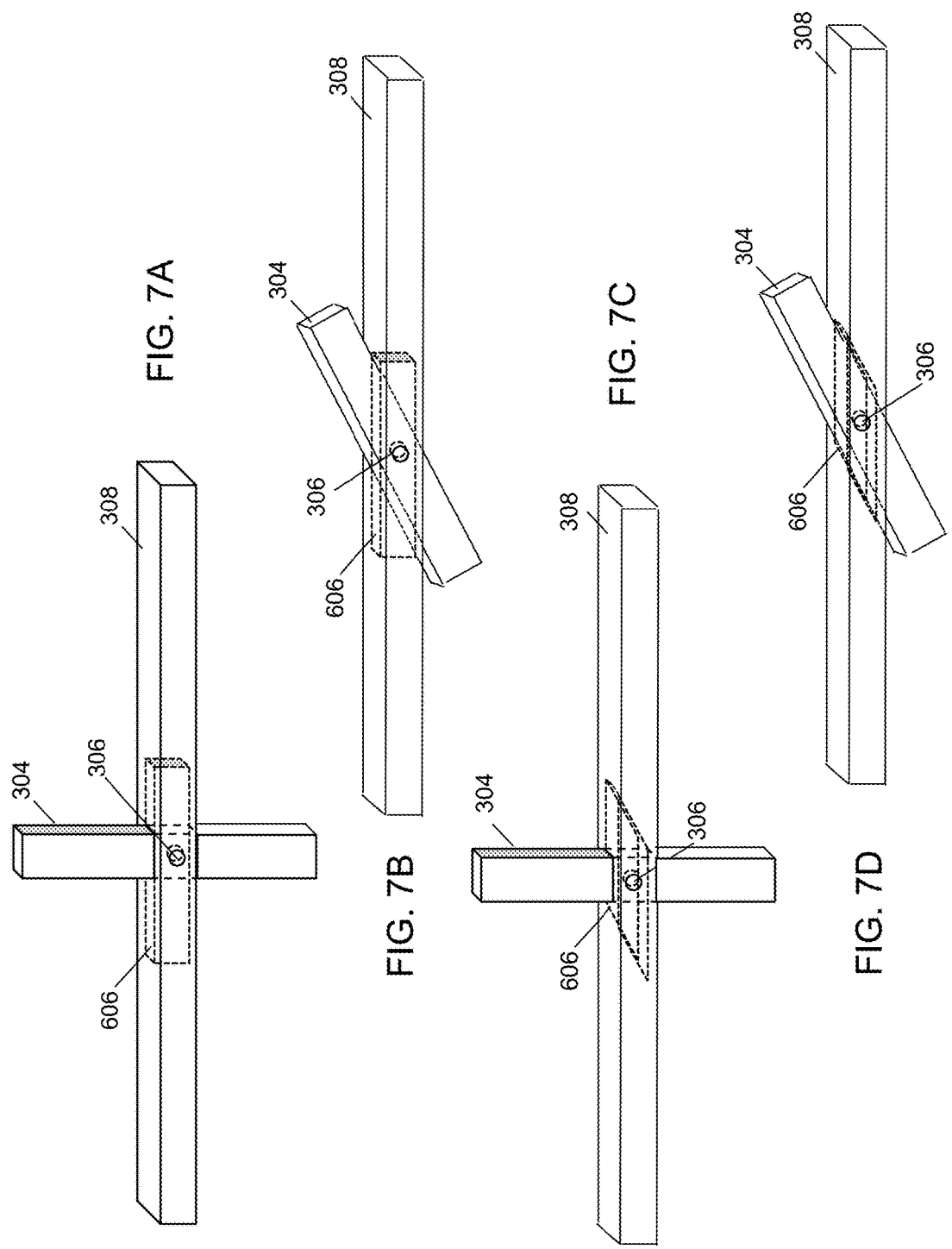

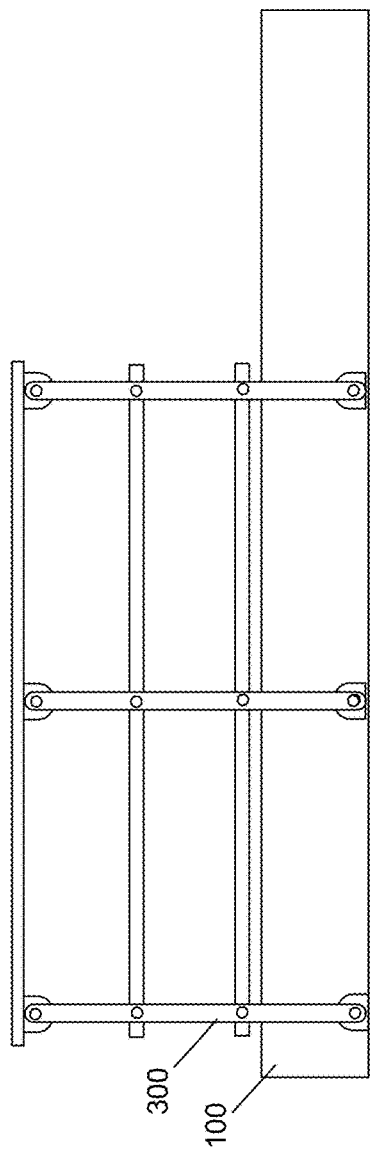
FIG. 8A (Side View)
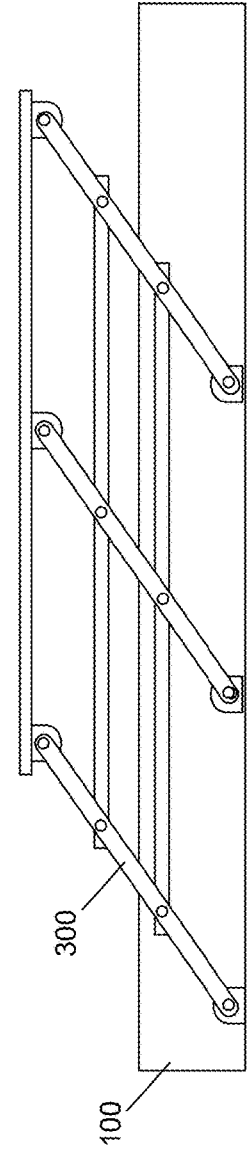
FIG. 8B (Side View)
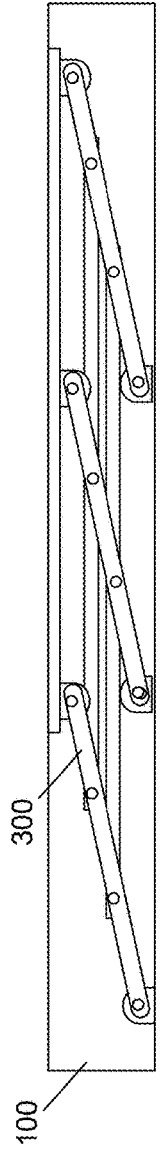
FIG. 8C (Side View)

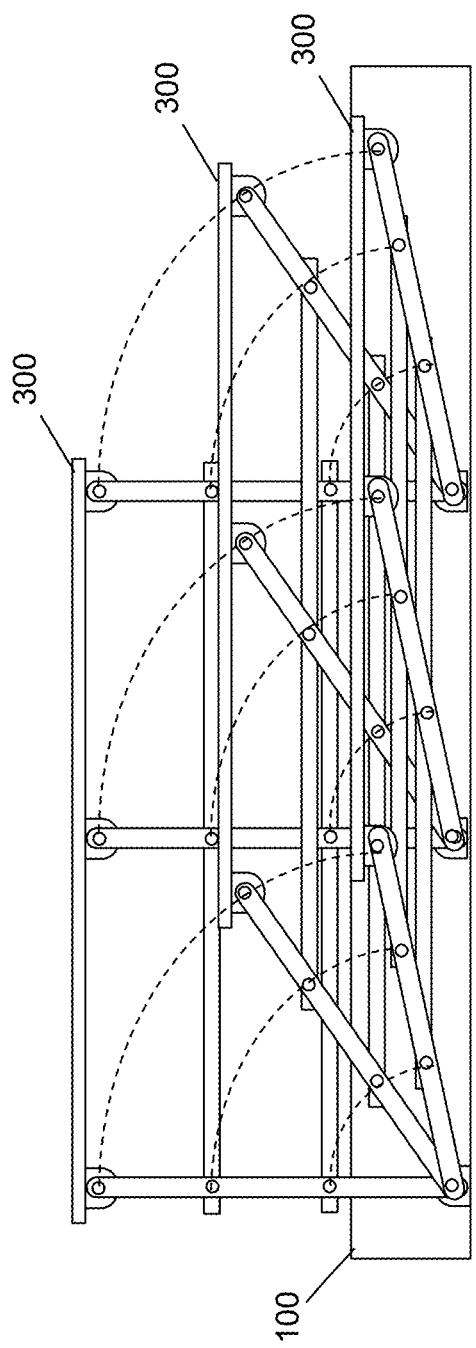
FIG. 8D (Side View)
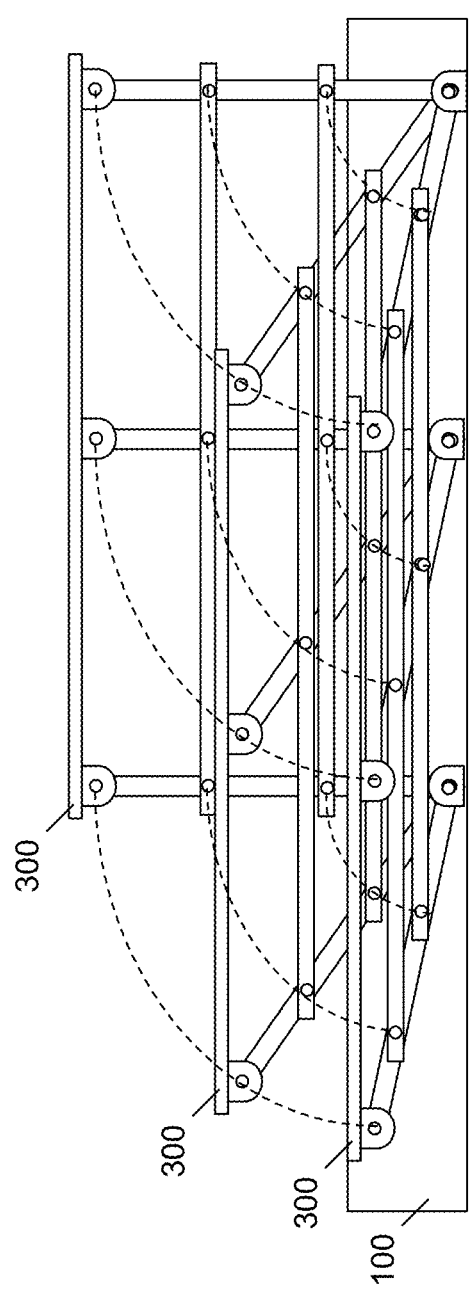
FIG. 9D (Side View)

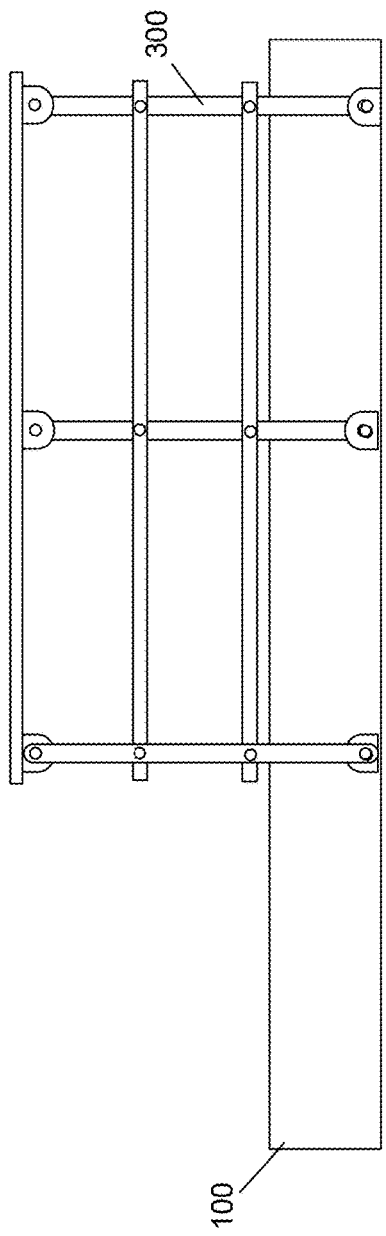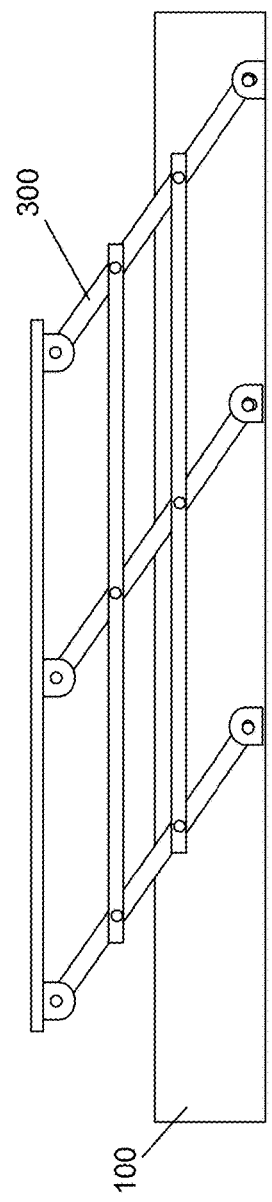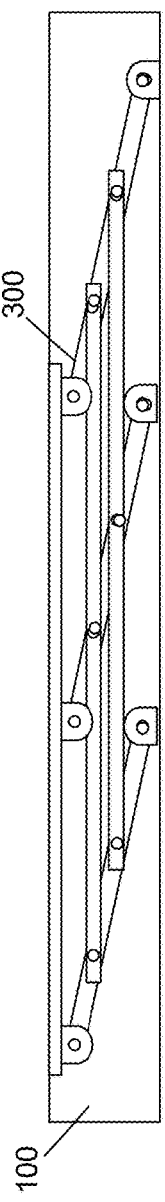
FIG. 9A (Side View)
FIG. 9B (Side View)
FIG. 9C (Side View)

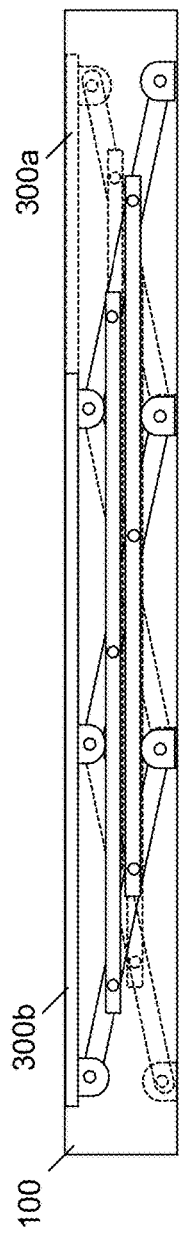
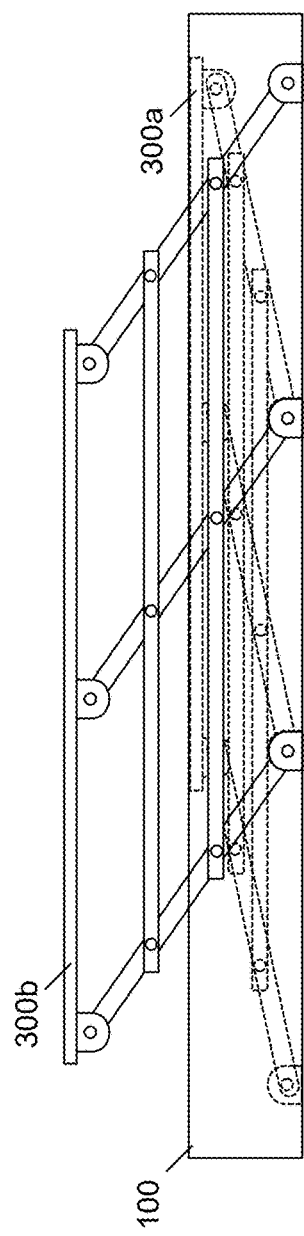
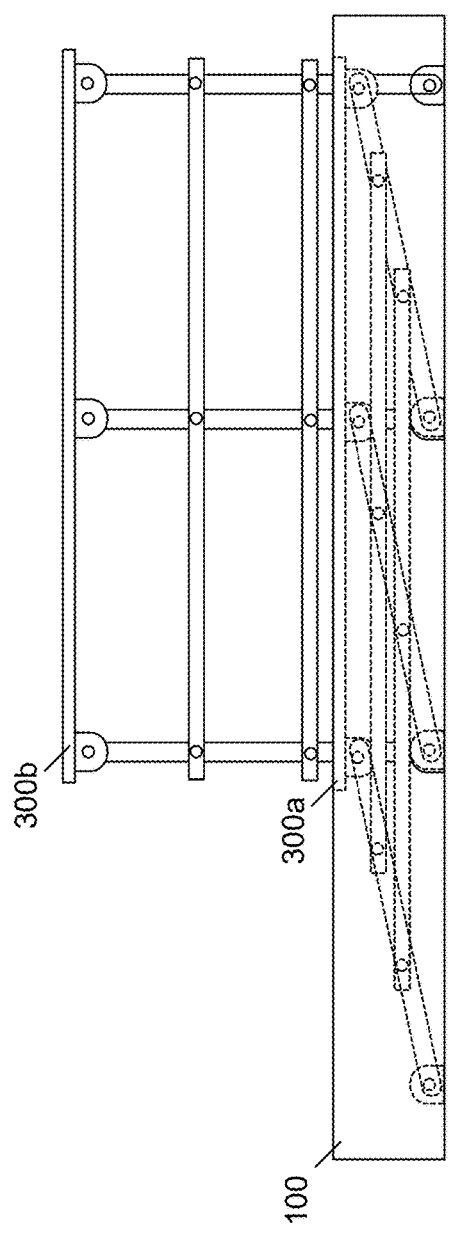
FIG. 10A (Side View)
FIG. 10B (Side View)
FIG. 10C (Side View)

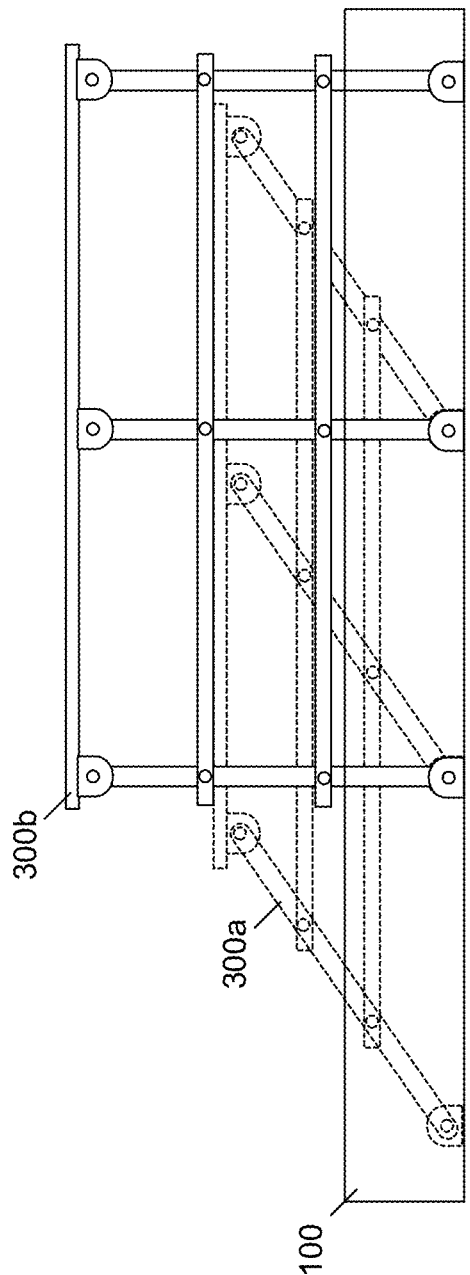
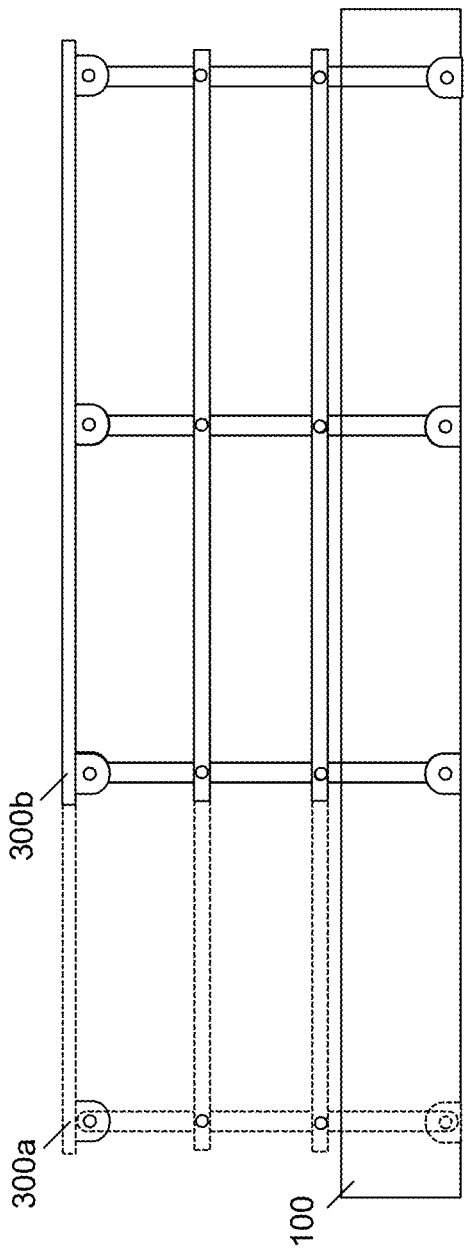

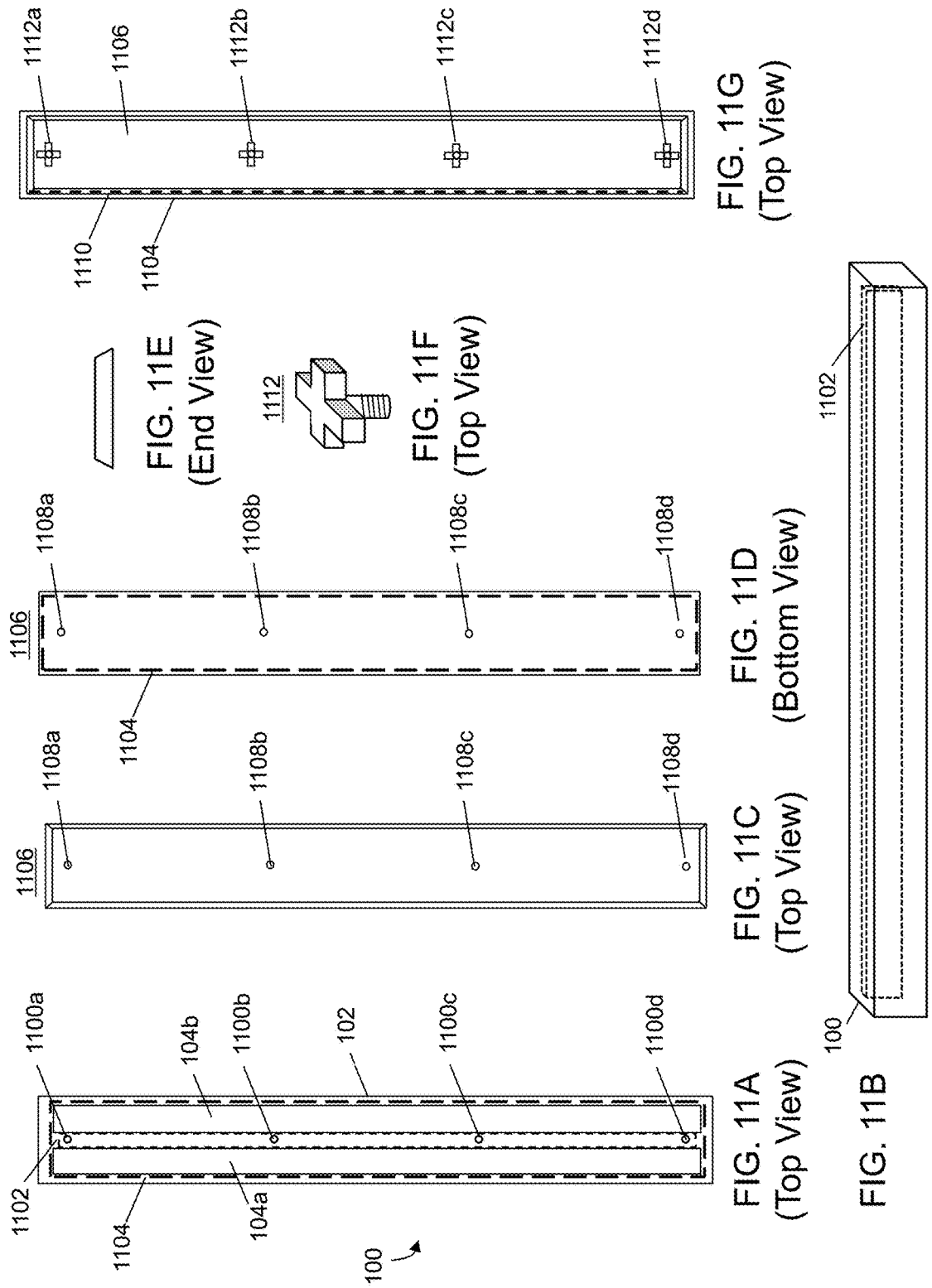

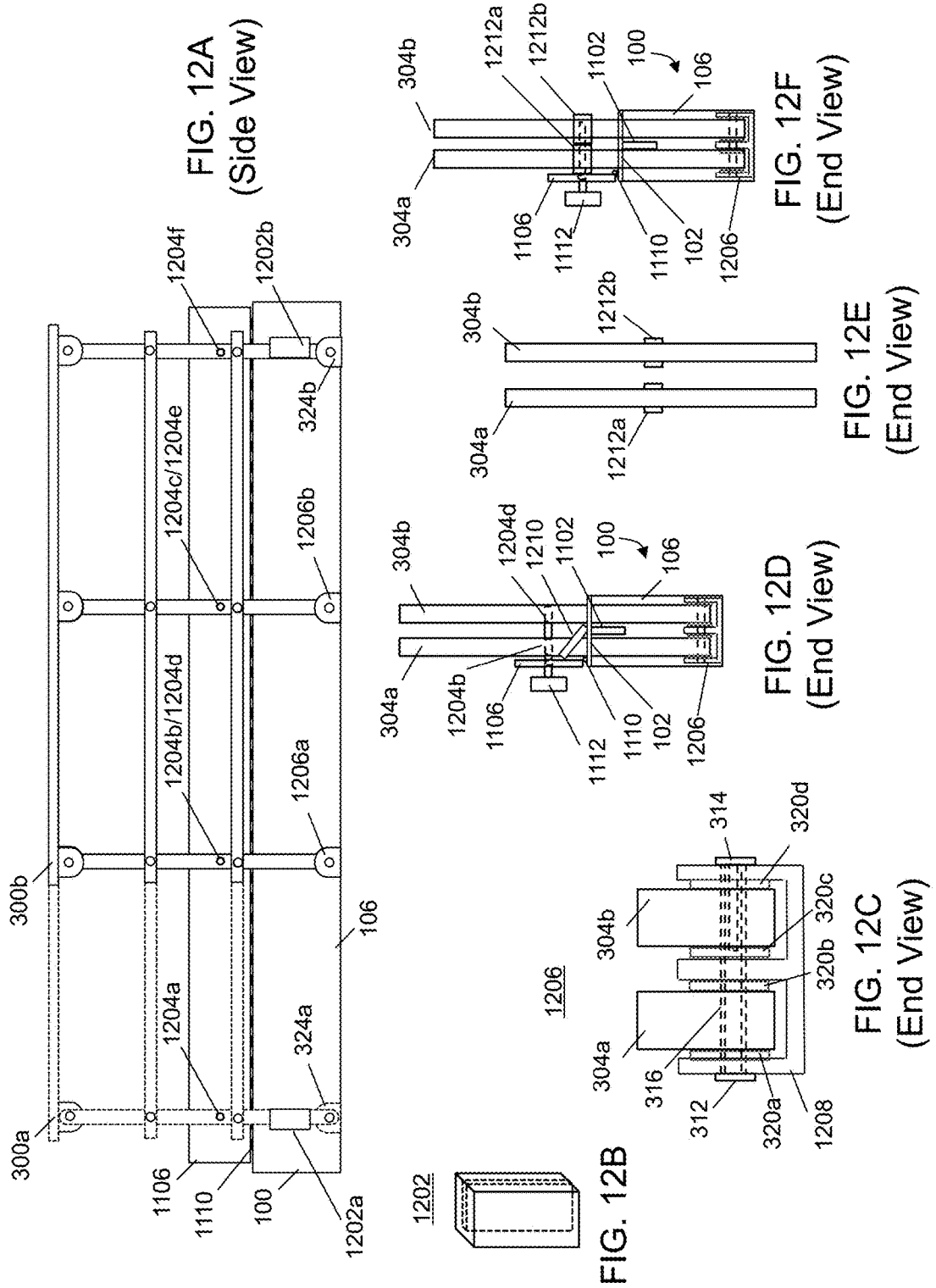

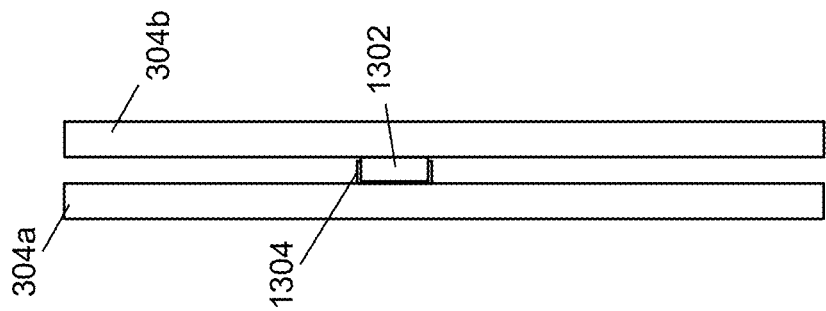
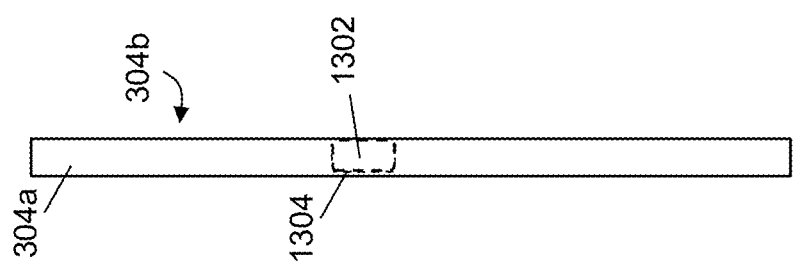
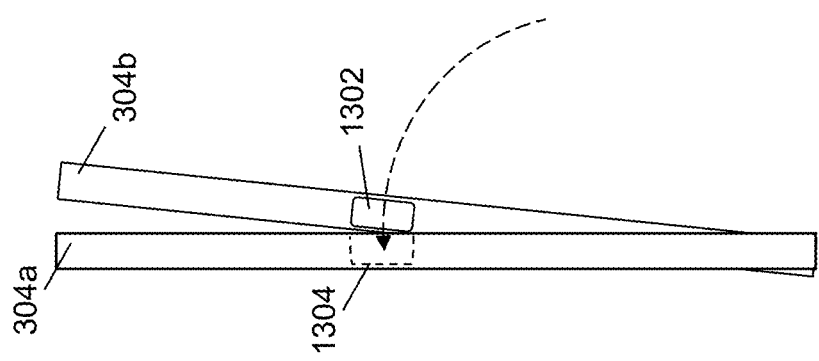
FIG. 13C (End View)
FIG. 13B (Side View)
FIG. 13A (Side View)

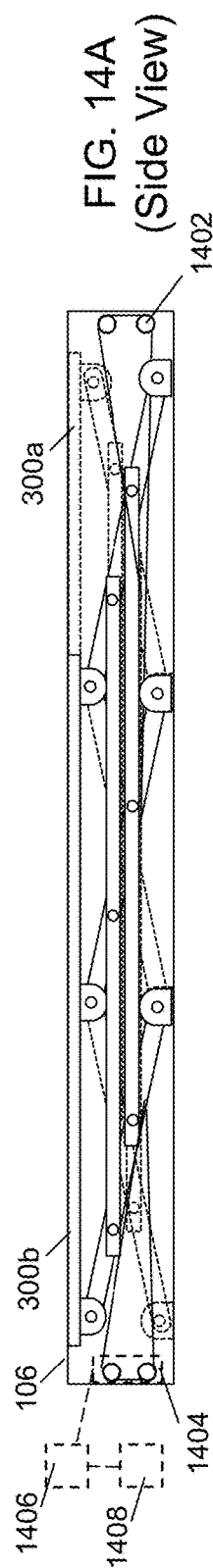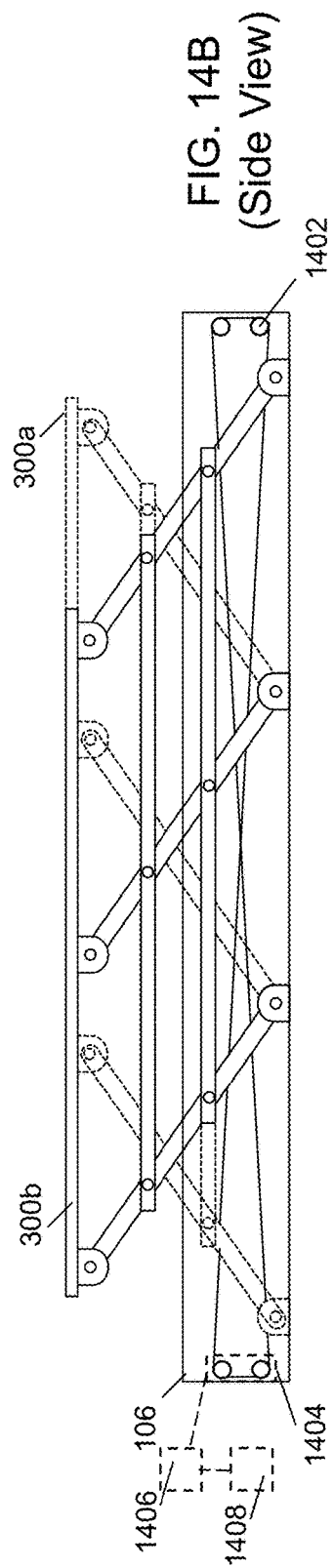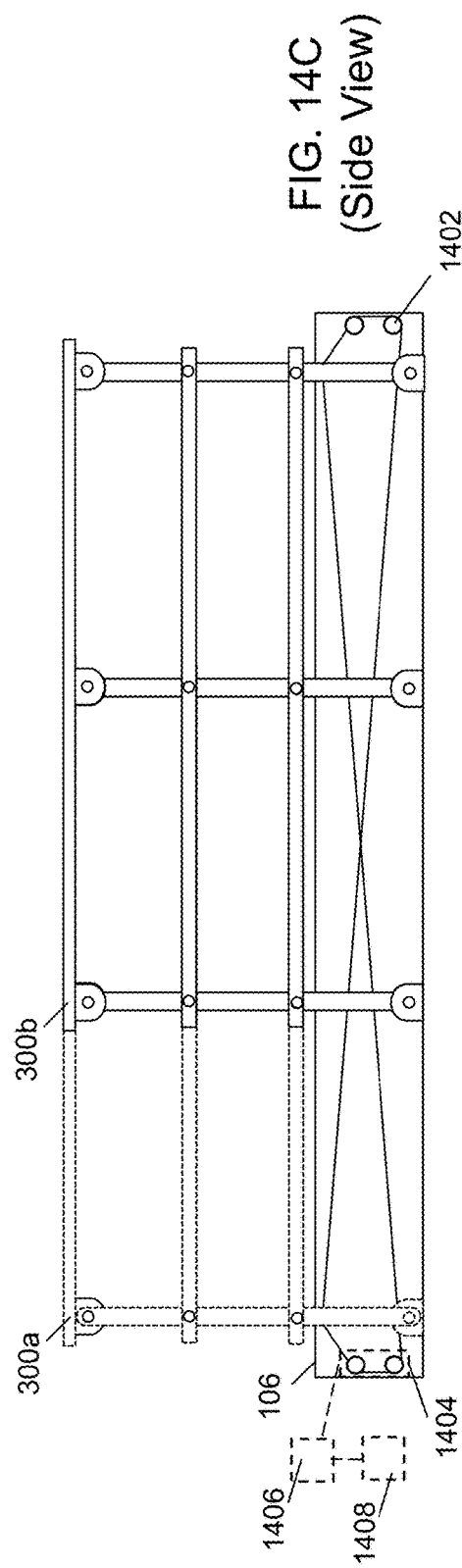

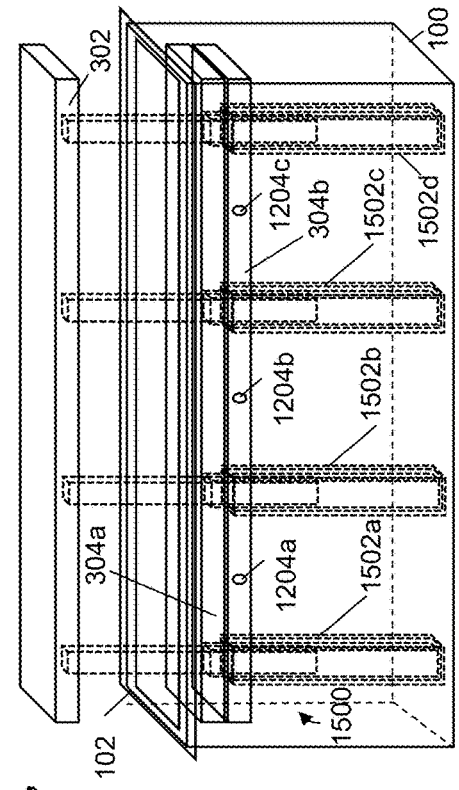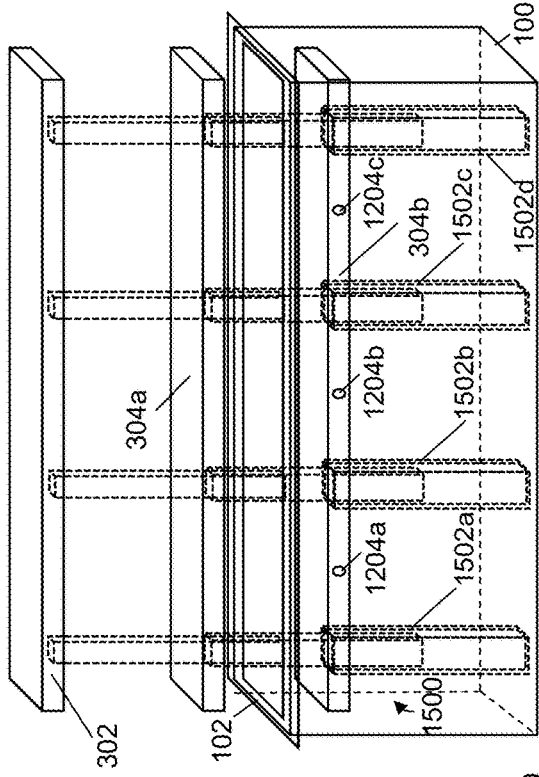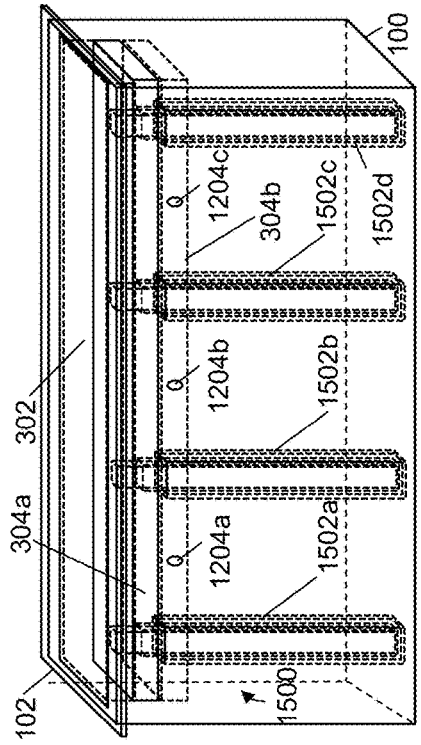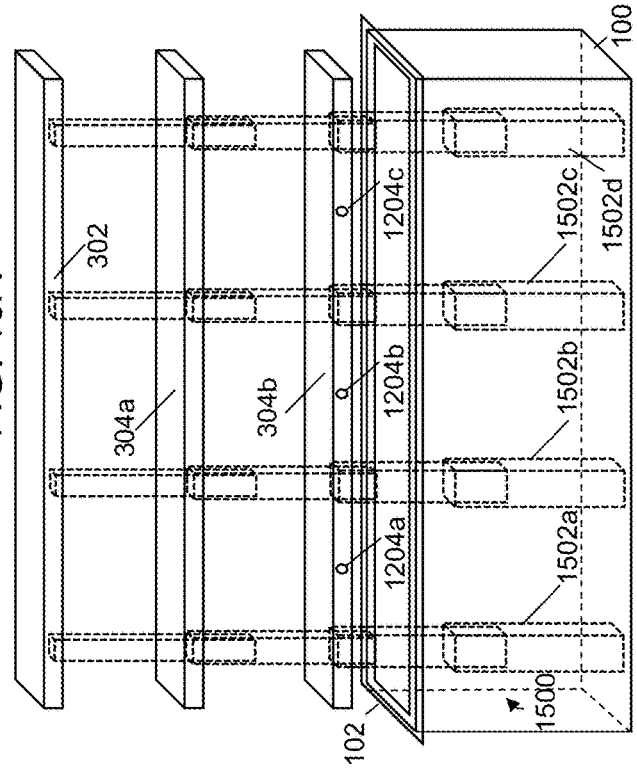

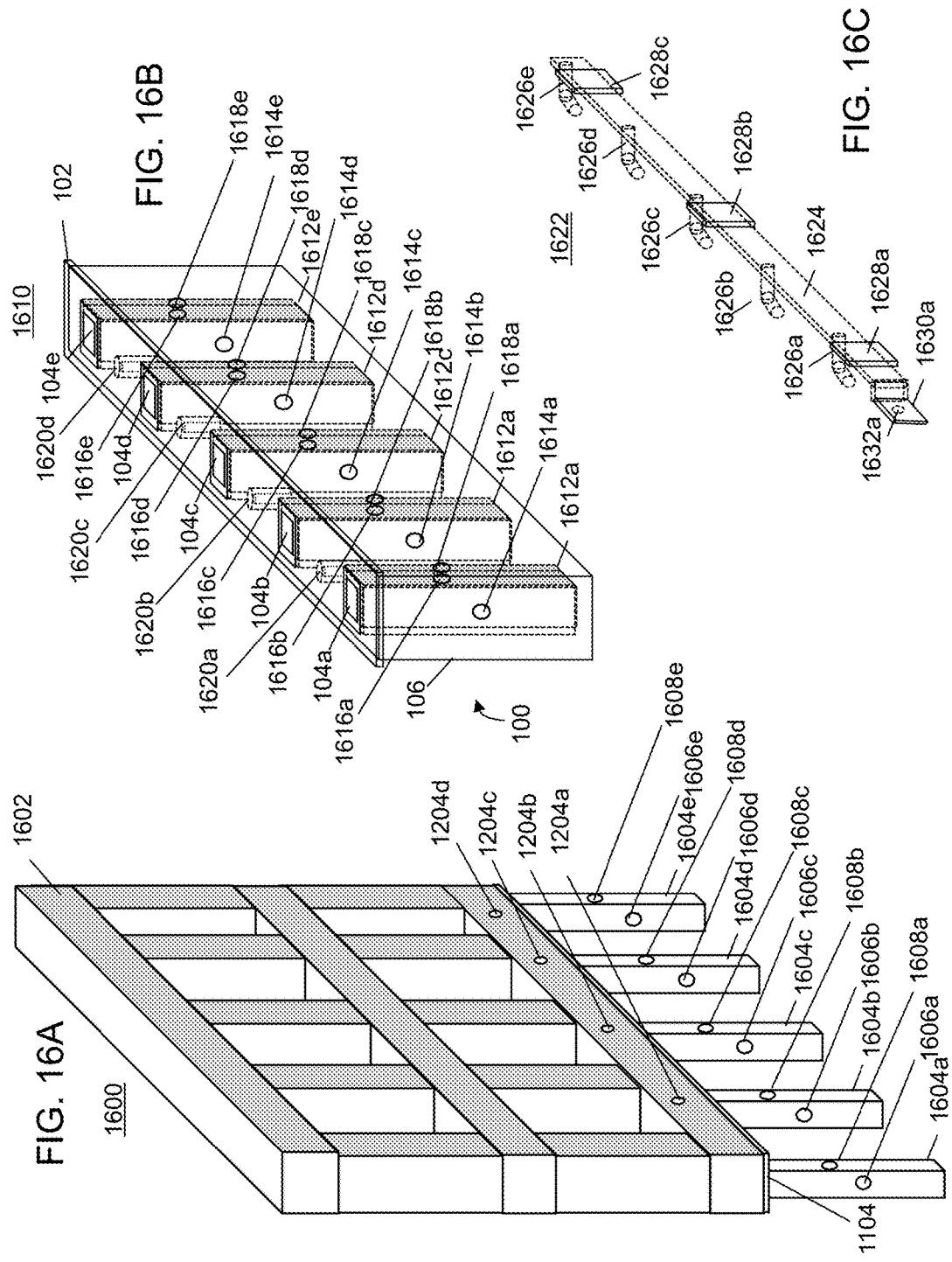

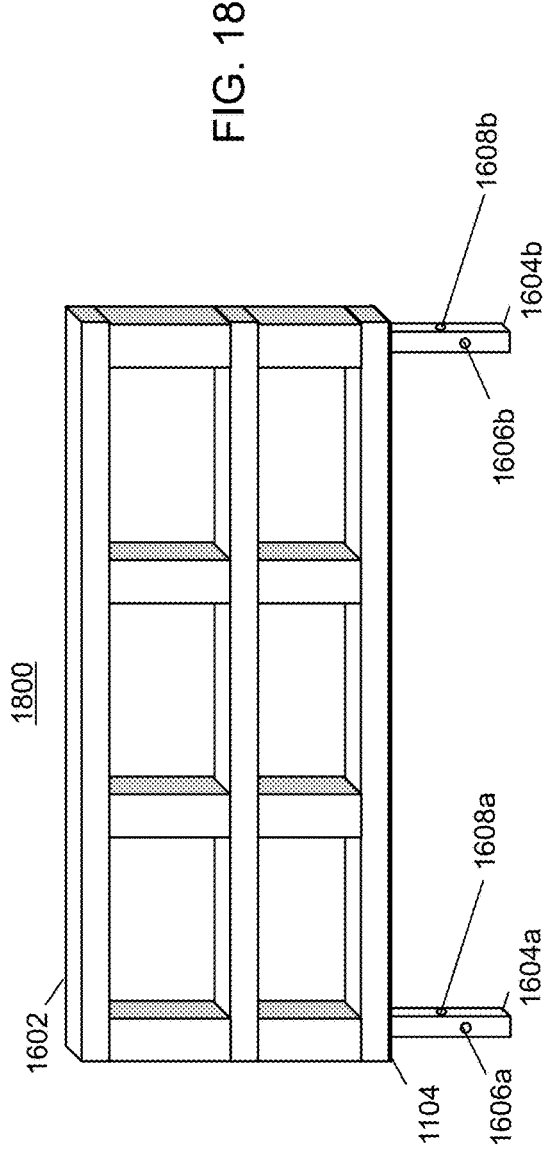
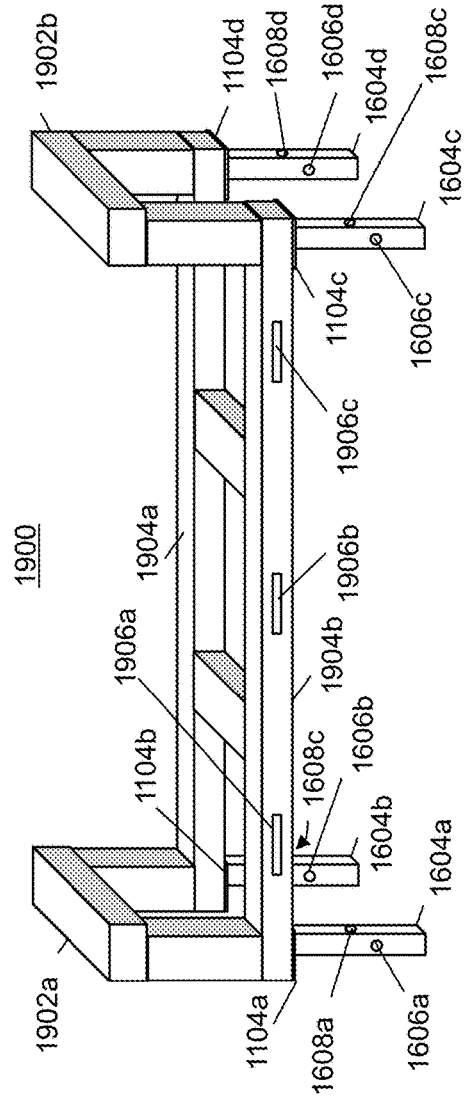

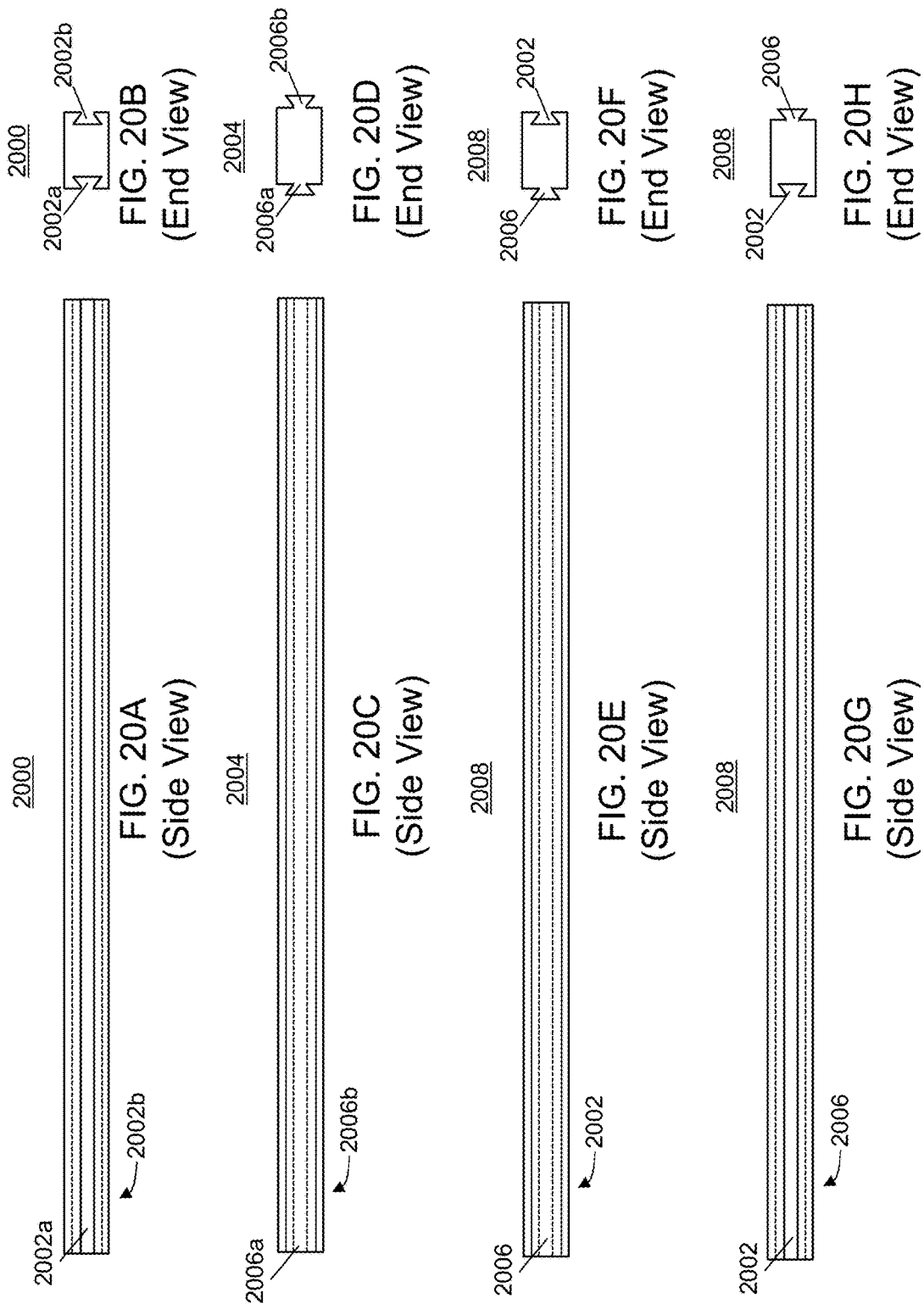

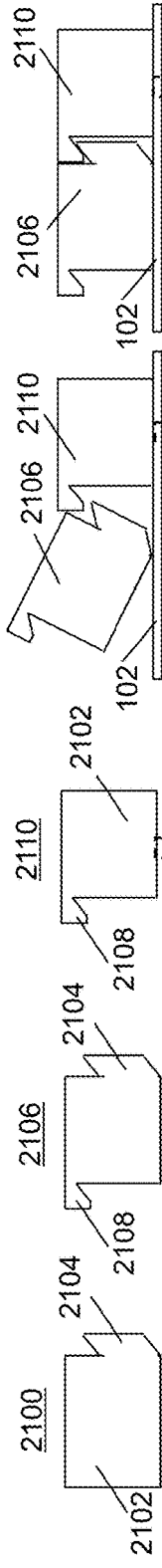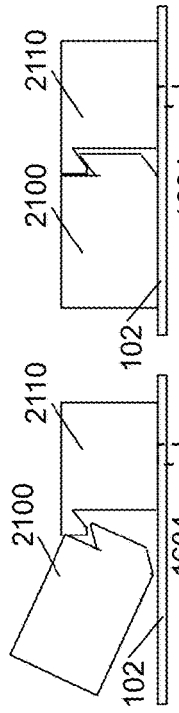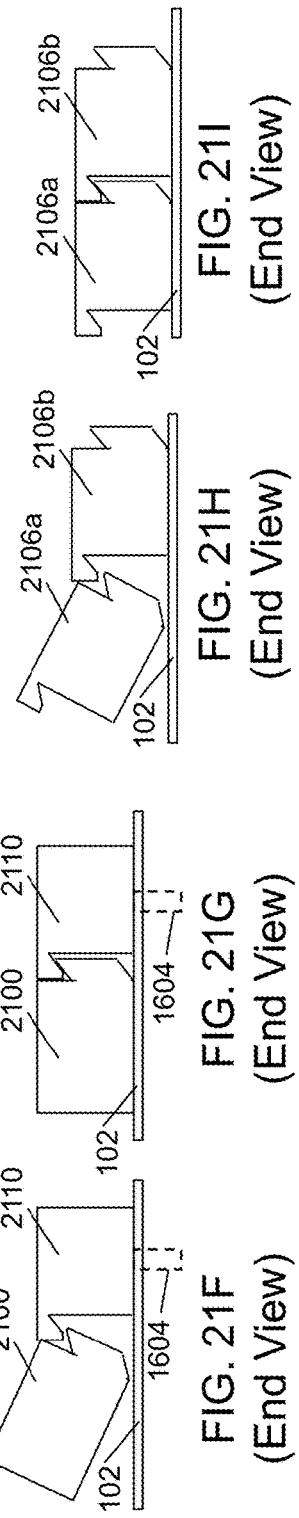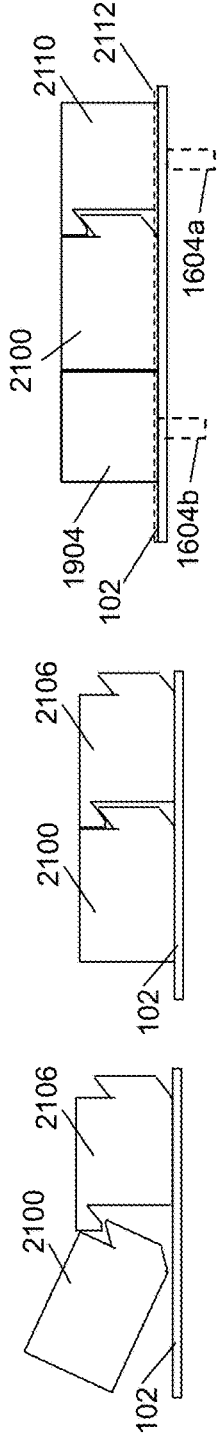

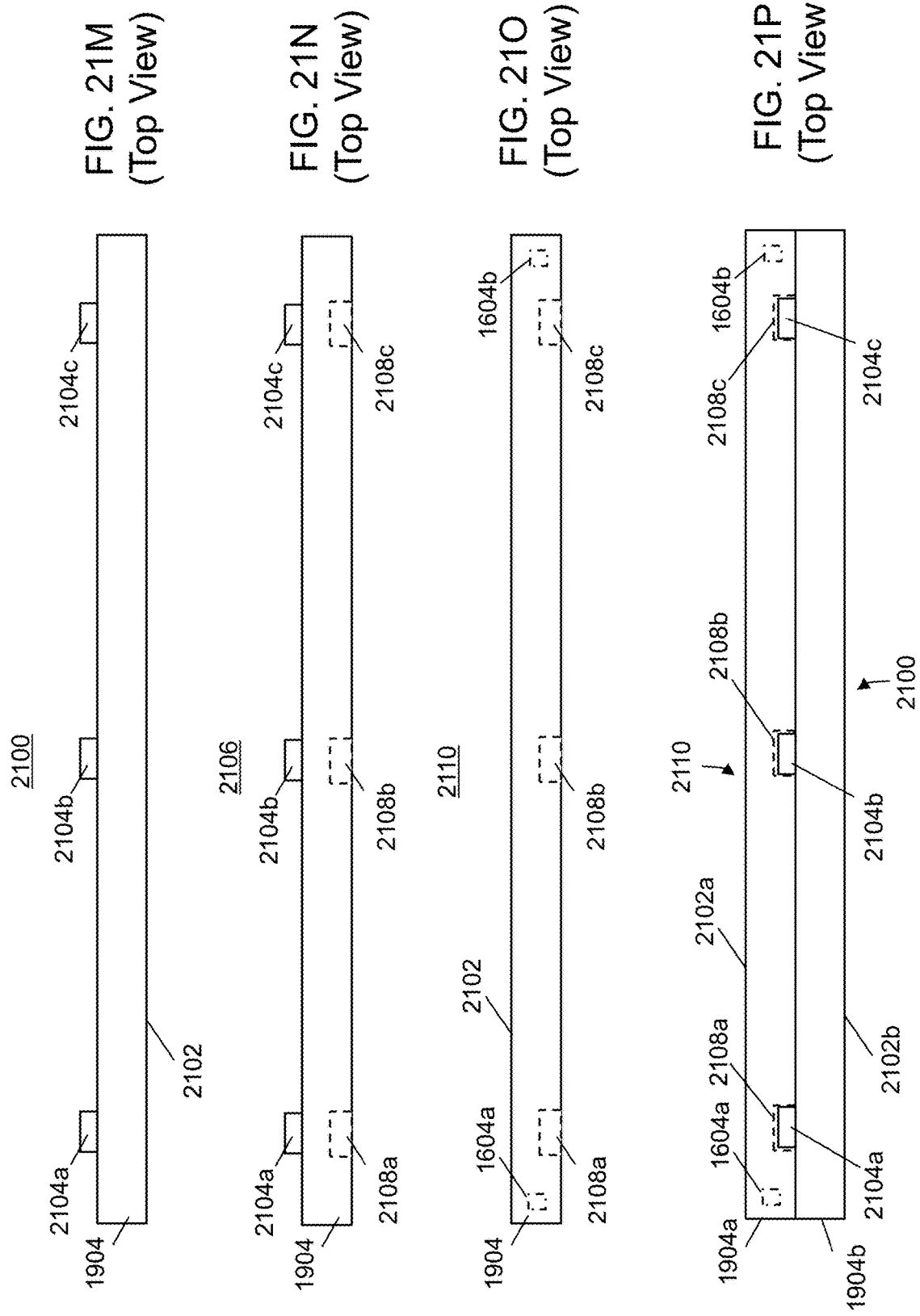

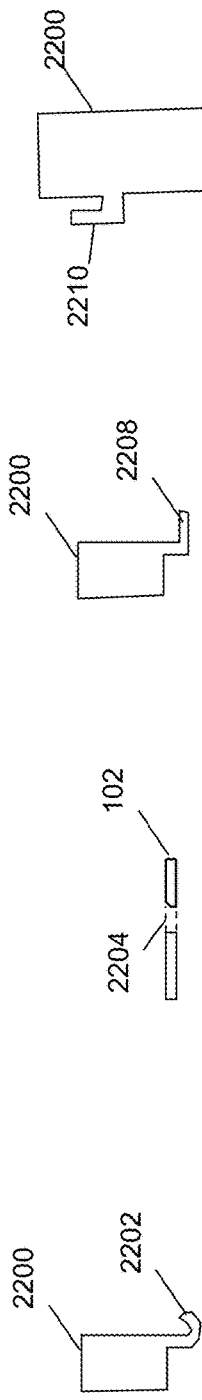
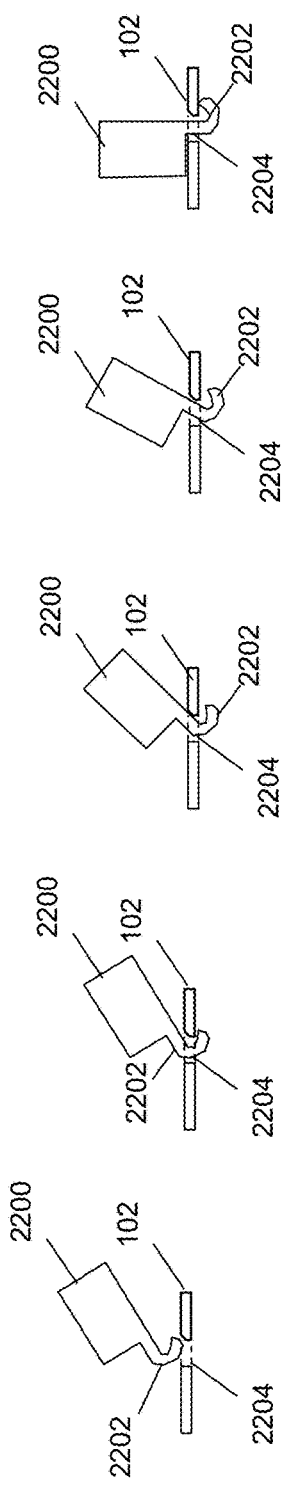
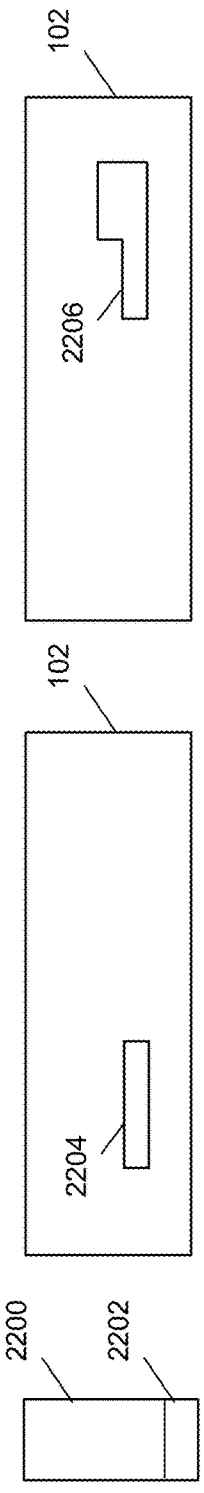

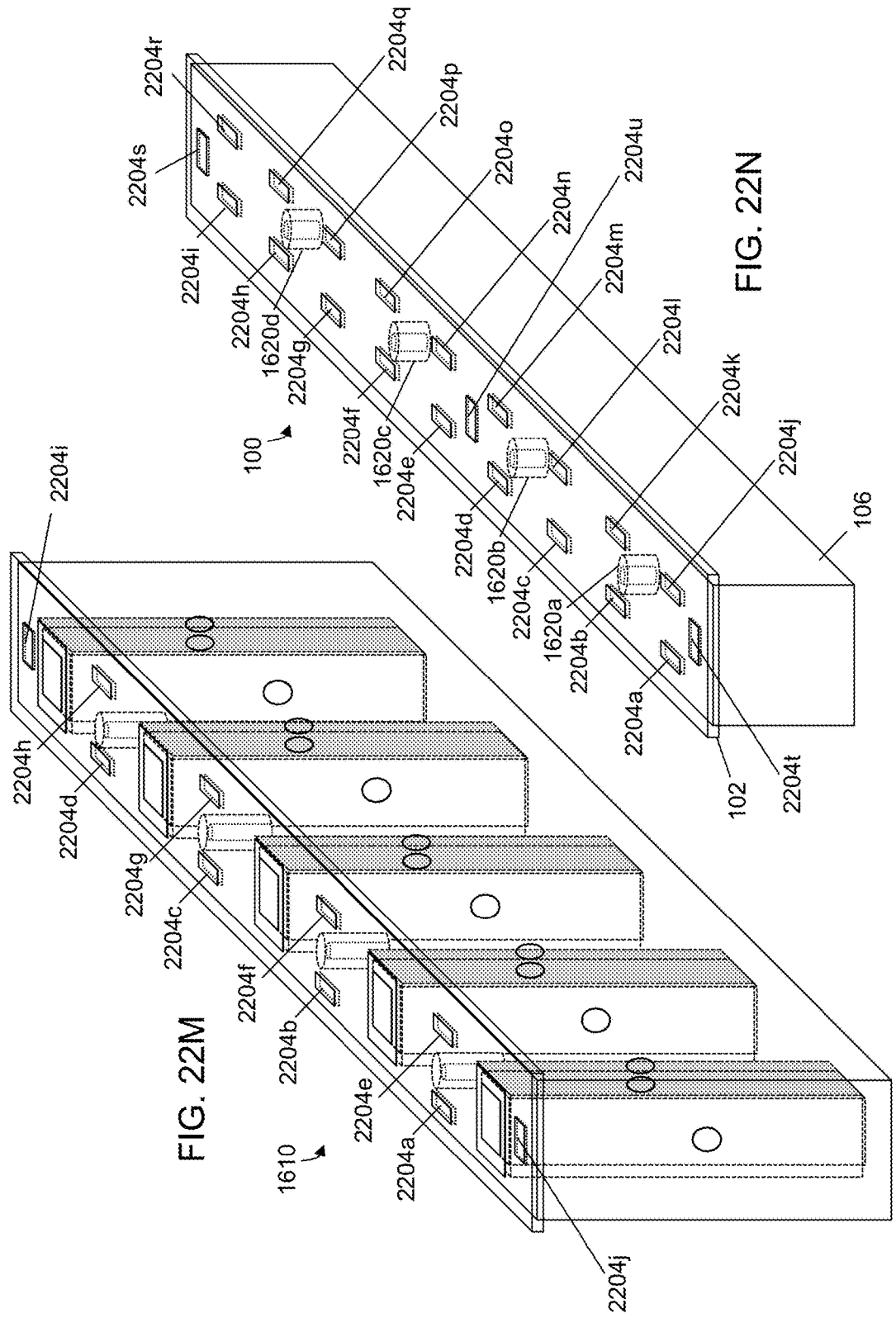

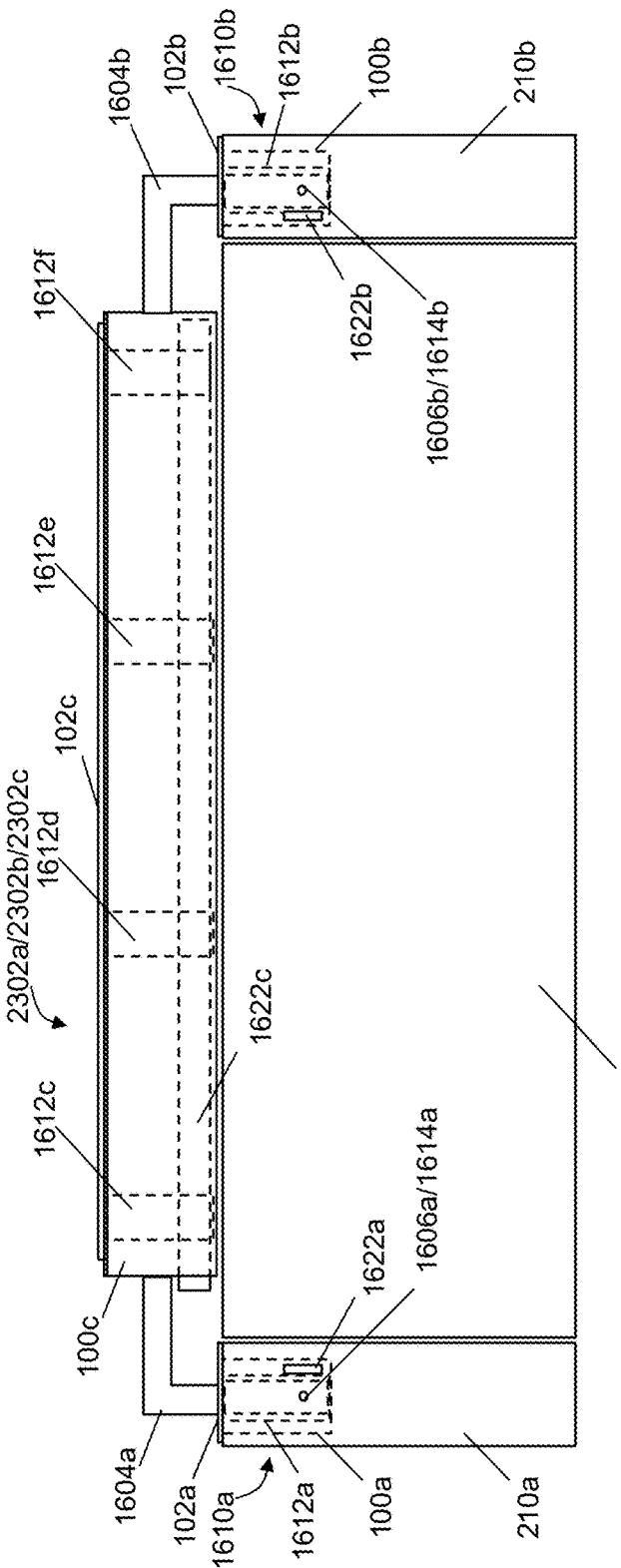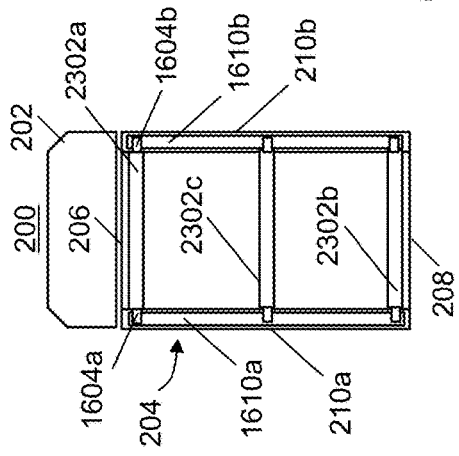
FIG. 23A (End View)
FIG. 23B (Top View)

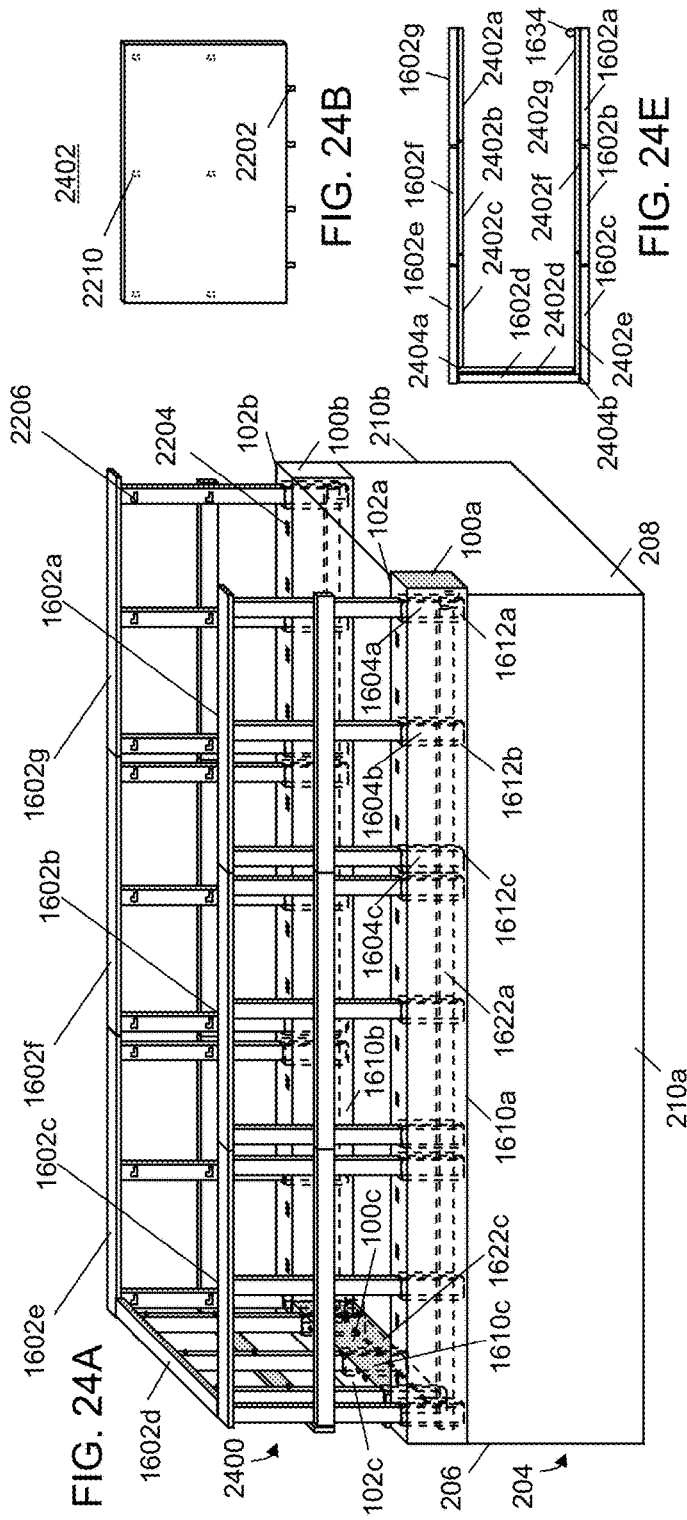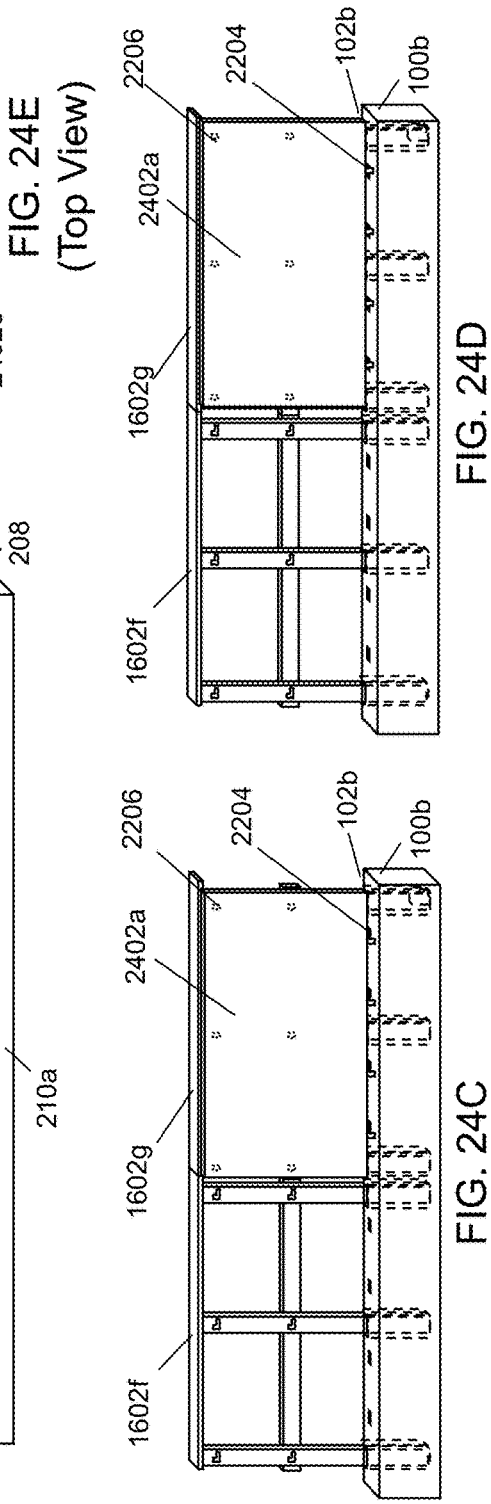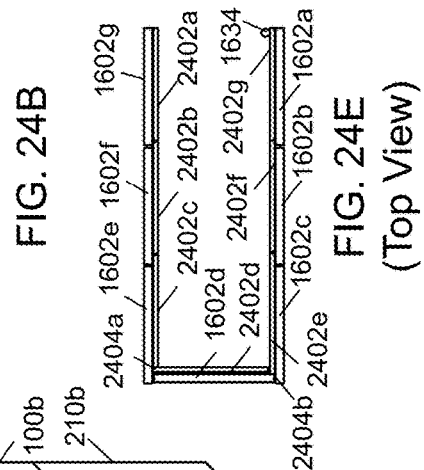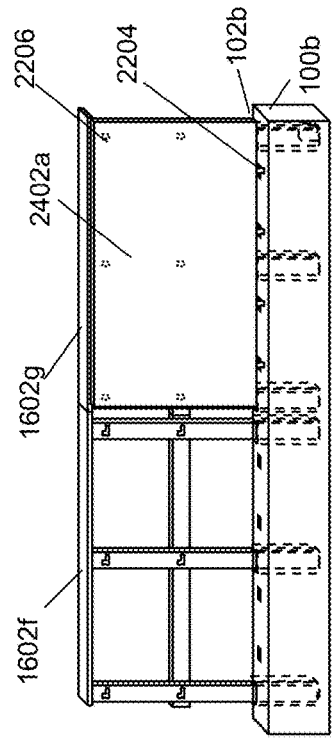

SYSTEM FOR ATTACHMENT TO A TRUCK BEDSIDE

CROSS-REFERENCE TO RELATED APPLICATIONS

This United States Non-provisional Application claims the benefit of U.S. Provisional Patent Application No. US 62/375,708, filed Aug. 16, 2016, titled "Convertible Truck Bed Rail System".

This United States Non-provisional Patent Application also claims the benefit of U.S. Provisional Patent Application No. US 62/478,918, filed Mar. 30, 2017, titled "Convertible Truck Bed Rail System".

These patent applications are each incorporated by reference herein in their entirety.

FIELD OF THE INVENTION

The present invention relates generally to a system for attachment of one or more objects to a truck bedside. More particularly, the present invention relates to an interface system that enables male connector tubes of one or more objects to be inserted inside female connector tubes integrated into the bedside of a truck and secured to the female connector tubes using a locking bar assembly.

BACKGROUND OF THE INVENTION

Truck racks, or truck rail systems, are often homemade consisting of bars or boards attached to posts that fit into the sockets provided in certain truck beds. When not used the racks are removed from the sockets and stored. Such racks are typically very heavy making them difficult for a single person to install.

Certain prior art permanently arranged truck racks have hinged posts which can be either folded inwardly to reduce the size of the rack by disposing the inner portion of the rack inside a truck bed such as disclosed in U.S. Pat. No. 2,224,126, or folded outwardly to provide a lateral platform such as is disclosed in U.S. Pat. No. 2,856,225, where the racks remain visible.

U.S. Pat. No. 3,460,864 discloses a collapsible truck rack including a series of sets of parallel bars, connected together by a parallel motion mechanism in the form of pivotable links and mounted in a series of vertical posts which are hinged so that in a collapsed condition the posts fold longitudinally over the collapsed set of bars. The collapsible truck rack and its many moveable parts are subject to erosion due to water, dirt, and the like.

U.S. Pat. No. 5,692,792 describe a removable rack system that includes a plurality of vertical support poles that fit into the sockets of truck beds and numerous parts that must be removably secured to the support poles and to each other. The system is generally unsightly and not easily convertible.

U.S. Pat. No. 6,332,637 discloses a rack for securing cargo to a vehicle that includes first and second base rails attached to the top of the sides of the bed of a truck and first and second collapsible posts having first and second hinged ends and first and second slide ends where the base rails fold together when the rack is not in use but can be raised within seconds to convert to a cargo carrying position. The rack and its moveable parts are subject to erosion due to water, dirt, and the like and the rack remains visible when not in use.

U.S. Pat. No. 6,634,689 discloses retractable truck cargo support walls having horizontal members having hollow interior spaces to receive vertical members and other horizontal members to stack the horizontal members with a low profile on the sides of the truck in a retracted position. The rack and its moveable parts are subject to erosion due to water, dirt, and the like and the rack remains visible when not in use.

There is a need for an improved truck rail system.

SUMMARY OF THE INVENTION

Briefly, the present invention is an interface system for attachment of one or more objects to a truck bedside having a top portion above a wheel well. The interface system includes a top plate, a plurality of female connector tubes, and a locking bar assembly. The top plate is integrated with the top portion of the bedside. The top plate has a plurality of first openings and a bottom portion. The plurality of female connector tubes has a plurality of second openings for receiving a plurality of male connector tubes. The plurality of female connector tubes are attached to the bottom of the top plate and extend beneath the bottom portion of the top plate into a volume between the top portion of the bedside and the wheel well. The plurality of first openings align with the plurality of second openings enabling a plurality of male connector tubes attached to the one or more objects to be inserted into the plurality of female connector tubes. The plurality of female connector tubes have a plurality of first locking holes that align with a plurality of second locking holes in the plurality of male connector tubes when the plurality of male connector tubes are inserted into the plurality of female connector tubes. The locking bar assembly includes a locking bar having a plurality of locking pins and a plurality of bar guides. The locking bar is able to slide back and forth inside the plurality of bar guides between an unlocked position where the locking pins are positioned outside the plurality of first locking holes and a locked position where the locking pins are positioned inside the plurality of first locking holes. The locking bar assembly is capable of being locked in the locked position by a locking mechanism.

When the male connector tubes are inserted inside the plurality of female connector tubes and the locking bar assembly is in the locked position the locking pins can also be positioned inside the plurality of second locking holes.

The top portion of the bedside may include the top plate.

At least one bolt attachment hole can be in at least one female connector tube of the plurality of female connector tubes and at least one complementary bolt attachment hole can be in at least one male connector tube of the plurality of male connector tubes to enable at least one bolt to be inserted into the at least one bolt attachment hole and the at least one complementary bolt attachment hole.

A container can be integrated with one of the bedside or the top plate such that the plurality of female connector tubes is inside the container.

The container can include an access panel.

A portion of the locking bar can extend out of the container enabling the locking bar assembly to be locked in the locked position by a locking mechanism that is outside the container.

The container can have at least one bolt attachment hole that aligns with at least one first complementary bolt attachment hole in at least one female connector tube of the plurality of female connector tubes and aligns with at least one second complementary bolt attachment hole in at least one male connector tube the plurality of male connector tubes enabling at least one bolt to be inserted into the at least one bolt attachment hole, the at least one first complementary bolt attachment hole, and the at least one second complementary bolt attachment hole.

The container may have at least one drain hole.

The interface system may include a cover configured to cover the top plate, the cover being movable between a closed cover position where the cover covers the top plate and prevents the plurality of male connector tubes from being inserted into the female connector tubes and an open cover position where the plurality of male connector tubes can be inserted into the female connector tubes.

The interface system can include a hinge that attaches the cover to the top plate, the hinge enabling the cover to rotate between the closed cover position and the open cover position.

The interface system can include a gasket that provides a seal between the cover and the top plate when the cover is in the closed cover position.

The interface system can include one or more threaded handles, wherein the one or more threaded handles can screw into corresponding one or more threaded cover attachment holes in the top cover in order to secure the cover in the closed cover position.

At least one of the plurality of female connector tubes or at least one of the male connector tubes can be a rectangular connector tube.

The one or more objects may include at least one object interface assembly including an object attachment plate to which at least one of the plurality of male connector tubes is attached, the object attachment plate including at least one object attachment hole that can be used to attach at least one second object to the object interface assembly.

The interface system can include a second interface system for attaching one or more objects to a second truck bedside that is opposite the truck bedside, where the second interface includes a second top plate, a second plurality of female connector tubes, and a second locking bar assembly.

The one or more objects can be attachable to the interface system and the second interface system.

The one or more objects may include a rail subsystem.

The one or more objects may include a platform.

The one or more objects may include a plurality of interlocking components.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 1A depicts a top view of an exemplary container in accordance with the invention;

FIG. 1B depicts a side view of the exemplary container of FIG. 1A;

FIG. 1C depicts an end view of the exemplary container of FIGS. 1A and 1B;

FIG. 1D depicts an oblique projection of the exemplary container of FIGS. 1A-1C;

FIG. 1E depicts an oblique projection of an exemplary top plate of the exemplary container of FIGS. 1A-1D;

FIG. 1F depicts an oblique projection of an alternative exemplary top plate of the exemplary container of FIGS. 1A-1D;

FIG. 1G depicts an oblique projection of a bottom portion of the exemplary container of FIGS. 1A-1D with an optional access panel;

FIG. 2B depicts an oblique projection of an exemplary left bedside of a truck;

FIG. 2C depicts the same oblique projection of the exemplary left bedside of FIG. 2B where dashed lines indicate a volume where an exemplary container can be placed;

FIG. 2D depicts a side view of the left bedside of FIGS. 2B and 2C and the exemplary container having been installed into the bedside;

FIG. 3A depicts a side view of an exemplary foldable rail assembly in accordance with the invention;

FIG. 3B depicts a side view of an exemplary top rail of the foldable rail assembly of FIG. 3A;

FIG. 3C depicts an oblique projection of an exemplary vertical rail of the foldable rail assembly of FIG. 3A;

FIG. 3D depicts an oblique projection of an exemplary horizontal rail of the foldable rail assembly of FIG. 3A;

FIG. 3E depicts an oblique projection of an exemplary bracket of the foldable rail assembly of FIG. 3A;

FIG. 3F depicts an oblique projection of an exemplary threaded female connector of the foldable rail assembly of FIG. 3A;

FIG. 3G depicts an oblique projection of an exemplary threaded male connector of the foldable rail assembly of FIG. 3A;

FIG. 3H depicts an oblique projection of an exemplary optional anti-friction sleeve of the foldable rail assembly of FIG. 3A;

FIG. 3I depicts a side view of an exemplary washer of the foldable rail assembly of FIG. 3A;

FIG. 3J depicts a side view of an exemplary vertical rail and bracket connection assembly in accordance with the invention;

FIG. 3K depicts a side view of a first exemplary horizontal rail and vertical rail connection assembly in accordance with the invention;

FIG. 3L depicts a side view of a second exemplary horizontal rail and vertical rail connection assembly in accordance with the invention;

FIG. 4A depicts a top view of exemplary first and second foldable rail assemblies installed in the container of FIGS. 1A-1F;

FIG. 4B depicts a side view of the exemplary container of FIGS. 1A-1F with exemplary first and second foldable rail assemblies installed within the container as indicated by dashed lines;

FIG. 5A depicts a side view of a top plate of the exemplary container of FIGS. 1A-1F;

FIG. 5B depicts a top view of a top plate of the exemplary container of FIGS. 1A-1F;

FIG. 5C depicts a side view of an exemplary first sealing component;

FIG. 5D depicts a top view of the first sealing component of FIG. 5C;

FIG. 5E depicts a side view of an exemplary second sealing component;

FIG. 5F depicts top views of two of the second sealing components of FIG. 5E oriented to face each other;

FIG. 5G depicts a side view of an exemplary sealing component assembly placed onto the top plate of the exemplary container shown in FIG. 5A;

FIG. 5H depicts a top view of the exemplary sealing component assembly of FIG. 5G placed onto the top plate of an exemplary container shown in FIG. 5A;

FIG. 6A depicts a top view of another exemplary vertical rail in accordance with the invention;

FIG. 6B depicts a side view of the vertical rail of FIG. 6A;

FIG. 6C depicts an end view of the vertical rail of FIGS. 6A and 6B;

FIG. 6D depicts a side view of the vertical rail of FIGS. 6A-6C attached to a horizontal rail with the vertical rail in the fully extended up position;

FIG. 6E depicts side view of the vertical rail and horizontal rail of FIG. 6D with the vertical rail in a folded position;

FIG. 6F depicts a side view of yet another exemplary vertical rail in accordance with the invention attached to a horizontal rail with the vertical rail in the fully extended up position;

FIG. 6G depicts a side view of the vertical rail and horizontal rail of FIG. 6F with the vertical rail in a folded position;

FIG. 7A depicts an oblique projection of another exemplary horizontal rail in accordance with the invention where a vertical rail in the fully extended up position is shown having been inserted into a rectangular slot in the horizontal rail;

FIG. 7B depicts an oblique projection of the exemplary horizontal rail of FIG. 7B with the vertical rail shown in a folded position;

FIG. 7C depicts an oblique projection of yet another exemplary horizontal rail in accordance with the invention where a vertical rail in the fully extended up position is shown having been inserted into an angled slot in the horizontal rail;

FIG. 7D depicts an oblique projection of the exemplary horizontal rail of FIG. 7C with the vertical rail shown in a folded position;

FIG. 8A depicts a side view of an exemplary foldable rail assembly in a fully extended 'up' position;

FIG. 8B depicts a side view of the foldable rail assembly of FIG. 7B in a partially extended position between an 'up' position and a 'down' position;

FIG. 8C depicts a side view of the foldable rail assembly of FIG. 8A in a 'down' position;

FIG. 8D depicts the exemplary foldable rail assembly of FIGS. 8A-8C in the three positions shown in FIGS. 8A-8C;

FIG. 9A depicts a side view of another exemplary foldable rail assembly in a fully extended 'up' position;

FIG. 9B depicts a side view of the foldable rail assembly of FIG. 9A in a partially extended position between an 'up' position and a 'down' position;

FIG. 9C depicts a side view of the foldable rail assembly of FIG. 9A in a 'down' position;

FIG. 9D depicts the exemplary foldable rail assembly of FIGS. 9A-9C in the three positions shown in FIGS. 9A-9C;

FIG. 10A depicts a first foldable rail assembly such as depicted in FIGS. 8A-8D in a down position and a second foldable rail assembly such as depicted in FIGS. 9A-9D in a down position;

FIG. 10B depicts the first foldable rail assembly of FIG. 10A in a down position and the second foldable rail assembly of FIG. 10A in a partially extended position between an up position and a down position;

FIG. 10C depicts the first foldable rail assembly of FIG. 10A in a down position and the second foldable rail assembly of FIGS. 10A in an up position;

FIG. 10D depicts the first foldable rail assembly of FIG. 10A in a partially extended position between an up position and a down position and the second foldable rail assembly of FIG. 10A in an up position;

FIG. 10E depicts the first foldable rail assembly of FIG. 10A in an up position and the second foldable rail assembly of FIG. 10A in an up position;

FIG. 11A depicts a top view of an exemplary top plate of a container in accordance with the invention having exemplary top plate holes, an exemplary top rail guide, and an exemplary sealing gasket;

FIG. 11B depicts an oblique projection of the container and exemplary top rail guide of FIG. 11A;

FIG. 11C depicts a top view of an exemplary cover in accordance with the invention;

FIG. 11D depicts a bottom view of the cover of FIG. 11C;

FIG. 11E depicts an end view of the cover of FIG. 11C;

FIG. 11F depicts an oblique projection of an exemplary handle with threaded stud in accordance with the invention;

FIG. 11G depicts a top view of the exemplary cover of FIG. 11B attached to the top plate of FIG. 11A by an exemplary hinge and exemplary handles with threaded studs used to further attach the cover to the top plate;

FIG. 12A depicts a side view of the two foldable rail assemblies shown fully extended in their up positions such as is shown in FIG. 10E and shows the optional cover attached to the container by a hinge and attached to the vertical rails of the two foldable rail assemblies using handles with threaded studs screwed into threaded holes in the cover and threaded holes in the vertical rails;

FIG. 12B depicts an oblique projection of a stop used to stop the travel of a foldable rail assembly as also shown in FIG. 12A;

FIG. 12C depicts an end view of an exemplary double vertical rail connection assembly as also shown in FIG. 12A;

FIG. 12D depicts an end view of the two folding rails assemblies as installed in the container using the double vertical rail and bracket connection assembly shown in FIG. 12C;

FIG. 12E depicts side views of the vertical rails of FIG. 12D having spacers;

FIG. 12F depicts a side view of an exemplary attachment of the cover to the vertical rails by the handle with threaded studs when using the spacers of FIG. 12F;

FIG. 13A depicts a side view of two exemplary vertical rails moving into vertical alignment where a male connector portion is shown moving into a female connector portion;

FIG. 13B depicts a side view of the two vertical rails of FIG. 13A after they are vertically aligned and the male connector portion is within the female connector portion;

FIG. 13C depicts an end view of the two vertical rails of FIG. 13B;

FIG. 14A depicts a side view of the exemplary first and second foldable rail assemblies of FIGS. 10A-10E in down positions with an optional pulley system, an optional motor, an optional control system, and an optional sensor;

FIG. 14B depicts a side view of the exemplary first and second foldable rail assemblies of FIG. 14A in partially extended positions between up and down positions;

FIG. 14C depicts a side view of the exemplary first and second foldable rail assemblies of FIGS. 14A and 14B in down positions;

FIG. 15A depicts an oblique projection of an exemplary telescoping rail assembly in the down position in accordance with the invention;

FIG. 15B depicts an oblique projection of the telescoping rail assembly of FIG. 15A in a first partially extended position;

FIG. 15C depicts an oblique projection of the telescoping rail assembly of FIG. 15A in a second partially extended position;

FIG. 15D depicts an oblique projection of the telescoping rail assembly of FIG. 15A in a third partially extended position;

FIG. 16A depicts an oblique protection of an exemplary rail assembly in accordance with the invention;

FIG. 16B depicts an oblique projection of an exemplary rail subsystem interface assembly in accordance with the invention;

FIG. 16C depicts an oblique projection of an exemplary locking bar assembly in accordance with the invention;

FIG. 18 depicts an oblique projection of an exemplary bedside-to-bedside rail assembly in accordance with the invention;

FIG. 19A depicts an oblique projection of an exemplary bedside-to-bedside crossbar with dual bedside rails assembly having accessory attachment interfaces in accordance with the invention;

FIGS. 20A and 20B depict side view and end views of an exemplary component having triangle-shaped grooves on opposing sides in accordance with the invention;

FIGS. 20C and 20D depict side view and end views of an exemplary component having triangle-shaped tongues on opposing sides in accordance with the invention;

FIGS. 20E and 20F depict side view and end views of an exemplary component having a triangle-shaped tongue on a first side and a triangle-shaped groove on a second side opposing the first side in accordance with the invention;

FIGS. 20G and 20H depict side view and end views of an exemplary component having a triangle-shaped groove on a first side and a triangle-shaped tongue on a second side opposing the first side in accordance with the invention;

FIG. 21A depicts an end view of an exemplary first interlocking component having a first side without an interlocking portion and having a second side opposite the first side that has a lower interlocking portion in accordance with the invention;

FIG. 21B depicts an end view of an exemplary second interlocking component having a first side that has an upper interlocking portion and having a second side opposite the first side that has a lower interlocking portion in accordance with the invention;

FIG. 21C depicts an end view of an exemplary third interlocking component having a first side that has an upper interlocking portion and having a second side opposite the first side without an interlocking portion in accordance with the invention;

FIG. 21D depicts an end view of the second interlocking component being moved into interlocking position with the third interlocking component in accordance with the invention;

FIG. 21E depicts an end view of the second interlocking component interlocked with the third interlocking component in accordance with the invention;

FIG. 21F depicts an end view of the first interlocking component being moved into interlocking position with the third interlocking component in accordance with the invention;

FIG. 21G depicts an end view of the first interlocking component interlocked with the third interlocking component in accordance with the invention;

FIG. 21H depicts an end view of the second interlocking component being moved into interlocking position with the another second interlocking component in accordance with the invention;

FIG. 21I depicts an end view of the second interlocking component interlocked with the another second interlocking component in accordance with the invention;

FIG. 21J depicts an end view of the first interlocking component being moved into interlocking position with the second interlocking component in accordance with the invention;

FIG. 21K depicts an end view of the first interlocking component interlocked with the second interlocking component in accordance with the invention;

FIG. 21L depicts an end view of the first interlocking component interlocked with the third interlocking component and a crossbar in accordance with the invention;

FIG. 21M depicts a top view of the first interlocking component of FIG. 21A in accordance with the invention;

FIG. 21N depicts a top view of the second interlocking component of FIG. 21B in accordance with the invention;

FIG. 21O depicts a top view of the third interlocking component of FIG. 21C in accordance with the invention;

FIG. 21P depicts a top view of the first interlocking component of FIG. 21A interlocked with the third interlocking component of FIG. 21C in accordance with the invention;

FIG. 22A depicts an end view of an exemplary miscellaneous component having an exemplary hook guide in accordance with the invention;

FIG. 22B depicts an end view of an exemplary top plate having an exemplary hook guide slot in accordance with the invention;

FIGS. 22C-22G depict end views of the placement of the hook guide associated with the miscellaneous component of FIG. 22A into the hook guide slot of the top plate of FIG. 22B in accordance with the invention;

FIGS. 22H and 22I depict front and top views of the exemplary miscellaneous component and top plate of FIGS. 22A-22G;

FIG. 22J depicts an exemplary top plate with an alternative hook guide slot in accordance with the invention;

FIG. 22K depicts an end view of another exemplary miscellaneous component having another exemplary hook guide in accordance with the invention;

FIG. 22L depicts an end view of yet another exemplary miscellaneous component having yet another exemplary hook guide in accordance with the invention;

FIG. 22M depicts exemplary hook guide slots included in the top plate of an exemplary rail subsystem interface assembly such as is depicted in FIG. 16B in accordance with the invention;

FIG. 22N depicts exemplary hook guide slots included in the top plate of an exemplary container such as is depicted in FIGS. 1A-1D in accordance with the invention;

FIGS. 23A and 23B depict end and top views of exemplary bedside-to-bedside rail subsystem interface assemblies in accordance with the invention;

FIG. 24A depicts an exemplary framework in accordance with the invention;

FIG. 24B depicts an exemplary interlocking panel in accordance with the invention;

FIG. 24C depicts hook guides of the interlocking panel of FIG. 24B having been initially engaged into hook guide slots of a rail subassembly of the framework of FIG. 24A;

FIG. 24D depicts the interlocking panel of FIG. 24B having been slid to the right such that the hook guides of the interlocked panel are interlocked with the hook guide slots of the rail assembly of the framework of FIG. 24A; and FIG. 24E depicts a top view of the framework of FIG. 24A to which seven interlocked panels have been interlocked in accordance with the invention.

DETAILED DESCRIPTION OF THE INVENTION

Figure 2A:
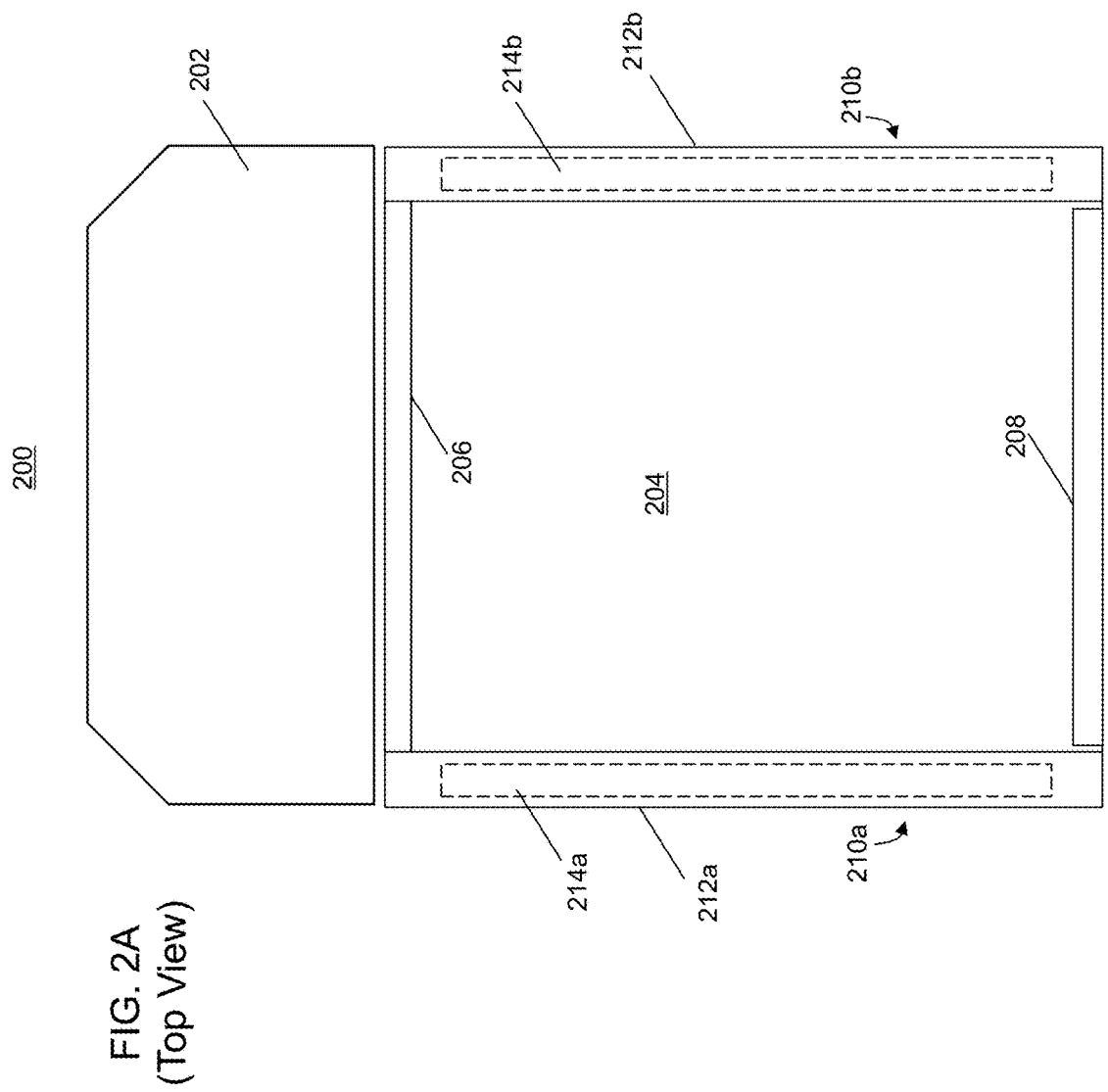
FIG. 2A depicts a top view of an exemplary truck.

In accordance with one aspect of the present invention, a convertible truck bed rail system includes a first container integrated into a first bedside of a truck within a first volume that is located between a top portion of the first bedside and a first wheel well beneath the top portion of the first bedside, the first container being accessible by opening a first cover substantially parallel to the top portion of the first bedside; and a first rail assembly that enables conversion of the first bedside from not having first visible rails to having first visible rails.

The convertible truck bed rail assembly may further comprise a second rail assembly that enables conversion of the first bedside from not having second visible rails to having second visible rails.

The convertible truck bed rail system may further include a second container integrated into a second bedside of the truck within a second volume that is located between a top portion of the second bedside and a second wheel well beneath the top portion of the second bedside, the second container being accessible by opening a second cover substantially parallel to the top portion of the second bedside; and a third rail assembly that enables conversion of the second bedside from not having third visible rails to having third visible rails.

The convertible truck bed rail system may further include a fourth rail assembly that enables conversion of the second bedside from not having fourth visible rails to having fourth visible rails.

A given cover may be sealable substantially preventing water from entering a container.

A container may be attached to a cover by a hinge and/or by one or more handles with threaded studs.

When in an open position, a given cover may be attached to a rail assembly using the one or more handles with threaded studs.

A rail assembly may be attached to a container.

A rail assembly may be foldable in a first direction from an up position where the rail assembly is extended out of a container to a down position where the rail assembly is completely inside the container.

Rail assemblies in a given container may be foldable in opposite directions.

A rail assembly may be attached to a pulley system, which may be attached to a motor that may be controlled by a control system, which may receive information from one or more sensors.

A rail assembly may include vertical rails that telescopically compress from an up position to a down position.

A rail assembly may include male connector tubes that can be inserted into female connector tubes attached to a container when a cover is in an open position and can be removed from the female connector tubes enabling the cover to be moved to a closed position.

Male connector tubes may be attached to the female connector tubes using bolts.

Male connector tubes may be attached to the female connector tubes using a locking mechanism.

A locking mechanism may include a sliding latching mechanism.

The locking mechanism may include a combination lock.

The locking mechanism may include a lock and a key.

The lock may be an electronic lock and the key may be a digital code.

A key may unlock multiple locks of multiple locking mechanisms.

Different keys may unlock different locking mechanisms.

The convertible truck bed rail system may be made of materials that do not rust such as plastic, rubber, aluminum and the like.

In accordance with another aspect of the present invention, a method for conversion of a truck from having visible rails to not having visible rails includes the steps of providing a container integrated into a bedside of the truck within a first volume that is located between a top portion of the bedside and a wheel well beneath the top portion of the bedside, the first container being accessible by opening a cover substantially parallel to the top portion of the bedside; and providing a rail assembly that enables conversion of the bedside from not having visible rails to having visible rails.

The method may further include the step of providing an additional rail assembly that enables conversion of the bedside from not having visible rails to having visible rails.

FIG. 1A depicts a top view of an exemplary container 100 in accordance with the invention. Referring to FIG. 1A, the container 100 includes a top plate 102 having at least one opening 104 and a bottom portion 106 (not shown).

FIG. 1B depicts a side view of the exemplary container 100 of FIG. 1A.

FIG. 1C depicts an end view of the exemplary container 100 of FIGS. 1A and 1B.

FIG. 1D depicts an oblique projection of the exemplary container 100 of FIGS. 1A-1C.

Referring to FIGS. 1B-1D, the top plate 102 is shown being wider and longer than the bottom portion 106 of the container 100 such that it creates what could be described as container lip. However, the top plate 102 is not required to be wider or longer than the bottom portion 106 of the container 100. Instead, the top plate could have the same width and same length or might have the same length and be wider or have the same with and be longer. The top plate could alternatively be configured to have one or more tabs that extend outward from the container. Generally, one skilled in the art will recognize that the container and top plate can be configured in various ways in order to practice the invention.

FIG. 1E depicts an oblique projection of an exemplary top plate 102 of the exemplary container 100 of FIGS. 1A-1D.

FIG. 1F depicts an oblique projection of an alternative exemplary top plate 102 of the exemplary container 100 of FIGS. 1A-1D. Referring to FIG. 1F, the top plate has two openings 104a and 104b.

A top plate 102 may be attached to the bottom portion 106 of the container 100 in conventional ways depending on the materials used for the container 100 which could be aluminum, plastic, a rubber compound, or any other desired material or materials. The top plate 102 and bottom plate 106 of the container 100 may also be combined (e.g., a one-piece molded plastic container). The top plate 102 and bottom portion 106 may be attached in various ways including using a weld joint, an adhesive, screws, nuts and bolts, and the like.

FIG. 1G depicts an oblique projection of a bottom portion 106 of the exemplary container 100 of FIGS. 1A-1D with an optional access panel 108. Referring to FIG. 106, the access panel 108 covers an exemplary opening 110 in the side of the container 100 that is indicated by the dashed lines. The access panel may be have a water tight seal (not shown), and may be attached to the container 100 using screws, bolts, Velcro, or various other ways. The access panel may also be attached to the container 100 using a hinge (not shown). The bottom of the bottom portion 106 of the container 100 may include optional drain holes (not shown) to allow any water that gets into the container to drain out of the container 100 and one or more sides of the bottom of the bottom portion 106 of the container 100 may include optional vent holes (not shown) to allow air to enter and escape the container 100. Under one arrangement, vent holes can be located on the side of the container 100 opposite the side where the optional access panel 108 is located in order to limit the ability of water to enter the container during washing of the truck. A given container 100 may also have more than one access panel 108.

FIG. 2A depicts a top view of an exemplary truck 200. Referring to FIG. 2A, the truck 200 includes a cab 202 and a bed 204. The bed 204 of the truck 200 has a front panel 206, a tail gate 208, a left bedside 210a and a right bedside 210b. A top portion 212a of the left bedside 210a is shown having a first cutout 214a and a top portion of 212b of the right bedside 210b is shown having a second cutout 214b. The first and second cutouts may, for example, be created using a sawing device after the truck has been manufactured as part of an aftermarket installation of two containers 100a and 100b. Moreover, the left bedside 210a could have more than one cutout 214a and/or the right bedside 210b could have more than one cutout 214b.

FIG. 2B depicts an oblique projection of an exemplary left bedside 210a of a truck including a top portion 212a and a wheel well 218 and shows an exemplary cutout 214a in the top portion 212a and a volume 216 that is beneath the top portion 212a and above the wheel well 218. One skilled in the art will understand that the volume 216 has a length L, width W, and depth D, which determine size limitations of various components of the invention including their length, width, thickness, etc.

FIG. 2C depicts the same oblique projection of the exemplary left bedside 210a of FIG. 2B where dashed lines indicate the location of an exemplary container 100 placed into the cutout 214b of the top portion 212a of the left bedside 210a such that the container 100 extends into the volume 216.

FIG. 2D depicts a side view of the left bedside 210a of FIGS. 2B and 2C and the exemplary container 100 having been installed into the bedside 210a by lowering the container into the cutout 214a of the top portion 212a of the left bedside 210a. Referring to FIG. 2D, the top plate 102 is shown having a lip that extends beyond the cutout 214a, which enables the top plate to be attached to the top portion 212a of the truck using a welding technique, using an adhesive, or using attachment devices such as screws, rivets, or the like. A gasket (not shown) may be used between the lip and the top portion 212a of the bedside. Alternatively, the container 100 could be installed by bring the container up from the bottom of the top portion 212a of the right bedside 210a such that the lip of the container is attached below the bottom of the top portion 212a, for example, using a welding technique, etc. If the top plate 102 does not have a lip, then the container can be installed from above or below the top portion 212a such that edges of the top plate 102 and cutout 214b are joined via welding, an adhesive, or some other method. One skilled in the art will recognize that the bedside 210a could alternatively be manufactured to have a container 100 in the volume 216 of the bedside 210a, where the container 100 could be part of the bedside 210b (i.e., they are one piece). Moreover, the left bedside 210a could have more than one container 100 corresponding to more than one cutouts 214a and/or the right bedside 210b could have more than one container 100 corresponding to more than one cutout 214b. One skilled in the art will understand that the description provided above regarding the installation of a container in the left bedside 210a is generally applicable to the installation of a container in the right bedside 210b.

FIG. 3A depicts a side view of an exemplary foldable rail assembly 300 in accordance with the invention where the assembly 300 is partially folded downward from its fully extended 'up position. Referring to FIG. 3A, the assembly 300 includes a top rail 302, three vertical rails 304a-304c, and a horizontal rail 308. The three vertical rails 304a-304c are pivotably attached to the top rail 302 using brackets 310a-310c, threaded female connectors 312a-312c, and threaded male connectors 314a-314c (not shown) and are pivotably attached to the bottom of the container using brackets 310d-310f, threaded female connectors 312d-312f, and threaded male connectors 314d-314f (not shown). The three vertical rails 304a-304c are also pivotably attached to the horizontal rail 308 using threaded female connectors 312g-312i and threaded male connectors 314g-314i (not shown).

FIG. 3B depicts a side view of an exemplary top rail 302 of the foldable rail assembly 300 of FIG. 3A. Typically, the top rail 302 is the widest component of a foldable rail assembly 300.

FIG. 3C depicts an oblique projection of an exemplary vertical rail 304 of the foldable rail assembly 300 of FIG. 3A. Referring to FIG. 3C, the vertical rail 304 as shown includes three attachment holes 306a-306c for pivotable attachment to the top rail, to the container, and to a horizontal rail 308. For each additional horizontal rail 304 used in a given foldable rail assembly 300 the vertical rail will have an additional attachment hole 306 (e.g., two horizontal rails requires a total of four holes). As shown, a vertical rail 304 may be narrow and may have rounded ends.

FIG. 3D depicts an oblique projection of an exemplary horizontal rail 308 of the foldable rail assembly 300 of FIG. 3A. Referring to FIG. 3A, the horizontal rail 308 resembles a vertical rail 304 except the spacing between adjacent holes corresponds to the spacing between the brackets 310 attaching the vertical rails 304 to the top rail 302 and to the container 106 instead of the spacing between the brackets 310a-310c attached to the top rail 304 and horizontal rail 308 and between the horizontal rail 308 and the brackets 310d-310f attached to the bottom of the container. As shown, the horizontal rail 308 is shown being in front of the vertical rails 304a-304c. Alternatively, the horizontal rail 308 could be behind the vertical rails 304a-304c or a first horizontal rail 308a could be in front of the verticals rails 304a-304c and a second horizontal rail 308b could be behind the vertical rails 304a-304c.

FIG. 3E depicts an oblique projection of an exemplary bracket 310 of the foldable rail assembly 300 of FIG. 3A. Referring to FIG. 3E, the bracket 310 is 'U' shaped with attachment holes 306 in each side of the bracket. One skilled in the art will recognize that various types of brackets 310 could be used other than on that is "U" shaped.

FIG. 3F depicts an oblique projection of an exemplary threaded female connector 312 of the foldable rail assembly 300 of FIG. 3A for placement into an attachment hole 306.

FIG. 3G depicts an oblique projection of an exemplary threaded male connector 314 of the foldable rail assembly 300 of FIG. 3A for placement into a threaded female connector 312.

FIG. 3H depicts an oblique projection of an exemplary optional anti-friction sleeve 316 of the rail assembly of FIG. 3A having a sleeve hole 318. Referring to FIG. 3H, an anti-friction sleeve 316 can be sized to fit into attachment holes 306 of brackets 310 and vertical rails 304 in which case a threaded female connector 312 can be sized to fit into a sleeve hole 318.

FIG. 3I depicts a side view of an exemplary washer 320 of the foldable rail assembly 300 of FIG. 3A having a washer hole. Referring to FIG. 3I, the washer hole 322 can be sized to fit around an anti-friction sleeve 316 or sized to fit around a threaded female connector 312 but generally has a diameter about the same or slightly larger than the diameter of a corresponding attachment hole 306. A washer 320 may be plastic, or rubber, aluminum, or some other material, which may be an anti-friction material.

FIG. 3J depicts a side view of an exemplary vertical rail and bracket connection assembly 324 in accordance with the invention. Referring to FIG. 3J, the vertical rail and bracket connection assembly 324 includes a vertical rail 304 and a bracket 310 where their respective attachment holes are in alignment. An anti-friction sleeve 316 is shown extending across the bracket. A threaded female connector 312 is shown being placed inside the anti-friction sleeve 316 and a threaded male connector 314 is shown having been threaded into the threaded female connector 312. Washers 320a and 320b are on each side of the vertical rail 304 between the sides of the vertical rail 304 and the bracket 310.

FIG. 3K depicts a side view of a first exemplary single horizontal rail and vertical rail connection assembly 326 in accordance with the invention. Referring to FIG. 3K, the single horizontal rail and vertical rail connection assembly includes a horizontal rail 308 and vertical rail 304 separated by a washer 320, where their respective attachment holes are in alignment. An anti-friction sleeve 316 is shown extending through the two rails 304 and 308. A threaded female connector 312 is shown being placed inside the anti-friction sleeve 316 and a threaded male connector 314 is shown having been threaded into the threaded female connector 312.

FIG. 3L depicts a side view of a second exemplary dual horizontal rail and vertical rail connection assembly 328 in accordance with the invention. Referring to FIG. 3L, the dual horizontal rail and vertical rail connection assembly 328 includes first and second horizontal rails 308a and 308b on each side of a vertical rail 304 where washers 320a and 320b are between the horizontal rails 308a and 308b and the vertical rail 304. An anti-friction sleeve 316 is shown extending through the rails 308a, 304, and 308b. A threaded female connector 312 is shown being placed inside the anti-friction sleeve 316 and a threaded male connector 314 is shown having been threaded into the threaded female connector 312. One skilled in the art will understand that alternatively, two or more vertical rails 304 could be attached to a single horizontal rail.

FIG. 4A depicts a top view of exemplary first and second foldable rail assemblies 300a and 300b installed in the exemplary container 100 of FIGS. 1A-1F. Referring to FIG. 4A, the first foldable rail assembly 300a, which folds left-to-right from a down position to an up position, is shown in its down position inside a first opening 104a of the container 100 and the second foldable rail assembly 300b, which folds right-to-left from a down position to an up position, is shown in its down position inside a second opening 104b of the container 100

FIG. 4B depicts a side view of the exemplary container 100 of FIGS. 1A-1F with exemplary first and second foldable rail assemblies 300a and 300b installed within the container 100 as indicated by dashed lines. Referring to FIG. 4B, the first foldable rail assembly 300a is shown being behind the second foldable rail assembly 300b. However, the locations of the two foldable rail assemblies 300a and 300b within the container 100 could be reversed. Moreover, three or more foldable rail assemblies could be used instead of two, which could be arranged in any of the possible location combinations.

FIG. 5A depicts a side view of a top plate 102 of the exemplary container 100 of FIGS. 1A-1F.

FIG. 5B depicts a top view of a top plate 102 of the exemplary container 100 of FIGS. 1A-1F.

FIG. 5C depicts a side view of an exemplary first sealing component 500. Referring to FIG. 5C, the first sealing component 500 includes an attachment portion 502 and a two-sided sealing portion 504 where a first side of the two-sided sealing portion 504 is configured to at least partially span the first opening 104a of the top plate 102 and a second side of the two-sided sealing portion 504 is configure to at least partially span the second opening 104b of the top plate 102.

FIG. 5D depicts a top view of the first sealing component 500 of FIG. 5C.

FIG. 5E depicts a side view of an exemplary second sealing component 506. Referring to FIG. 5E, the second sealing component 506 includes an attachment portion 502 and a one-sided sealing portion 508 configured to at least partially span one of the first opening 104a of the top plate 102 or the second opening 104b of the top plate 102.

FIG. 5F depicts top views of two of the second sealing components 506a and 506b of FIG. 5E oriented to face each other. Referring to FIG. 5F, a first one of the second sealing components 506a faces left-to-right such that its attachment portion 502 can be attached to the left side of the top plate 102 so that its one-sided sealing portion 508 at least partially spans the first opening 104a of the top plate 102. The second one of the second sealing components 506b faces right-to-left such that its attachment portion 502 can be attached to the right side of the top plate 102 so that its one-sided sealing portion 508 at least partially spans the second opening 104b of the top plate 102.

FIG. 5G depicts a side view of an exemplary sealing component assembly 510 placed onto the top plate of the exemplary container shown in FIG. 5A. Referring to FIG. 5G, the sealing component assembly 510 includes the two second sealing components 506a and 506b attached to the left and right sides of the top plate 102 and the first sealing component 500 attached to the center of the top plate 102 such that the sealing portions 508 of the first sealing component 500 overlap the sealing portions 508 of the two second sealing components 506a and 506b. As such, the sealing component assembly 510 is configured to substantially seal the two openings 104a and 104b when the two foldable rail assemblies 300a and 300b of FIGS. 4A and 4B are in their down positions and to provide a substantial seal against vertical rails 304 of the two foldable rail assemblies 300a and 300b when the two foldable rail assemblies 300a and 300b are in their up positions.

FIG. 5H depicts a top view of the exemplary sealing component assembly 510 of FIG. 5G placed onto the top plate 102 of an exemplary container 100 shown in FIG. 5A.

FIG. 6A depicts a top view of another exemplary vertical rail 304 in accordance with the invention. Referring to FIG. 6A, the exemplary vertical rail 394 has two end attachment portions 602a and 602b for attachment to bracket connection assemblies 324 associated with a top rail 302 and the bottom of a container 100 and has a main rail body portion 604, which could be hollow tubing or be solid material. The vertical rail 304 has three attachment holes 306a-306c for attachment to the bracket connection assemblies 324 and to a horizontal rail that would be placed inside a slot 606 where it could be connected using a threaded female connector 312 and a threaded male connector 314 or using some other well-known connectors such as a bolt and cotter pin or the like. The slot 606 is configured to allow the vertical rail 304 to travel from its up position to its down position and vice versa and one skilled in the art will understand that the slot 606 can be configured to function as a stopping mechanism that prevents the vertical rail 304 from traveling beyond at least one desired rotational position.

FIG. 6B depicts a side view of the vertical rail 304 of FIG. 6A.

FIG. 6C depicts an end view of the vertical rail 304 of FIGS. 6A and 6B.

FIG. 6D depicts a side view of the vertical rail 304 of FIGS. 6A-6C attached to a horizontal rail 308 with the vertical rail 304 in the fully extended up position.

FIG. 6E depicts side view of the vertical rail 304 and horizontal rail 308 of FIG. 6D with the vertical rail 304 in a folded position. Referring to FIG. 6E, the horizontal rail 308 is in contact with the ends of the slot 606 such that the vertical rail cannot fold down further than shown. As such, the slot 606 and horizontal rail 308 together limit the travel and therefore determine the down position of the vertical rail 304.

FIG. 6F depicts a side view of yet another exemplary vertical rail 304 in accordance with the invention attached to a horizontal rail 308 with the vertical rail 304 in the fully extended up position. Referring to FIG. 6F, the vertical rail 304 is substantially the same as the vertical rail 304 of FIGS. 6A-6E except its slot 606 has an angled shape as opposed to a rectangular shape such that it limits the travel of the vertical rail to between a desired up position and a desired down position. The horizontal rail 308 is shown being in contact with the innermost portions of the slot 606.

FIG. 6G depicts a side view of the vertical rail 304 and horizontal rail 308 of FIG. 6F with the vertical rail 304 in a folded position. Referring to FIG. 6G, the horizontal rail 308 is shown being in contact with the outermost portions of the slot 606.

FIG. 7A depicts an oblique projection of another exemplary horizontal rail 308 in accordance with the invention where a vertical rail 304 in the fully extended up position is shown having been inserted into a rectangular slot 606 in the horizontal rail 308.

FIG. 7B depicts an oblique projection of the exemplary horizontal rail 308 of FIG. 7B with the vertical rail 304 shown in a folded position. Referring to FIGS. 7A and 7B, the slot 606 limits travel of the vertical rail 304 to the down position shown in FIG. 7B but does not limit travel of the vertical rail 304 to the moving beyond the up position shown in FIG. 7A.

FIG. 7C depicts an oblique projection of yet another exemplary horizontal rail 308 in accordance with the invention where a vertical rail 304 in the fully extended up position is shown having been inserted into an angled slot 606 in the horizontal rail 308. As shown, the upward travel of the vertical rail 304 is limited by the slot 606 to the up position.

FIG. 7D depicts an oblique projection of the exemplary horizontal rail 308 of FIG. 7C with the vertical rail 304 shown in a folded position. Referring to FIG. 7D, the downward travel of the vertical rail 304 is limited by the slot 606 to the folded position which corresponds to its fully down position.

Figure 7E:
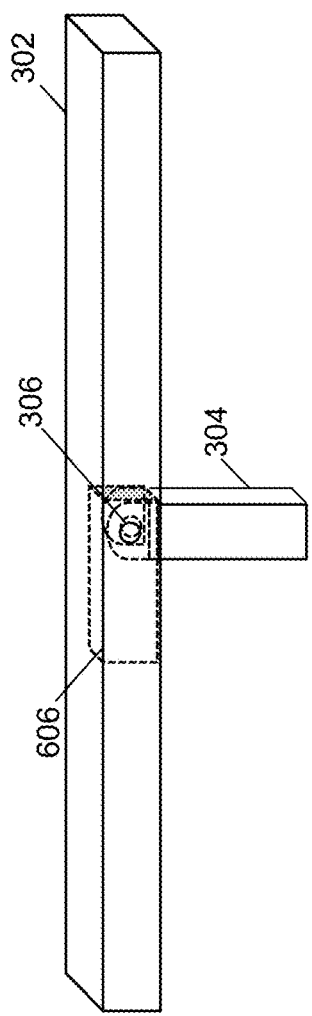
FIG. 7E depicts an oblique projection of another exemplary top rail in accordance with the invention where a vertical rail in the fully extended up position is shown having been inserted into a rectangular slot in the top rail.

FIG. 7E depicts an oblique projection of another exemplary top rail 302 in accordance with the invention where a vertical rail 304 in the fully extended up position is shown having been inserted into a rectangular slot 606 in the top rail. The slot 606 does not have to fully extend through the top of the top rail 302 and instead may only be visible when looking at the bottom of top rail 302. Alternatively, the slot 606 could extend through the top rail 302 such that it is visible from the top and bottom of the top rail 302.

Figure 7F:
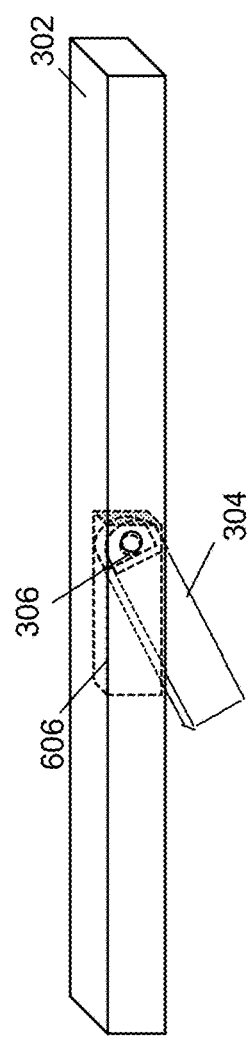
FIG. 7F depicts an oblique projection of the exemplary top rail of FIG. 7E with the vertical rail shown in a folded position.

FIG. 7F depicts an oblique projection of the exemplary top rail 302 of FIG. 7E with the vertical rail 304 shown in a folded position.

Figure 7G:
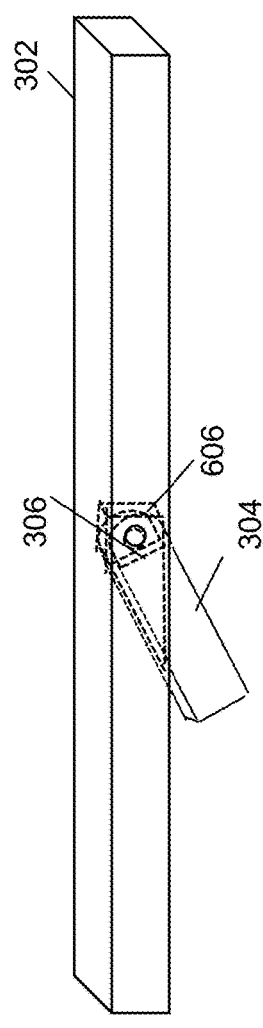
FIG. 7G depicts an oblique projection of yet another exemplary top rail in accordance with the invention where a vertical rail in a folded position is shown having been inserted into an angled slot in the top rail.

FIG. 7G depicts an oblique projection of yet another exemplary top rail 302 in accordance with the invention where a vertical rail 304 in a folded position is shown having been inserted into an angled slot 606 in the top rail 302.

FIG. 8A depicts a side view of an exemplary foldable rail assembly 300 in a fully extended 'up' position. Referring to FIG. 8A, the foldable rail assembly 300 is shown extended out of a container 100 to its up position.

FIG. 8B depicts a side view of the foldable rail assembly 300 of FIG. 8A in a partially extended position between an 'up' position and a 'down' position. Referring to FIG. 8B, the foldable rail assembly 300 is shown partially extended out of a container 100.

FIG. 8C depicts a side view of the foldable rail assembly 300 of FIG. 8A in a 'down' position. Referring to FIG. 8C, the foldable rail assembly 300 is shown folded such that it is fully inside of a container 100.

FIG. 8D depicts the exemplary foldable rail assembly 300 of FIGS. 8A-8C in the three positions shown in FIGS. 8A-8C with dashed lines indicating the movement of the foldable rail assembly between the 'up' and 'down' positions. Referring to FIG. 8D, the dashed lines indicated the locations of the attachment holes 306 over the range of motion of the foldable rail assembly 300.

FIG. 9A depicts a side view of another exemplary foldable rail assembly 300 in a fully extended 'up' position. Referring to FIG. 9A, the foldable rail assembly 300 is shown extended out of a container 100 to its up position.

FIG. 9B depicts a side view of the foldable rail assembly 300 of FIG. 9A in a partially extended position between an 'up' position and a 'down' position. Referring to FIG. 9B, the foldable rail assembly 300 is shown partially extended out of a container 100.

FIG. 9C depicts a side view of the foldable rail assembly 300 of FIG. 9A in a 'down' position. Referring to FIG. 9C, the foldable rail assembly 300 is shown folded such that it is fully inside of a container 100.

FIG. 9D depicts the exemplary foldable rail assembly 300 of FIGS. 9A-9C in the three positions shown in FIGS. 9A-9C with dashed lines indicating the movement of the foldable rail assembly between the 'up' and 'down' positions. Referring to FIG. 9D, the dashed lines indicated the locations of the attachment holes 306 over the range of motion of the foldable rail assembly 300.

One skilled in the art will understand that the two exemplary foldable rail assemblies 300 of FIGS. 8A-9D are substantially the same but oriented such that they fold out in opposite directions from opposite ends of a container. Alternative arrangements might involve, for example, a third foldable rail assembly 300 which might fold out in either direction, a third rail assembly and fourth rail assembly which fold out in opposite directions, etc. Many different variations are possible.

FIG. 10A depicts a first foldable rail assembly 300a such as depicted in FIGS. 8A-8D in a down position and a second foldable rail assembly 300b such as depicted in FIGS. 9A-9D in a down position. Referring to FIG. 10A, the first foldable rail assembly 300a is indicated by dashed lines to represent that it is located behind the second foldable rail assembly 300b which is indicated by solid lines. The two assemblies are parallel to each other when looking down at the container such as shown in FIG. 4A. It can be noted that either of the two assemblies could instead be multiple assemblies in series.

FIG. 10B depicts the first foldable rail assembly 300a of FIG. 10A in a down position and the second foldable rail assembly 300b of FIG. 10A in a partially extended position between an up position and a down position.

FIG. 10C depicts the first foldable rail assembly 300a of FIG. 10A in a down position and the second foldable rail assembly 300b of FIGS. 10A in an up position.

FIG. 10D depicts the first foldable rail assembly 300a of FIG. 10A in a partially extended position between an up position and a down position and the second foldable rail assembly 300b of FIG. 10A in an up position.

FIG. 10E depicts the first foldable rail assembly 300a of FIG. 10A in an up position and the second foldable rail assembly 300b of FIGS. 10A in an up position. As shown, when the two foldable rail assemblies 300a and 300b are in their up positions, the two rightmost vertical rails 304 of the first foldable rail assembly 304a and the two leftmost vertical rails 304 of the second foldable rail assembly 304b are substantially aligned with and substantially parallel to each other.

FIG. 11A depicts a top view of an exemplary top plate 102 of the container 100 in accordance with the invention having optional exemplary top plate holes 1100a-1100d, an optional exemplary top rail guide 1102, and an optional exemplary sealing gasket 1104. Referring to FIG. 11A, the top rail guide 1102 is indicated by dashed lines as being beneath middle portion of the top plate 102 that is between the two openings 104a and 104b. If the top plate 102 has only one opening then the guide 1102 could be in the same location. Generally, the guide 1102 and the sides of the container 100 limit sideways movement of a top rail 302 (and possibly horizontal rails) as the foldable rail assembly 300 travels between it's up and down positions. The depth of a guide 1102 may need to take into account which of various options (e.g., pulley systems) described below, if any, are used. Moreover, if more than two foldable rail assemblies 300 are used than they can be configured to have guides 1102 between them. The optional sealing gasket 1104 could be an O-ring type gasket that might be recessed into a groove in the top plate 102 or otherwise attached to the top plate (e.g., by an adhesive).

FIG. 11B depicts an oblique projection of the container 100 and the top rail guide 1102 of FIG. 11A. As shown, the guide 1102, which can be made of a hard or soft material, does not contact the bottom of the container or either end of the container and would be attached to the top plate 102, which could be via screws, bolts, an adhesive, etc.

FIG. 11C depicts a top view of an exemplary cover 1106 in accordance with the invention, which can be used keep dirt, water, and debris out of a container, where a given container may have one or more covers depending on how it is configured. Referring to FIG. 11C, the cover 1106 has beveled corner and cover attachment holes 1108a-1108d.

FIG. 11D depicts a bottom view of the cover of FIG. 11C. Referring to FIG. 11C, an optional sealing gasket 1104 could be integrated into or otherwise attached to the bottom of the cover, which can be used in addition to or as an alternative to the optional sealing gasket 1104 depicted in FIG. 11A.

FIG. 11E depicts an end view of the cover of FIG. 11C.

FIG. 11F depicts an oblique projection of an exemplary handle with threaded stud 1112 in accordance with the invention. Referring to FIG. 11F, four handles with threaded studs 1112a-1112d can be placed into the cover attachment holes 1108a-1108d and configured to be able to turn but not be removable from the cover attachment holes 1108a-1108d. Alternatively, they can be removable from the cover attachment holes 1108a-1108d. It should be understood that the number of cover attachment holes and corresponding number of handles with threaded studs can be different from four (i.e., more or less). It should also be understood that the shapes of the handles can vary to include having a rounded profile resembling a round head bolt or round head screw that might require a tool (e.g., a screwdriver or wrench) to loosen and tighten. As depicted, the handles with threaded studs 1112a-1112d can function as tie downs. One skilled in the art will recognize that various other shapes can be used as handles with threaded studs that can function as tie downs, for example, the handle may be ring shaped. Such handles with threaded studs might include holes allowing a hook such as included in common bungee cords to be inserted into the holes.

FIG. 11G depicts a top view of the exemplary cover 1106 of FIGS. 11C-11E attached to the top plate of FIG. 11A by an optional exemplary hinge 1110 and four exemplary handles with threaded studs 1112a-1112d used to further attach the cover 1106 to the top plate 102, which went tightened could cause an optional sealing gasket 1104 to provide a substantially waterproof seal. The hinge could be, for example, a piano hinge. A given hinge, cover, and top plate may be configured such that the cover opens outward (i.e., away from the bed 204) or inward (i.e., towards the bed 204).

FIG. 12A depicts a side view of the two foldable rail assemblies 300a and 300b shown fully extended in their up positions such as is shown in FIG. 10E and shows an optional cover 1106 shown in an open position that is attached to the container 100 by an optional hinge 1110. The cover 1106 may optionally be attached to the vertical rails 302 of the two foldable rail assemblies 300a and 300b using handles with threaded studs 1112a-1112b associated with the cover 1106 that screw into threaded cover-rail attachment holes 1204a-1204f in the vertical rails 304, where three cover-rail attachment holes 1204a-1204c are in the three vertical rails 304 of the first foldable rail assembly 300a and three cover-rail attachment holes 1204d-1204f are in the three vertical rails 304 of the second foldable rail assembly 300b. More specifically, the leftmost handle with threaded stud 1112a would screw into a threaded cover-rail attachment hole 1204a in the leftmost vertical rail 304 of the first foldable rail assembly 300a. The rightmost handle with threaded stud 1112d would screw into a threaded cover-rail attachment hole 1204f in the rightmost vertical rail 304 of the second foldable rail assembly 300b. The two innermost handles with threaded studs 1112b and 1112c could screw into either the threaded cover-rail attachment holes 1204b and 1204c of the first foldable rail assembly 300a or could screw into the threaded cover-rail attachment holes 1204b and 1204c and into the threaded cover-rail attachment holes 1204d and 1204e of the second foldable rail assembly 300b. As such, the same handles with threaded studs 1112a-1112d that can be used to attach to the top plate 302 when the cover 1106 is closed can attach to the foldable rail assemblies 300a and 300b when the cover 1106 is open and the assemblies are in their up positions.

FIG. 12A also depicts right and left stops 1202a and 1202b that can be used to limit travel of the foldable rail assemblies 300a and 300b to their desired up positions. FIG. 12A also shows use of a first vertical rail and bracket connection assembly 324a to attach the leftmost vertical rail 304 of the first foldable rail assembly 300a to the container 100, use of a second vertical rail and bracket connection assembly 324b to attach the rightmost vertical rail 304 of the second foldable rail assembly 300b to the container 100, and exemplary double vertical rail and bracket connection assemblies 1206a and 1206b used to attach the two rightmost vertical rails 304 of the first foldable rail assembly 300a and two leftmost vertical rails 304 of the second foldable rail assembly 300b to the container 100.

FIG. 12B depicts an oblique projection of a stop used to stop (or limit) the upward travel of a foldable rail assembly as also shown in FIG. 12A. Referring to FIG. 12B, a stop 1202 may include a slot as indicated by the dashed lines for accepting a vertical rail 304 or may merely be an object configured such that a vertical rail 304 must stop when it encounters the stop 1202. The stops 1202a and 1202b may be attached to a top rail guide 1102, to the top plate 302, or attached to the container 100, which may depend on which of several possible optional features (e.g., a pulley system) of the invention are employed.

FIG. 12C depicts an end view of an exemplary double vertical rail and bracket connection assembly 1206 as also shown in FIG. 12A. The double vertical rail and bracket connection assembly 1206 is similar to the vertical rail and bracket connection assembly 324 except it uses a double-U bracket (or W-bracket) 1208 such that it can pivotably attach a first vertical rail 304a of a first foldable rail assembly 300a and a second vertical rail 304b of a second foldable rail assembly 300b to a container 100.

FIG. 12D depicts an end view of the two foldable rail assemblies 300a and 300b as installed in the container using the double vertical rail and bracket connection assembly 1206 shown in FIG. 12C. Referring to FIG. 12D, a first vertical rail 304a of a first foldable rail assembly 300a and a second vertical rail 304b of a second foldable rail assembly 300b are pivotably attached to a container 100 using a double vertical rail and bracket connection assembly 1206. A cover 1106 is shown in its up position where it is attached to the container using a hinge 1110. The cover is also attached to the first and second vertical rails 304a and 304b using a handle with threaded stud 1112 that is threaded into threaded cover-rail attachment holes 1204b and 1204d. Also shown is an optional top rail guide 1102 and an optional foldable bracket 1210 that can be used to maintain the cover in an open position when the foldable rail assemblies 300a and 300b are in their down positions.

FIG. 12E depicts side views of the vertical rails 304a and 304b of FIG. 12D having spacers 1212a and 1212b intended to limit sideways movement when the vertical rails are in their up positions.

FIG. 12F depicts a side view of an exemplary attachment of the cover 1106 to the vertical rails 304a and 304b by the handle with threaded studs 1112 when using the spacers 1212a and 1212b of FIG. 12F.

FIG. 13A depicts a side view of two exemplary vertical rails 304a and 304b moving into vertical alignment where a male connector portion 1302 is shown moving into a female connector portion 1304. Referring to FIG. 13A, a first vertical rail 304a of a first foldable rail assembly is shown coming into vertical alignment with a second vertical rail 304b of a second foldable rail assembly as the second foldable rail assembly approaches its up position. The female connector portion 1304 is depicted being on the back side of the first vertical rail 304a as indicated by a dashed line and the male connector portion 1302 is depicted being on the front side of the second vertical rail 304b as indicated by the solid line.

FIG. 13B depicts a side view of the two vertical rails 304a and 304b of FIG. 13A after they are vertically aligned and the male connector portion 1302 is within the female connector portion 1304.

FIG. 13C depicts an end view of the two vertical rails 304a and 304b of FIG. 13B after they are vertically aligned and the male connector portion 1302 is within the female connector portion 1304. Generally, one skilled in the art will understand that various types of connectors can be used to cause vertical rails of foldable rail assemblies to connect while they are in their up positions. Such connectors may or may not need to be located low on the vertical rails so that they remain in the container depending on the options used, for example, number of openings in the top plate, use of a sealing components, etc.

FIG. 14A depicts a side view of the exemplary first and second foldable rail assemblies 300a and 300b of FIGS. 10A-10E in down positions with an optional pulley system 1402, an optional motor 1404, an optional control system 1406, and an optional sensor 1408.

FIG. 14B depicts a side view of the exemplary first and second foldable rail assemblies 300a and 300b of FIG. 14A in partially extended positions between up and down positions with the optional pulley system 1402, optional motor 1404, optional control system 1406, and optional sensor 1408.

FIG. 14C depicts a side view of the exemplary first and second foldable rail assemblies 300a and 300b of FIGS. 14A and 14B in down positions with the optional pulley system 1402, optional motor 1404, optional control system 1406, and optional sensor 1408.

Referring to FIGS. 14A-14C, the pulley system 1402 is connected to the leftmost vertical rail 304 of the first foldable rail assembly 300a and the rightmost vertical rail 304 of the second foldable rail assembly 300b causing them to move between their up and down positions in unison whether moved into a position manually or by the optional motor as controlled by the optional control system 1406.

Various combinations of pulleys attached to different combinations of vertical rails of the first and second foldable rail assemblies 300a and 300b are possible.

One or more sensors 1408 may be used to measure characteristics of the convertible truck rail assembly and/or the truck for safety reasons or for other reasons. For example, one or more sensors 1408 may for example determine whether the truck is moving, whether the truck motor is running, whether an obstruction is present that might prevent normal movement of a rail assembly, a temperature, humidity, a position of a vertical rail, etc. One skilled in the art will recognize that the control system 1406 can utilize sensor information provided by one or more sensors 1408 to control functions or devices, for example, controlling a heating element used to heat the convertible truck rail assembly if sensor information indicates the assembly is frozen. Generally, all sorts of automated capabilities are possible to include automated lubrication of parts.

FIG. 15A depicts an oblique projection of an exemplary telescoping rail assembly 1500 in the down position in accordance with the invention. Referring to FIG. 15A, the telescoping rail assembly 1500 includes four telescoping vertical rails 1502a-1502d inside a container 100. The telescoping vertical rails 1502a-1502d each consist of four rectangular tubes with a first outer rectangular tube being attached to the bottom of the container 100. The second, third, and fourth rectangular tubes are configured to fit within the first tube, the third and fourth tubes are configured to fit inside the second tube, and the fourth tube is configured to fit inside the three third. The fourth tubes are all attached to the bottom of a top rail 302, the third tubes are attached to the bottom of a first horizontal rail 304a, and the second tubes are attached to the bottom of a second horizontal rail 304b. The second horizontal rail 304b includes three cover-rail attachment holes 1204a-1204c intended to be used to attach a cover 1106 (not shown) when the cover 1106 is in its open position similar to the cover attaching to the vertical rails 304 as depicted in FIGS. 12A, 12D, and 12F. Although the tubes are shown as being rectangular, one skilled in the art will understand that the tubes could instead be round tubes or tubes having any other desired shape whereby tubes can be function in a telescoping manner.

FIG. 15B depicts an oblique projection of the telescoping rail assembly 1500 of FIG. 15A in a first partially extended position. Referring to FIG. 15B, the top rail 304 and fourth tubes of the respective telescoping vertical rails 1502a-1502d are shown having moved upward from their down position.

FIG. 15C depicts an oblique projection of the telescoping rail assembly of FIG. 15A in a second partially extended position. Referring to FIG. 15C, the top rail 304 and the fourth tubes of the respective telescoping vertical rails 1502a-1502d as well as the first horizontal rail 304a and the third tubes of the respective telescoping vertical rails 1502a-1502d are shown having moved upward from their down position.

FIG. 15D depicts an oblique projection of the telescoping rail assembly of FIG. 15A in a third partially extended position. Referring to FIG. 15D, the top rail 304 and the fourth tubes of the respective telescoping vertical rails 1502a-1502d, the first horizontal rail 304a and the third tubes of the respective telescoping vertical rails 1502a-1502d are shown having moved upward from their down position, and the second horizontal rail 304b and the second tubes of the respective telescoping vertical rails 1502a-1502d are shown having moved upward from their down position.

One skilled in the art will recognize that the telescoping rail assembly 1500 can be moved between its down position to its up position manually or using an automated mechanism such as an optional hydraulics mechanism (not shown). The automated mechanism could also have a control system, one or more sensors, etc. as previously described in relation to FIGS. 14A-14C.

FIG. 16A depicts an oblique protection of an exemplary rail assembly 1600 in accordance with the invention. Referring to FIG. 16A, the rail assembly 1600 consists of a rail subsystem 1602 and male connector tubes 1604a-1604e and an optional sealing gasket 110o4, where the vertical and horizontal rails making up the rail assembly 1602 may or may not be configured such that the vertical rails and horizontal rail are unable to move relative to each other. The optional sealing gasket 1104 is shown being on the bottom of the rail subsystem 1602 where it surrounds the male connector tubes 1604a-1604e. The male connector tubes 1604a-1604e include locking holes 1606a-1606e and bolt attachment holes 1608a-1608e. The locking holes 1606a-1606e may or may not extend from one side to the other side of the male connector tubes 1604a-1604e. The bottom horizontal rail of the rail subsystem 1602 includes four cover-rail attachment holes 1204a-1204d intended to be used to attach a cover 1106 (not shown) when the cover 1106 is in its open position similar to the cover 1106 attaching to vertical rails 304 of a foldable rail assembly 300 as depicted in FIGS. 12A, 12D, and 12F.

FIG. 16B depicts an oblique projection of an exemplary rail subsystem interface assembly 1610 in accordance with the invention. Referring to FIG. 16B, the rail subsystem interface assembly 1610 includes a container 100 having a top plate 102 having five openings 104a-104e and a bottom portion 106. Attached to the top plate 102 and to the bottom portion 106 of the container 100 are five female connector tubes 1612a-1612e that are aligned with the five openings 104a-104e of the top plate 102 such that they can receive the male connector tubes 1604a-1604e of a rail subsystem 1602. The male connector tubes 1604a-1604e include complementary locking holes 1614a-1614e and first complementary bolt attachment holes 1616a-1616e. The bottom portion of the container 100 also includes second complementary bolt attachment holes 1618a-1618e. The complementary locking holes 1614a-1614e may or may not extend from one side to the other side of the female connector tubes 1612a-1612e. The complementary locking holes 1614a-1614e are configured to align with the locking holes 1606a-1606e of the male connector tubes 1612a-1612e. The first complementary bolt attachment holes 1616a-1616e and the second complementary bolt attachment holes 1618a-1618e are configured to align with the bolt attachment holes 1606a-1606e of the male connector tubes 1604a-1604e, where for a given combination of a bolt attachment hole 1606, first complementary bolt attachment hole 1616, and second complementary bolt attachment hole 1618, at least one of the three holes is threaded. Between the female connectors tubes 1612a-1612e are four threaded cover attachment components 1620a-1620d.

FIG. 16C depicts an oblique projection of an exemplary locking bar assembly 1622 in accordance with the invention. Referring to FIG. 16C, the locking bar assembly 1622 includes a locking bar 1624 having five attached offset locking pins 1626a-1626e. The locking bar 1624 is configured to slide back and forth inside three bar guides 1628a-1628c. At one end of the locking bar is a first latch 1630a having a first latch hole 1632a.

Figure 16E:
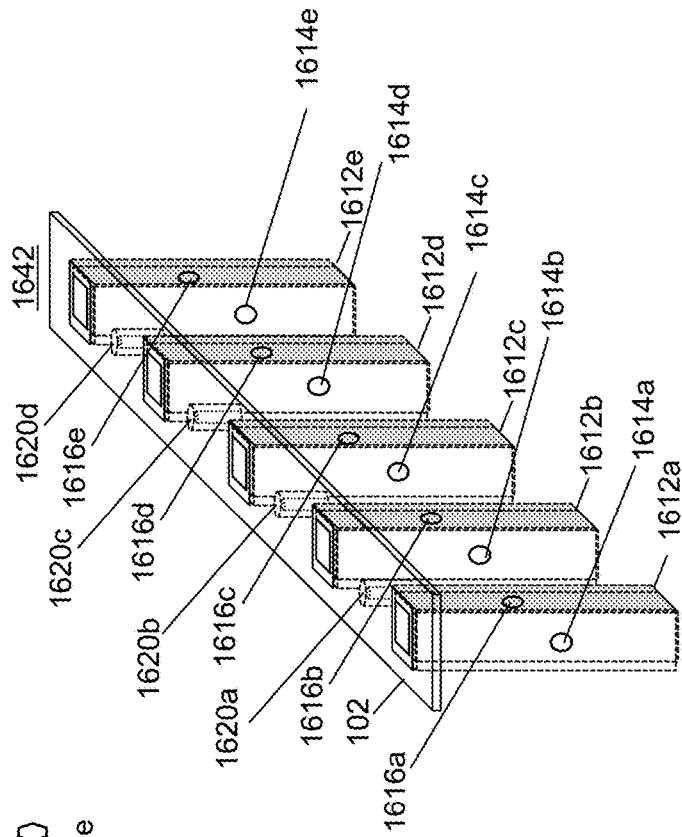
FIG. 16E depicts an oblique projection of another exemplary rail subsystem interface assembly in accordance with the invention.
Figure 16D:
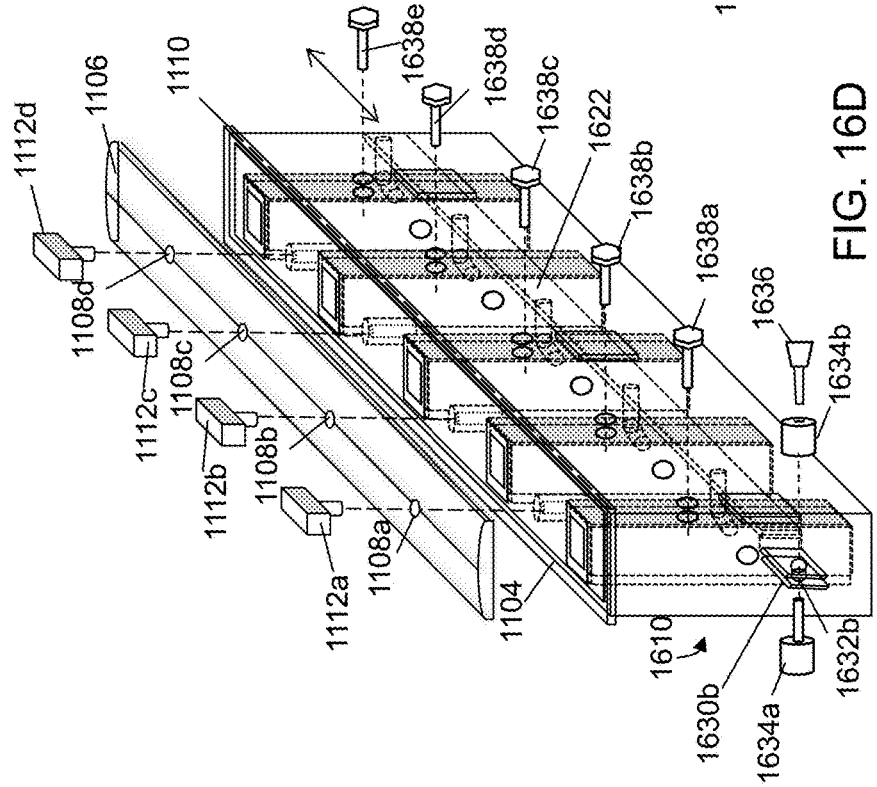
FIG. 16D depicts an oblique projection of the exemplary rail subsystem interface assembly of FIG. 16B, the exemplary locking bar assembly of FIG. 16C, an exemplary cover similar to that of FIGS. 11C-11E, and exemplary handles with threaded studs similar to that of FIGS. 11F and 11G.

FIG. 16D depicts an oblique projection of the exemplary rail subsystem interface assembly 1610 of FIG. 16B, the exemplary locking bar assembly 1622 of FIG. 16C, an exemplary cover 1106 similar to that of FIGS. 11C-11E, and exemplary handles with threaded studs 1112a-1112d similar to that of FIGS. 11F and 11G. Referring to FIG. 16D, the four handles with threaded studs 1112a-1112d are shown being configured to pass through four corresponding cover attachment holes 1108a-1108d and into four threaded cover attachment components 1620a-1620d. The rail subsystem interface assembly 1610 is shown having an optional sealing gasket 1104 and an optional hinge 1110 for attachment to the cover 1106. Instead of one cover 1106, a rail subsystem interface assembly 1610 may involve multiple covers 1106. For example, separate covers 1106a-1106e might be used with the female connector tubes 1612a-1612e or one cover 1106a might correspond to the first two female connector tubes 1612a and 1612b and a second cover 1106b might correspond to the last three female connector tubes 1612c-1612e. Generally, all sorts of different arrangements are possible.

The locking bar assembly 1622 is shown being attached to the sides of three of the female connector tubes 1612a, 1612c, and 1612e using the three bar guides 1628a-1628c such that within the container 100 it can slide from an unlocked position where the locking pins 1626a-1626e are outside the locking holes 1606a-1606e and the complementary locking holes 1614a-1614e of the male and female connector tubes 1604a-1604e and 1612a-1612e to a locked position where the locking pins 1626a-1626e are inside and engaged with the locking holes 1606a-1606e and the complementary locking holes 1614a-1614e of the male and female connector tubes 1604a-1604e and 1612a-1612e. The locking bar assembly 1622 may be moved manually or automatically, for example, by an actuator/motor (not shown). When in the locked position, the first lock latch hole 1632 of the first latch 1630 of the locking bar assembly 1622 can align with a second latch hole 1632 of a second latch 1630 attached to the outside of the container 100. A two part locking mechanism consisting of a first locking part 1634a having a locking shaft that can pass through the first and second latch holes 1632a and 1632b and a second locking part 1634b for receiving and locking to the locking shaft of the first locking part 1634a can be used to secure the locking bar assembly in its locked position. The first and second locking parts 1634a and 1634b can also be a single part that can be referred to as a lock 1634. The two part locking mechanism can be unlocked using a key 1636. Five bolts 1638a-1638e can optionally be used to attach the male and female connector tubes 1604a-1604e and 1612a-1612e by placing them into the second complementary bolt attachment holes 1618a-1618e, the aligned first complementary bolt attachment holes 1616a-1616e, and the aligned bolt attachment holes 1608a-1608e. As shown, the bolts 1638a-1638e are hex head bolts but they could alternatively be round head bolts or some other type of bolts. The bolts could be installed using lock washers (not shown) and/or protective washers (not shown) intended to prevent scratching of the container by the bolts.

Instead of the exemplary two part locking mechanism previously described, a traditional (one part) pad lock and key may be used. Instead of a lock and key, a mechanical combination lock may be used, where the combination lock can have moveable numbers, for example on rotatable disks, which enable a correct combination to be achieved to unlock the combination lock or the combination lock. Alternatively, an electronic combination lock could be used, where a user unlocks the lock using a digital code entered into a keypad or by using a remote control programmed to transmit a digital code. Moreover, although the locking bar assembly 1622 is shown extending out of the container 100, it could be contained completely inside the container, where an actuator/motor (not shown) could be used to slide the assembly 1622 back and forth to unlock and lock the assembly 1622, which could be controlled remotely, could be controlled using a key inserted into the side of the container 100, etc. One skilled in the art will understand that all sorts of locking mechanisms can be used for securing male connector tubes 1604 to female connector tubes 1612.

FIG. 16E depicts an oblique projection of another exemplary rail subsystem interface assembly 1642 in accordance with the invention. Referring to FIG. 16E, the rail subsystem interface 1653 is the same as the rail subsystem interface assembly 1610 of FIG. 16C except it doesn't have a bottom portion 106 of a container. Essentially, the top plate 102 and five female connector tubes 1612a-1612e function as a container.

Figure 16F:
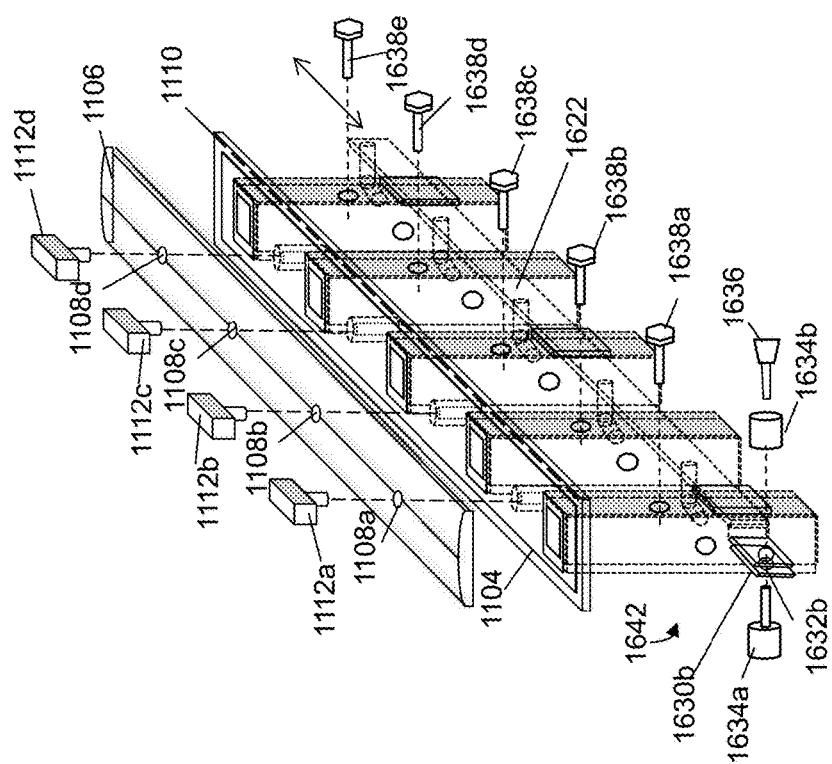
FIG. 16F depicts an oblique projection of the exemplary rail subsystem interface assembly of FIG. 16E, the exemplary locking bar assembly of FIG. 16C and an exemplary cover similar to that of FIGS. 11C-11E, and exemplary handles with threaded studs similar to that of FIGS. 11F and 11G.

FIG. 16F depicts an oblique projection of the exemplary rail subsystem interface assembly 1642 of FIG. 16E, the exemplary locking bar assembly 1622 of FIG. 16C and an exemplary cover 1106 similar to that of FIGS. 11C-11E, and exemplary handles with threaded studs 1112a-1112d similar to that of FIGS. 11F and 11G. The various components depicted in FIG. 16F work the same as those in FIG. 16D except the locking bar assembly is not inside the bottom portion 106 of a container since it is no longer present. Moreover, the five bolts 1638a-1638e can optionally be used to attach the male and female connector tubes 1604a-1604e and 1612a-1612e by placing them into the aligned first complementary bolt attachment holes 1616a-1616e and the aligned bolt attachment holes 1608a-1608e without needing to be placed through the second complementary bolt attachment holes 1618a-1618e since they are no longer present.

The rail subsystem interface assemblies 1610 and 1642 provide a standard system and method for secure attachment of all sorts of rail assemblies having male connector tubes 1604a-1604e complementary to their respective female connector tubes 1612a-1612e. It should be noted that the number of male connector tubes and complementary female connector tubes can be different from five (i.e., more or less than five).

Figure 17:
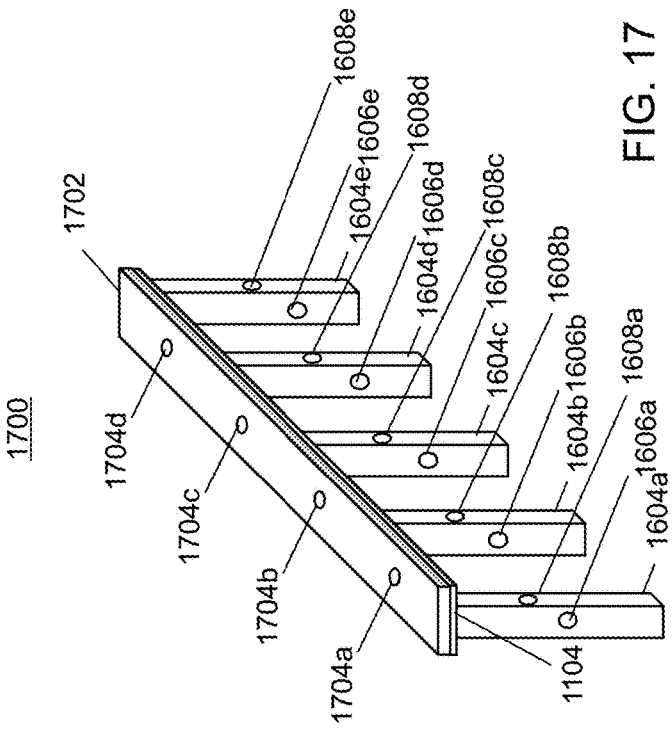
FIG. 17 depicts an oblique projection of an exemplary object interface assembly in accordance with the invention.

FIG. 17 depicts an oblique projection of an exemplary object interface assembly 1700. Referring to FIG. 17, the object interface assembly is similar to the exemplary rail assembly 1600 of FIG. 16A except it has an object attachment plate 1702 instead of a rail subsystem 1602. The object attachment plate 1702 is attached to the male connector tubes 1604a-1604e and includes object attachment holes 1704a-1704d, which can be used to attach objects to the object interface assembly 1700, which can then be used to provide secure attachment to either of the rail subsystem interface assemblies 1610 or 1642. Also shown in FIG. 17 is the optional sealing gasket shown in FIG. 16A.

The object interface assembly 1700 and corresponding rail subsystem interface assemblies 1610 and 1642 provide a standard system and method for secure attachment of all sorts of objects in accordance with the invention, where the object interface assembly 1700 may be associated with all sorts of objects to include rails but also other objects such as camper shells, all-terrain vehicle carriers (or racks), bike racks, motorcycle racks, canoe carriers, grills, and the like and generally enable a bed of a truck to be converted from having rails or other objects attached to the truck to not having rails or other objects attached to the truck where the rails or other objects can be stored separately from the truck or be integrated and secured to the truck using the object subsystem interface assembly 1700 and a corresponding rail subsystem interface assembly 1610 or 1642.

The exemplary male and female connector tubes described herein are shown as being rectangular but could have any other desired shape such as being circular tubes as long as they have a complementary male-female connection relationship.

FIG. 18 depicts an oblique projection of an exemplary bedside-to-bedside rail assembly 1800 in accordance with the invention. Referring to FIG. 18, the rail assembly 1800 includes a rail subsystem 1602, male connector tubes 1604a and 1604b, and a sealing gasket 1104, which might otherwise provide butt up against a front panel 206 or tail gate 208. The male connector tubes 1604a and 1604b include respective locking holes 1606a and 1606b and respective bolt attachment holes 1608a and 1608b, which are rotated 90 degrees relative to the locking holes 1606a-1606e and bolt attachment holes 1608a-1608e of FIG. 16 because the rail assembly 1800 is configured to be installed from bedside-to-bedside as opposed to in a given bedside as is the rail assembly 1600 of FIG. 16. As such, the male connector tubes 1604a and 1604b of a first bedside-to-bedside rail assembly 1800 could be installed into female connector tubes 1612e of two rail subsystem interface assemblies 1610 such as depicted in FIG. 16B that are located in the two bedsides of a truck such that it is located approximate to the cab of the truck, the male connector tubes 1604a and 1604b of a second bedside-to-bedside rail assembly 1800 could be installed into female connector tubes 1612a of the two rail subsystem interface assemblies 1610 such that it is located approximate to the tailgate and rail assemblies 1600 having three male connector tubes (as opposed to five) could be installed in the female connector tubes 1612b-1612d of the two rail subsystem interface assemblies 1610 such that rails would be present on all four sides of a truck bed. One skilled in the art will recognize that such rail assemblies can be designed such that they butt up against each other or can be designed such that they interconnect. For example, the rail assemblies could have male and female components where after a first rail assembly is installed, an adjoining rail assembly can be installed such that a male component of one of the assemblies is inserted into a female component of the other assembly such that they become interconnected, and so on such that all rail assemblies become interconnected into a four-sided composite rail assembly. Alternatively, only three sides may be used.

It can be noted that the bedside-to-bedside rail assembly 1800 of FIG. 18 could be made up of two or more rail subsystems that connect together. For example, the rail subsystem 1602 of FIG. 18 could consist of two halves that interconnect. For example, the horizontal rails of the rail subsystem might have male and female connector tubes such that when connected the two halves form a rail assembly substantially resembling that of FIG. 18.

FIG. 19A depicts an oblique projection of an exemplary bedside-to-bedside dual crossbar with dual bedside rails assembly 1900 having accessory attachment interfaces 1906a-1906c in accordance with the invention. Referring to FIG. 19A, the assembly 1900 includes dual bedside rails 1902a and 1902b which are attached to a bedside-to-bedside dual crossbars 1904a and 1904b. The assembly 1900 includes male connector tubes 1604a and 1604b that interface with female connector tubes 104 on the right bedside and male connector tubes 1604c and 1604d that interface with female connector tubes 104 on the left bedside, which have respective locking holes 1606a-1606d and respective bolt attachment holes 1608a-1608d, which are rotated 90 degrees relative to the locking holes 1606a-e and bolt attachment holes 1608a-e of FIG. 16A, as described above for the assembly 1800 of FIG. 18. The assembly 1900 includes sealing gaskets 1104a-1104d. Shown on the front of the assembly 1900 are three exemplary accessory attachment interfaces 1906a-1906c, which resemble rectangular slots but could have any desired shape as necessary to provide an attachment interface to an accessory such as a ramp, lighting, clamp, etc. Generally, multiple assemblies 1900 could be installed to create a platform with rails on top of a truck bed thereby enabling storage beneath the platform. As described above, such assemblies may consist of two or more portions that can be combined to form an assembly 1900 and multiple assemblies 1900 can be designed such that they butt up against each other or interconnect with each other to form a composite assembly.

Figure 19B:
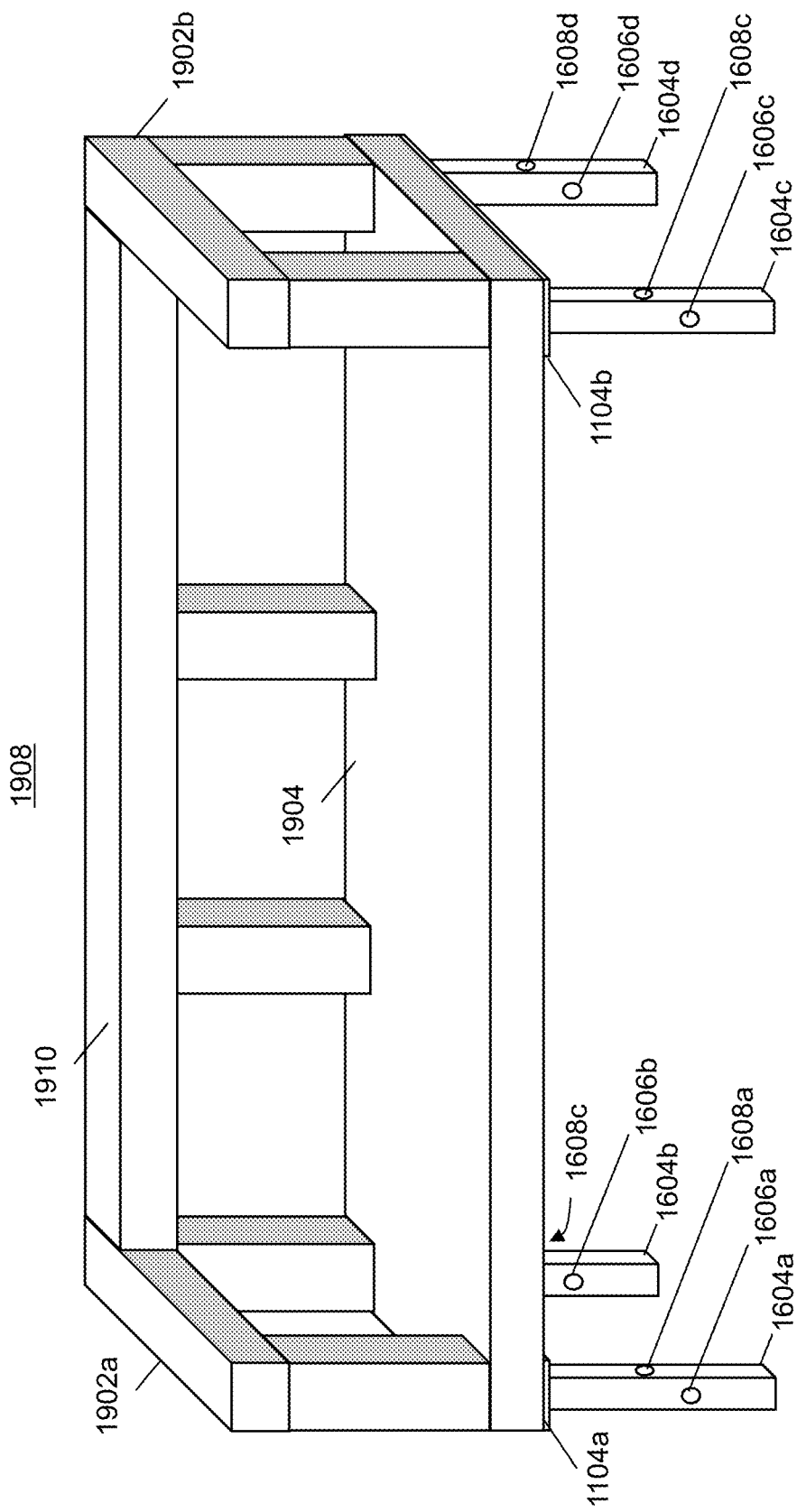
FIG. 19B depicts an oblique projection of another exemplary bedside-to-bedside crossbar with dual bedside rails assembly in accordance with the invention.

FIG. 19B depicts an oblique projection of another exemplary bedside-to-bedside crossbar with dual bedside rails assembly 1908 in accordance with the invention. Referring to FIG. 19B, the assembly 1908 is similar to the assembly 1900 of FIG. 19A except it has a single wide crossbar 1904 that could be also described as a platform, shelf, or seat and it has a bedside-to-bedside rail subassembly 1910. As such, combinations of assemblies 1908 and similar assemblies not having a bedside-to-bedside rail subassembly 1910 might be installed to provide a platform similar to that described in relation to FIG. 19A except where the bottom of the platform would be resemble a large shelf as opposed to rails. One skilled in the art will also recognized that an alternative approach to that shown in FIGS. 19A and 19B might be employed whereby the dual crossbars 1904a and 1904b of FIG. 19A might be combined with a wire mesh (not shown) so as to create an alternative large shelf having holes but relatively small ones as compared to those between the cross bars of FIG. 19A. Generally, all sorts of combinations are possible, where a given approach can be used to accommodate specific application requirements.

FIGS. 20A and 20B depict side view and end views of an exemplary component 2000 having triangle-shaped grooves 2002a and 2002b on opposing sides in accordance with the invention.

FIGS. 20C and 20D depict side view and end views of an exemplary component 2004 having triangle-shaped tongues 2006a and 2006b on opposing sides in accordance with the invention.

FIGS. 20E and 20F depict side view and end views of an exemplary component 2008 having a triangle-shaped tongue 2006 on a first side and a triangle-shaped groove 2002 on a second side opposing the first side in accordance with the invention.

FIGS. 20G and 20H depict side view and end views of an exemplary component 2008 having a triangle-shaped groove 2002 on a first side and a triangle-shaped tongue 2006 on a second side opposing the first side in accordance with the invention. As such, FIGS. 20E-20F provide both side views and both end view of the exemplary component 2008.

Referring to FIGS. 20A-20G, one skilled in the art will understand that the components 2000, 2004, and 2008 can be combined in various combinations such that tongues are inserted into grooves so as to create wider components, much like tongue and groove flooring. As such, such components can be assembled one at a time enabling a much larger and heavier composite component to be installed on a truck. Moreover, corresponding tongues and/or grooves might be included in the sides of other assemblies such as the assemblies of FIGS. 19A and 19B enabling them to be 'enlarged' by adding such components. Alternatively, instead of the tongues and grooves of the components of FIGS. 20A-20G that extend the full length of the components, multiple smaller (in length) tongues might be employed every foot or so across a component that can be inserted into holes and then slid into grooves of another component. Thus, instead of requiring a long tongue of a first component to slide completely across a long grove of another component, multiple tongues of a first component might be inserted into corresponding holes in a second component and then slid only a few inches to cause the tongues to engage with the multiple grooves.

FIG. 21A depicts an end view of an exemplary first interlocking component 2100 having a first side without an interlocking portion 2102 and having a second side opposite the first side that has a lower interlocking portion 2104.

FIG. 21B depicts an end view of an exemplary second interlocking component 2106 having a first side that has an upper interlocking portion 2108 and having a second side opposite the first side that has a lower interlocking portion 2104.

FIG. 21C depicts an end view of an exemplary third interlocking component 2110 having a first side that has an upper interlocking portion 2108 and having a second side opposite the first side without an interlocking portion 2102. Also shown in FIG. 21C is as optional male connector tube 1604.

FIG. 21D depicts an end view of the second interlocking component 2106 being moved into interlocking position with the third interlocking component 2110. Referring to FIG. 21D, an optional male connector tube 1604 might be installed into a female connector tube 1612 (not shown) such that it sits on top of a top plate 102 and then the second interlocking component 2106 can be moved into an interlocked position.

FIG. 21E depicts an end view of the second interlocking component 2106 after being interlocked with the third interlocking component 2110.

FIG. 21F depicts an end view of the first interlocking component 2100 being moved into interlocking position with the third interlocking component 2110.

FIG. 21G depicts an end view of the first interlocking component 2100 after being interlocked with the third interlocking component 2110.

FIG. 21H depicts an end view of the second interlocking component 2106*a* being moved into interlocking position with the other second interlocking component 2106*b*.

FIG. 21I depicts an end view of the second interlocking component 2106*a* after being interlocked with the other second interlocking component 2106*b*.

FIG. 21J depicts an end view of the first interlocking component 2100 being moved into interlocking position with the second interlocking component 2106.

FIG. 21K depicts an end view of the first interlocking component 2100 after being interlocked with the second interlocking component 2106.

FIG. 21L depicts an end view of the first interlocking component 2100 interlocked with the third interlocking component 2110 and a crossbar 1904. Referring to FIG. 21L, a male connector tube 1604*a* of a third interlocking component 2110 can be inserted into a corresponding female connector tube 1612 (not shown), the first interlocking component 2100 can be interlocked with the third interlocking component 2110, and then male connector tube 1604*b* of the crossbar 1904 can be inserted into a corresponding female connector tube 1612 (not shown). As such, the first interlocking component 2100 cannot be removed by pivoting such as when it was moved into the interlocking position. FIG. 21L also depicts an exemplary raised portion 2100 on the outside edge of a top plate in accordance with the invention.

FIG. 21M depicts a top view of the first interlocking component 2100 of FIG. 21A.

FIG. 21N depicts a top view of the second interlocking component 2106 of FIG. 21B.

FIG. 21O depicts a top view of the third interlocking component 2110 of FIG. 21C. Referring to FIGS. 21M-21O, the interlocking components are male and female portions of a crossbar 1904 that are located at three different locations across the length of the crossbar 1904. As such, interlocking components can only be interlocked by aligning respective male and female portions.

FIG. 21P depicts a top view of the first interlocking component 2100 of FIG. 21A interlocked with the third interlocking component 2110 of FIG. 21C.

Generally, FIGS. 20A-21L provide examples how components can be designed such they can be installed easily in a certain order whereby once installed that cannot be easily removed. As such, composite assemblies involving numerous components and subassemblies can be constructed and then male and female connector tubes can be locked using locking bar assemblies 1622 such that the assembled composite assemblies are substantially secure from theft.

FIG. 22A depicts an end view of an exemplary miscellaneous component 2200 having an exemplary hook guide 2202 in accordance with the invention.

FIG. 22B depicts an end view of an exemplary top plate 102 having an exemplary hook guide slot 2204 in accordance with the present invention.

FIGS. 22C-22G depict end views of the placement of the hook guide 2202 associated with the miscellaneous component 2200 of FIG. 22A into the hook guide slot 2204 of the top plate 102 of FIG. 22B. Referring to FIG. 22C-22G, the hook guide 2202 can be passed through the hook guide slot 2204 while the miscellaneous component 2200 is tilted and then the miscellaneous component can be brought into a vertical position such that hook guide 2202 is engaged against the top plate 102 thereby interlocking the miscellaneous component 2200 with the top plate 102.

FIGS. 22H and 22I depict front and top views of the exemplary miscellaneous component 2200 and a top plate 102, respectively. Referring to FIGS. 22H and 22I, the length of the hook guide 2202 is shown to be less than the length of the hook guide slot 2204 in the top plate 102. One skilled in the art will recognize that if the length of a hook guide 2202 is less than the length of a hook guide slot 2204 that a miscellaneous component can be attached to the top plate as shown in FIGS. 22C-22G and then moved perpendicular to the top plate by some distance allowing the miscellaneous component 2200 to attach to some other subsystem, component, or the like. For example, a first panel might be installed into a top plate and then a second panel installed that is then moved over to engage with the first panel, a third panel could be installed and then moved over to engage with the second and so on enabling multiple parts to be interlocked together.

FIG. 22J depicts an exemplary top plate 102 having an alternative hook guide slot 2206, which has a first wider portion and a second narrow portion that allows a hook guide 2202 like shown in FIGS. 22A-22H to be placed into the first wider portion without requiring the component 2200 to be tilted and then the component can be moved perpendicular to the top plate (i.e., moved to the left, as shown)

such that the hook guide engages with the top plate 102 and potentially attach to some other subsystem, component, etc. such as with the first, second, and third panel example described previously.

FIG. 22K depicts an end view of another exemplary miscellaneous component 2200 having another exemplary hook guide 2208 in accordance with the invention. The hook guide 2208 can be used with an alternative hook guide slot 2206 without requiring the component 2200 to be tilted.

FIG. 22L depicts an end view of yet another exemplary miscellaneous component 2200 having yet another exemplary hook guide 2210 in accordance with the invention. The hook guide 2210 can be used with an alternative hook guide slot 2206 without requiring the component 2200 to be tilted. For example, the component 2200 could be a panel to be interlocked with a rail assembly.

FIG. 22M depicts exemplary hook guide slots 2204a-2204j included in the top plate 102 of an exemplary rail subsystem interface assembly 1610 such as is depicted in FIG. 16B. One skilled in the art will recognize that one or more of the hook guide slots 2204a-2204j of FIG. 22M could instead be an alternative hook guide slot 2206.

FIG. 22N depicts exemplary hook guide slots 2204a-2204u included in the top plate 102 of an exemplary container 100 such as is depicted in FIGS. 1A-1D. One skilled in the art will recognize that one or more of the hook guide slots 2204a-2204u of FIG. 22N could instead be an alternative hook guide slot 2206.

Generally, a hook guide slot 2204 or an alternative hook guide slot 2206 can be included in a desirable location of a first object including, for example, a top rail 302, a vertical rail 304, a horizontal rail 308, a top plate 102, and in any component 2200 thereby enabling a second object having a corresponding hook guide 2202, 2208, or 2210 to be interlocked with the first object. One skilled in the art will understand that a hook guide slot 2204 or an alternative hook guide slot 2206 need not be located in a horizontal surface but can instead be located in vertical surfaces or in surfaces that are neither horizontal or vertical.

In accordance with another aspect of the invention, one or more containers 100 could be installed in the front panel 206 and/or tail gate 208 of a truck and may include one or more convertible rail assemblies such as foldable rail assemblies and telescoping rail assemblies and may include one or more rail subsystem interface assemblies for receiving rail assemblies 1600 or object assemblies 1700 having male connector tubes configured to interface with the female connector tubes of the rail subsystem interface assemblies or object subsystem interface assemblies. Alternatively, one or more containers 100 may be attached to the front panel 206 and/or the tail gate 208 of a truck.

In accordance with yet another aspect of the invention such as depicted in FIGS. 23A and 23B, bedside-to-bedside rail subsystem interface assemblies 2302a-2302c, which are similar to rail subsystem interface assemblies 1610, have male connector tubes 1604a and 1604b configured to enable them to be interlocked into rail subsystem interface assemblies 1610a and 1610b installed in the left and right bedsides 210a and 210b of a truck 100. For example, rail subsystem interface assemblies 1610a and 1610b may be installed in containers 100a and 100b in the left and right bedsides 210a and 210b of a truck 200 and the male connector tubes 1604a and 1604b of a bedside-to-bedside rail subsystem interface assembly 2302a could be installed into the female connector tubes 1612a and 1612b of the two rail subsystem interface assemblies 1610a and 1610b, such as the female connector tubes nearest the front panel 206 of a truck bed 204. As such, the bedside-to-bedside rail subsystem interface assembly 2302a is secured via the locking bar assemblies 1622a and 1622b of the two rail subsystem interface assemblies 1610a and 1610b engaging the locking holes 1606a and 1606b of the male connector tubes 1604a and 1604b of the bedside-to-bedside rail subsystem interface assembly 2302a and the complementary locking holes 1614a and 1614b of the female connector tubes 1612a and 1612b of the two rail subsystem interface assemblies 1610a and 1610b. Once the bedside-to-bedside rail subsystem interface assembly 2302a is secured, a rail assembly 1600 or object interface assembly 1700 can be secured to the bedside-to-bedside rail subsystem interface assembly 2302a via the locking bar assembly 1622c of the bedside-to-bedside rail subsystem interface assembly 2302a engaging the locking holes 1606 of the male connector tubes 1604 of the rail assembly 1600 or object interface assembly 1700 and the complementary locking holes 1614a and 1614b of the female connector tubes 1612c-1612f of the bedside-to-bedside rail subsystem interface assembly 2302a.

Similarly, an additional bedside-to-bedside rail subsystem interface assembly 2302b could be installed into the female connector tubes 1612 of the two rail subsystem interface assemblies 1610a and 1610b that are nearest the tail gate 208 of the truck bed 204. Moreover, one or more additional bedside-to-bedside rail subsystem interface assemblies 2302c could be installed into the female connector tubes 1612 of the two rail subsystem interface assemblies 1610a and 1610b at other locations between the tail gate 208 and the front panel 206 of the truck bed 204.

In accordance with a further aspect of the invention, various combinations of rail subsystem interface assemblies and/or bedside-to-bedside rail subsystem interface assemblies can be employed to enable a framework to be attached and secured to a truck bed using the locking mechanisms of the interface assemblies. Thereafter, components such as interlocking panels can be added to the framework in such a manner that they interlock with the framework and with each other thereby enabling multiple components to be secured to the framework using a lock that locks at least one of the added components to the framework. In one arrangement, multiple components are added to the framework in a sequential order, where the first added component is interlocked with the framework and each additional added component is interlocked with the previously added component, where a given additional added component may or may not be interlocked with the framework, where the last added component is interlocked and secured to the framework, and where the multiple components can only be removed by unlocking the last added component from the framework and then removing the components in a sequential order that is the reverse of the sequential order that was used when the multiple components were added to the frame. The multiple components may extend down one side of the truck bed or may extend around multiple sides of the truck bed up to all four sides of the truck bed.

FIG. 24A depicts an exemplary framework 2400 in accordance with the invention. Referring to FIG. 24A, the framework 2400 includes seven rail subsystems 1602a-1602g installed in three rail subsystem interface assemblies 1610a-1610c integrated into the left bedside 210a, front panel 206, and right bedside 210b of the bed 204 of a truck 200, respectively. The three rail subsystem interface assemblies have corresponding containers 100a-100c having top plates 102a-102c and have corresponding locking mechanisms that are locking bar assemblies 1622a-1622c. The male connector tubes of a given rail subsystem are installed in corresponding female connector tubes as indicated for the first rail subsystem 1602a, where the male connector tubes 1612a-1612c of the first rail subsystem 1602a are shown installed inside three of the female connector tubes 1612a-1612c of the first rail subsystem interface assembly 1610a. The remainder of the male connector tubes of the remainder of the rail subsystems are also shown being similarly installed inside the remaining female connector tubes of the three rail subsystem interface assemblies 1602a-1602c, where the remaining male and female connector tubes were not numbered in order to reduce clutter in FIG. 24A.

FIG. 24B depicts an exemplary interlocking panel 2402 in accordance with the invention. Referring to FIG. 24B, the interlocking panel 2402 includes four hook guides 2200 across the bottom of the interlocking panel for interfacing with corresponding hook guide slots 2204 included in the top plates 102a-102c of the three containers 100a-100c. The interlocking panel 2402 also includes six hook guides 2210 for interfacing with corresponding hook guide slots 2206 included in the inside faces of the vertical rails of the rail subsystems 1602a-1602g, where the hook guide slots 2206 on the faces of the vertical rails of the first three rail subsystems 1602a-1602c are not shown but it should be understood that hook guide slots 2206 are present on the inside of those three rail subsystems 1602a-1602c that mirror those shown on the last three rail subsystems 1602e-1602g.

FIG. 24C depicts hook guides of the interlocking panel 2402 of FIG. 24B, where the four hook guides 2202 on the bottom of the panel 2402 are initially engaged into four hook guide slots 2204 of the third rail subsystem interface assembly 1610b by tilting the panel 2402 relative to the interface assembly 1610 such as depicted in FIGS. 22C-22G, where when the panel 2402 becomes vertical the six hood guides 2206 on the side of the panel 2402 become initially engaged in the six hook guide slots 2206 on the inside of the vertical rails of the seventh rail subassembly 1602g of the framework 2400 of FIG. 24A.

FIG. 24D depicts the interlocking panel 2402 of FIG. 24B having been slid to the right such that the hook guides 2202 and 2210 of the interlocked panel are interlocked with the hook guide slots 2204 and 2206 of the third rail subsystem interface 1610b and seventh rail assembly 1602g of the framework 2400 of FIG. 24A.

FIG. 24E depicts a top view of the framework 2400 of FIG. 24A to which seven interlocked panels 2402a-2402g have been interlocked in accordance with the invention, in sequential order. Specifically, the first three interlocking panels 1602a-1602c have been installed such that they are slid to the right when facing the panels from inside the truck bed to become interlocked with the last three rail subsystems 1602e-1602g, where there is room in a first corner 2404a for the fourth interlocking panel 2402d to be slid into place such that is interlocked with the fourth rail subsystem 1602d and thereby securing the first three interlocking panels 1602a-1602c since they can't be removed (by sliding to the left) until the fourth interlocking panel 1602d has been removed. Similarly, the fifth interlocking panel 2402e is shown having been slid into the second corner 2404b such that in its interlocking position where the fourth interlocking panel 1602d is secured, and the remaining two interlocking panels 2402f-2402g are shown in their interlocked positions. The seventh interlocking panel 2402g is shown being locked in its interlocking position using a lock 1634, which might be a padlock or another type of lock as described above. Thus, all seven interlocking panels 2402a-2402g are interlocked and secure until the lock 1634 is removed and the interlocking panels 2402a-2402g are removed in the reverse sequence as they were installed by sliding them left when facing the panels from the inside of the truck bed to the where the guide hooks can be removed by tilting the panels in the reverse movement as that depicted in FIGS. 22C-22G.

It should be noted that components such as interlocking panels that are attached to a framework may also be attached using threaded handles with studs such as previously described, which would screw into threaded holes in rail subsystems or other components.

Generally, one skilled in the art can design various interlocking systems involving various components such as interlocking panels, shelves, lighting, windows, storage bins, and so that interlock with each other and a secure framework so as to create various configurations where the components are secured to the framework using interlocking and at least one lock. All sorts of secure systems are possible. For example, a configuration could be enclosed, waterproof, have windows, and a door. It might have a water supply, a heating system, a cooling system, a cooking element, a refrigeration unit, a winch, and so on and on. Moreover, such designs can ensure that locks and locking mechanisms are not accessible from outside a truck bed.

The various subassemblies and components that make up a given interlocking system can be produced using light weight parts that enable a single person to assemble the system. The parts making up a given system can be stored in a roll around cabinet that might be kept in a garage such that the cabinet can be easily moved to where a truck may be converted from a truck to a truck with camper, truck with four-wheeler rack, truck with canoe rack, truck with bike rack, etc. or converted back to being a truck without such systems.

Also, various components can be made to be variable sized using standard telescoping or other such concepts allowing a "one size fits all" approach to components that could work across a wide truck bed or narrow truck bed or a wide trailer or narrow trailer. Additionally, male connector tubes may have first locking holes 1606 and first bolt attachment holes such as described in relation to FIG. 16A as well as second locking holes 1606 and second bolt attachment holes such as described in relation to FIG. 18, which are rotated 90° relative to the first locking holes 1606 and first bolt attachment holes. As such, the component have such male connector tubes can be installed in different rotational configurations depending on which locking holes and bolt attachment holes marry up with corresponding complementary locking holes and complementary bolt attachment holes of respective female connector tubes. Thus, one size fits all components could be designed having male connector tubes which can be installed in a single rail subsystem interface assembly or across a bedside such that male connector tubes are installed into female connector tubes of two rail subsystem interface assemblies.

The containers and corresponding rail subsystems, rail subsystem interface assemblies and the like that have been described for use with a truck can also be used with a trailer such as one that can be pulled behind a truck.

Generally, the invention can be employed in any vehicle having a bed such as emergency vehicles, military vehicles, construction vehicles, and the like. Moreover, the invention could be employed within a large volume, for example inside the hull of a ship or plane enabling rapid installation of systems to be used for various purposes that can be secured in accordance with the invention.

While particular embodiments of the invention have been described, it will be understood, however, that the invention is not limited thereto, since modifications may be made by those skilled in the art, particularly in light of the foregoing teachings.

The invention claimed is:

1. An interface system for attaching one or more objects to a truck bedside having a top portion above a wheel well, comprising:
a top plate, said top plate being integrated with said top portion of said bedside, said top plate having a plurality of first openings and a bottom portion;
a plurality of female connector tubes, said plurality of female connector tubes having a plurality of second openings for receiving a plurality of male connector tubes, said plurality of female connector tubes being attached to the bottom portion of said top plate and extending beneath said bottom portion of said top plate into a volume between said top portion of said bedside and said wheel well, said plurality of first openings being aligned with said plurality of second openings enabling the plurality of male connector tubes attached to said one or more objects to be inserted into said plurality of female connector tubes, said plurality of female connector tubes having a plurality of first locking holes that align with a plurality of second locking holes in said plurality of male connector tubes when said plurality of male connector tubes are inserted into said plurality of female connector tubes; and
a locking bar assembly, comprising:
a locking bar having a plurality of locking pins; and
a plurality of bar guides, said locking bar being able to slide back and forth inside said plurality of bar guides between an unlocked position where said locking pins are positioned outside said plurality of first locking holes and a locked position where said locking pins are positioned inside said plurality of first locking holes, said locking bar assembly being capable of being locked in said locked position by a locking mechanism.

2. The interface system of claim 1, wherein when said male connector tubes are inserted inside said plurality of female connector tubes and said locking bar assembly is in said locked position said locking pins are also positioned inside said plurality of second locking holes.

3. The interface system of claim 1, wherein said top portion of said bedside comprises said top plate.

4. The interface system of claim 1, further comprising:
at least one bolt attachment hole in at least one female connector tube of said plurality of female connector tubes and at least one complementary bolt attachment hole in at least one male connector tube of said plurality of male connector tubes that enable at least one bolt to be inserted into said at least one bolt attachment hole and said at least one complementary bolt attachment hole.

5. The interface system of claim 1, further comprising:
a container integrated with one of said bedside or said top plate, wherein said plurality of female connector tubes is inside said container.

6. The interface system of claim 5, wherein said container comprises an access panel.

7. The interface system of claim 5, wherein a portion of said locking bar extends out of said container enabling said locking bar assembly to be locked in said locked position, wherein said locking mechanism is outside said container.

8. The interface system of claim 5, wherein said container has at least one bolt attachment hole that aligns with at least one first complementary bolt attachment hole in at least one female connector tube of said plurality of female connector tubes and aligns with at least one second complementary bolt attachment hole in at least one male connector tube said plurality of male connector tubes enabling at least one bolt to be inserted into said at least one bolt attachment hole, said at least one first complementary bolt attachment hole, and said at least one second complementary bolt attachment hole.

9. The interface system of claim 5, wherein said container comprises at least one drain hole.

10. The interface system of claim 1, further comprising:
a cover configured to cover said top plate, said cover being movable between a closed cover position where said cover covers said top plate and prevents said plurality of male connector tubes from being inserted into said female connector tubes and an open cover position where said plurality of male connector tubes can be inserted into said female connector tubes.

11. The interface system of claim 10, further comprising:
a hinge that attaches said cover to said top plate, said hinge enabling said cover to rotate between said closed cover position and said open cover position.

12. The interface system of claim 10, further comprising:
a gasket that provides a seal between said cover and said top plate when said cover is in said closed cover position.

13. The interface system of claim 10, further comprising:
one or more threaded handles, wherein said one or more threaded handles can screw into corresponding one or more threaded cover attachment holes in said top cover in order to secure said cover in said closed cover position.

14. The interface system of claim 1, wherein at least one of said plurality of female connector tubes or at least one of said male connector tubes is a rectangular connector tube.

15. The interface system of claim 1, wherein said one or more objects comprises at least one object interface assembly comprising an object attachment plate to which at least one of said plurality of male connector tubes is attached, said object attachment plate comprising at least one object attachment hole that can be used to attach at least one second object to said object interface assembly.

16. The interface system of claim 1, further comprising:
a second interface system for attaching one or more objects to a second truck bedside that is opposite said truck bedside, said second interface comprising:
a second top plate;
a second plurality of female connector tubes; and
a second locking bar assembly.

17. The system of claim 16, wherein said one or more objects is attachable to said interface system and said second interface system.

18. The system of claim 1, wherein said one or more objects comprises a rail subsystem.

19. The system of claim 1, wherein said one or more objects comprises a platform.

20. The interface system of claim 1, where said one or more objects comprises a plurality of interlocking components.

* * * * *